US008602876B2

(12) United States Patent
Nakamura et al.

(10) Patent No.: US 8,602,876 B2
(45) Date of Patent: Dec. 10, 2013

(54) PROGRAM, INFORMATION STORAGE MEDIUM, AND COMPUTER SYSTEM

(75) Inventors: Taira Nakamura, Tokyo (JP); Osamu Sarudate, Tokyo (JP); Daisuke Masui, Tokyo (JP); Tsukasa Oikawa, Kanagawa (JP)

(73) Assignees: Bandai Co., Ltd., Tokyo (JP); Namco Bandai Games Inc., Tokyo (JP)

( * ) Notice: Subject to any disclaimer, the term of this patent is extended or adjusted under 35 U.S.C. 154(b) by 209 days.

(21) Appl. No.: 13/105,546

(22) Filed: May 11, 2011

(65) Prior Publication Data
US 2011/0294580 A1    Dec. 1, 2011

(30) Foreign Application Priority Data
May 28, 2010   (JP) ................................. 2010-122313

(51) Int. Cl.
*A63F 9/24*   (2006.01)
*A63F 13/00*   (2006.01)
(52) U.S. Cl.
USPC ........... 463/25; 463/4; 463/8; 463/42; 463/43
(58) Field of Classification Search
USPC ............................................................. 463/8
See application file for complete search history.

(56) References Cited

U.S. PATENT DOCUMENTS

| 8,099,182 | B1 * | 1/2012 | Kasten | 700/91 |
| 8,272,961 | B2 * | 9/2012 | Busey et al. | 463/42 |
| 8,292,723 | B2 * | 10/2012 | DeWaal | 463/20 |
| 2007/0123327 | A1 * | 5/2007 | Van Luchene | 463/1 |
| 2007/0203591 | A1 * | 8/2007 | Bowerman | 700/90 |
| 2007/0207860 | A1 | 9/2007 | Yamauchi | |
| 2008/0287196 | A1 | 11/2008 | Miki | |
| 2009/0062009 | A1 | 3/2009 | Inubushi et al. | |
| 2009/0186679 | A1 * | 7/2009 | Irvine et al. | 463/16 |
| 2009/0280908 | A1 * | 11/2009 | Carroll et al. | 463/42 |
| 2010/0093439 | A1 | 4/2010 | Brady | |

FOREIGN PATENT DOCUMENTS

| JP | H11-342263 A | 12/1999 |
| JP | H11-342267 A | 12/1999 |
| JP | 2006-149934 A | 6/2006 |
| JP | 2009-247574 A | 10/2009 |

OTHER PUBLICATIONS

"Sidekick—ParagonWiki—A City of Heroes and a City of Villains Wiki", Jul. 18, 2008, sourced from http://web.archive.org/web/20080718225107/http://cityofheroes.wikia.com/wiki/Sidekick.*
"City of Heroes", Release date May 4, 2004 by NCsoft.*
"Exemplar Effects on Enhancements", Jul. 7, 2006 by Positron.*
"J. League, Let's organize a professional soccer club! '04", "Dengeki PlayStation vol. 276", Media Works, Jul. 9, 2004, vol. 10, 18th issue, p. 46-50.

(Continued)

*Primary Examiner* — Steven J Hylinski

(57) ABSTRACT

A team is organized with players having preset inclination values having an influence on individual behavior tendencies of the players while a whole inclination value having an influence on the behavior tendency of a whole team is set. The difference between the whole inclination value of the team and inclination values of the individual players is calculated. The smaller the difference, the higher the player's ability is changed than the initial value. The larger the difference, the lower it is changed than the initial value. In match simulation processing, a simulation is performed with the abilities after the change.

9 Claims, 33 Drawing Sheets

(56) References Cited

OTHER PUBLICATIONS

EPO, European Search Report for EP application No. 11165321, Aug. 8, 2011, pp. 1-6.

JP Office Action dated Aug. 10, 2010.

"Pro Yakyu Chiimu wo Tsukuro! (Let's Make a Pro Baseball Team!) Online 2" (Sega), [online], started in May 27, 2008, the Internet URL: http://www.yakyutsuku-online.com/.

\* cited by examiner

FIG. 19

| ON-BASE STATUS | MATCHING CONDITION |
|---|---|
| NO RUNNER | BATTER'S "CONTACT": M1 OR HIGHER ∩ BATTER'S "RUNNING ABILITY": M2 OR HIGHER |
| FIRST BASE | BATTER'S "CONTACT": M1 OR HIGHER |
| SECOND BASE | BATTER'S "CONTACT": M3 OR HIGHER (M1 < M3) |
| THIRD BASE | BATTER'S "CONTACT": M1 OR HIGHER ∩ BATTER'S "RUNNING ABILITY": M2 OR HIGHER |
| BETWEEN FIRST AND SECOND BASES | BATTER'S "CONTACT": M4 OR HIGHER (M3 < M4) |
| ⋮ | ⋮ |

560 SACRIFICE BUNT MATCHING CONDITION TABLE (CONST.= M1, M2, ⋯)

FIG. 20

561 SACRIFICE BUNT SELECTION PROBABILITY TABLE

| VALUE OF "BUNT" OF FINAL OFFENSIVE TACTICS TENDENCY PARAMETER | SCORE DIFFERENCE | | | | |
|---|---|---|---|---|---|
| | ≤ −5 | −4 TO −1 | 0 | 1 TO 4 | 5 ≤ |
| −5 TO −4 | 0% | 5% | 10% | 20% | 20% |
| −3 TO −2 | 5% | 10% | 20% | 25% | 10% |
| −1 | 10% | 15% | 25% | 25% | 20% |
| 0 | 25% | 25% | 30% | 35% | 25% |
| 1 | 25% | 30% | 40% | 40% | 45% |
| ⋮ | ⋮ | ⋮ | ⋮ | ⋮ | ⋮ |

FIG. 21

NORMAL OFFENSIVE TACTICS SELECTION PROBABILITY TABLE ~566

| | | VALUE OF "FAST HIT" OF FINAL OFFENSIVE TACTICS TENDENCY PARAMETER ~566b | | | | | |
|---|---|---|---|---|---|---|---|
| VALUE OF "LONG HIT" OF FINAL OFFENSIVE TACTICS TENDENCY PARAMETER ~566a | | -5 TO -4 | -3 TO -2 | -1 | 0 | 1 | ... |
| -5 TO -4 | | EARLY/LONG 0%<br>LATE/LONG 0%<br>EARLY/SINGLE 0%<br>LATE/SINGLE 100% | EARLY/LONG 0%<br>LATE/LONG 0%<br>EARLY/SINGLE 10%<br>LATE/SINGLE 90% | EARLY/LONG 0%<br>LATE/LONG 0%<br>EARLY/SINGLE 15%<br>LATE/SINGLE 85% | EARLY/LONG 0%<br>LATE/LONG 0%<br>EARLY/SINGLE 30%<br>LATE/SINGLE 70% | EARLY/LONG 0%<br>LATE/LONG 0%<br>EARLY/SINGLE 35%<br>LATE/SINGLE 65% | ⋮ |
| -3 TO -2 | | EARLY/LONG 0%<br>LATE/LONG 10%<br>EARLY/SINGLE 0%<br>LATE/SINGLE 90% | EARLY/LONG 0%<br>LATE/LONG 10%<br>EARLY/SINGLE 5%<br>LATE/SINGLE 85% | EARLY/LONG 5%<br>LATE/LONG 10%<br>EARLY/SINGLE 15%<br>LATE/SINGLE 70% | EARLY/LONG 10%<br>LATE/LONG 10%<br>EARLY/SINGLE 35%<br>LATE/SINGLE 50% | EARLY/LONG 10%<br>LATE/LONG 10%<br>EARLY/SINGLE 40%<br>LATE/SINGLE 40% | ⋮ |
| -1 | | EARLY/LONG 0%<br>LATE/LONG 15%<br>EARLY/SINGLE 0%<br>LATE/SINGLE 85% | EARLY/LONG 0%<br>LATE/LONG 15%<br>EARLY/SINGLE 10%<br>LATE/SINGLE 75% | EARLY/LONG 5%<br>LATE/LONG 10%<br>EARLY/SINGLE 15%<br>LATE/SINGLE 70% | EARLY/LONG 10%<br>LATE/LONG 15%<br>EARLY/SINGLE 25%<br>LATE/SINGLE 50% | EARLY/LONG 15%<br>LATE/LONG 15%<br>EARLY/SINGLE 30%<br>LATE/SINGLE 40% | ⋮ |
| 0 | | EARLY/LONG 0%<br>LATE/LONG 25%<br>EARLY/SINGLE 0%<br>LATE/SINGLE 75% | EARLY/LONG 10%<br>LATE/LONG 15%<br>EARLY/SINGLE 10%<br>LATE/SINGLE 60% | EARLY/LONG 20%<br>LATE/LONG 15%<br>EARLY/SINGLE 20%<br>LATE/SINGLE 45% | EARLY/LONG 20%<br>LATE/LONG 25%<br>EARLY/SINGLE 20%<br>LATE/SINGLE 35% | EARLY/LONG 25%<br>LATE/LONG 25%<br>EARLY/SINGLE 25%<br>LATE/SINGLE 25% | ⋮ |
| 1 | | EARLY/LONG 0%<br>LATE/LONG 35%<br>EARLY/SINGLE 0%<br>LATE/SINGLE 65% | EARLY/LONG 20%<br>LATE/LONG 20%<br>EARLY/SINGLE 10%<br>LATE/SINGLE 50% | EARLY/LONG 25%<br>LATE/LONG 20%<br>EARLY/SINGLE 15%<br>LATE/SINGLE 45% | EARLY/LONG 25%<br>LATE/LONG 25%<br>EARLY/SINGLE 25%<br>LATE/SINGLE 25% | EARLY/LONG 30%<br>LATE/LONG 25%<br>EARLY/SINGLE 15%<br>LATE/SINGLE 30% | ⋮ |
| ... | | ... | ... | ... | ... | ... | ... |

FIG. 22

576 NORMAL DEFENSIVE TACTICS SELECTION PROBABILITY TABLE

| 576a VALUE OF "HIT GUARD" OF FINAL OFFENSIVE TACTICS TENDENCY PARAMETER | 576b VALUE OF "MATCH COUNT" OF FINAL OFFENSIVE TACTICS TENDENCY PARAMETER | | | | | |
|---|---|---|---|---|---|---|
| | −5 TO −4 | −3 TO −2 | −1 | 0 | 1 | ⋯ |
| −5 TO −4 | EARLY/LONG 0%<br>LATE/LONG 0%<br>EARLY/SINGLE 0%<br>LATE/SINGLE 100% | EARLY/LONG 0%<br>LATE/LONG 0%<br>EARLY/SINGLE 5%<br>LATE/SINGLE 95% | EARLY/LONG 0%<br>LATE/LONG 0%<br>EARLY/SINGLE 10%<br>LATE/SINGLE 90% | EARLY/LONG 0%<br>LATE/LONG 0%<br>EARLY/SINGLE 30%<br>LATE/SINGLE 70% | EARLY/LONG 0%<br>LATE/LONG 0%<br>EARLY/SINGLE 40%<br>LATE/SINGLE 60% | ⋮ |
| −3 TO −2 | EARLY/LONG 0%<br>LATE/LONG 10%<br>EARLY/SINGLE 0%<br>LATE/SINGLE 90% | EARLY/LONG 0%<br>LATE/LONG 10%<br>EARLY/SINGLE 5%<br>LATE/SINGLE 85% | EARLY/LONG 5%<br>LATE/LONG 10%<br>EARLY/SINGLE 15%<br>LATE/SINGLE 70% | EARLY/LONG 10%<br>LATE/LONG 10%<br>EARLY/SINGLE 30%<br>LATE/SINGLE 50% | EARLY/LONG 10%<br>LATE/LONG 10%<br>EARLY/SINGLE 40%<br>LATE/SINGLE 60% | ⋮ |
| −1 | EARLY/LONG 0%<br>LATE/LONG 15%<br>EARLY/SINGLE 5%<br>LATE/SINGLE 80% | EARLY/LONG 0%<br>LATE/LONG 15%<br>EARLY/SINGLE 10%<br>LATE/SINGLE 75% | EARLY/LONG 5%<br>LATE/LONG 10%<br>EARLY/SINGLE 15%<br>LATE/SINGLE 70% | EARLY/LONG 10%<br>LATE/LONG 15%<br>EARLY/SINGLE 25%<br>LATE/SINGLE 50% | EARLY/LONG 15%<br>LATE/LONG 20%<br>EARLY/SINGLE 15%<br>LATE/SINGLE 50% | ⋮ |
| 0 | EARLY/LONG 0%<br>LATE/LONG 15%<br>EARLY/SINGLE 10%<br>LATE/SINGLE 75% | EARLY/LONG 5%<br>LATE/LONG 15%<br>EARLY/SINGLE 10%<br>LATE/SINGLE 70% | EARLY/LONG 15%<br>LATE/LONG 15%<br>EARLY/SINGLE 20%<br>LATE/SINGLE 50% | EARLY/LONG 20%<br>LATE/LONG 20%<br>EARLY/SINGLE 25%<br>LATE/SINGLE 35% | EARLY/LONG 30%<br>LATE/LONG 30%<br>EARLY/SINGLE 15%<br>LATE/SINGLE 25% | ⋮ |
| 1 | EARLY/LONG 0%<br>LATE/LONG 15%<br>EARLY/SINGLE 15%<br>LATE/SINGLE 70% | EARLY/LONG 10%<br>LATE/LONG 20%<br>EARLY/SINGLE 10%<br>LATE/SINGLE 60% | EARLY/LONG 15%<br>LATE/LONG 20%<br>EARLY/SINGLE 15%<br>LATE/SINGLE 50% | EARLY/LONG 25%<br>LATE/LONG 25%<br>EARLY/SINGLE 25%<br>LATE/SINGLE 25% | EARLY/LONG 30%<br>LATE/LONG 25%<br>EARLY/SINGLE 15%<br>LATE/SINGLE 30% | ⋮ |
| ⋮ | ⋯ | ⋯ | ⋯ | ⋯ | ⋯ | ⋯ |

FIG. 23

| 584 TACTICS MOTTO SETTING DATA | |
|---|---|
| MOTTO SELECTION CONDITION (584a) | TACTICS MOTTO (584b) |
| SURPRISE ATTACK GUARD: 5 | DEFENSE PREVENTING RUNNING |
| INTENTIONAL WALK: 3 OR HIGHER | NO INTENTIONAL WALK |
| MATCH COUNT: 4 OR HIGHER ∩ HIT GUARD: −4 OR LOWER | GROUND-BALL BASEBALL |
| ⋮ | ⋮ |
| BASE RUNNING: 5 ∩ RUNNING ABILITIES OF 50% PLAYERS OR MORE ARE EQUAL TO OR HIGHER THAN REFERENCE VALUE | ULTRA-ACTIVE BASE RUNNING |

FIG. 24

| 586 GOODNESS-OF-FIT INDICATOR SETTING DATA | |
|---|---|
| DISPLAY SELECTION CONDITION (586a) | INDICATOR DATA (586b) |
| TOTAL OF INDIVIDUAL GOODNESS-OF-FIT INDICES: 0 TO 20 |  52,52a |
| TOTAL OF INDIVIDUAL GOODNESS-OF-FIT INDICES: 21 TO 50 |  52,52b |
| TOTAL OF INDIVIDUAL GOODNESS-OF-FIT INDICES: 51 TO 80 |  52,52c |
| ⋮ | ⋮ |

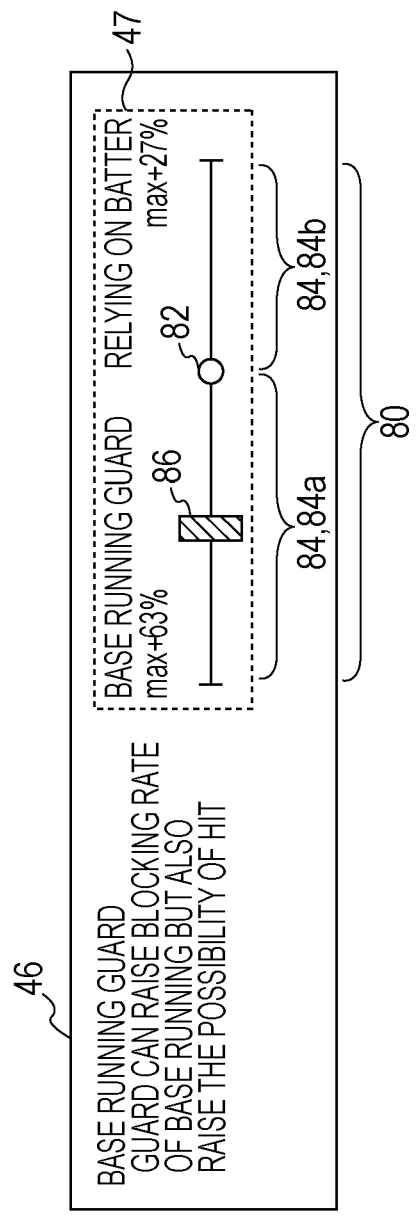

PROGRAM, INFORMATION STORAGE MEDIUM, AND COMPUTER SYSTEM

This application claims priority from Japanese Patent Application Serial No. 2010-122313 filed May 28, 2010, the contents of which are incorporated herein by reference in its entirety.

BACKGROUND OF THE INVENTION

1. Field of the Invention

The present invention relates to programs causing a computer to execute a game.

2. Description of the Related Art

In the genre of team-fighting sport games, a simulation type game has been known in which a user plays a role of a team owner, gathers players and forms his/her team and watches a game being automatically performed between his own team and another team of a different user. Such a baseball game is disclosed in On-line game "Pro Yakyu Chiimu wo Tsukuro! (Let's Make a Pro Baseball Team!) ONLINE 2" (Sega), [online], started in May 27, 2008, the Internet URL: http://www.yakyutsuku-online.com/.

A user may form starting players (starting players) (such as nine players) from baseball players that he or she holds. The user then enjoys how much the team that he or she has organized is stronger than other teams organized by other users through matches. Since performance of baseball players, player changes and determination of tactics are automatically implemented during a game, a user can show his/her skill in predicting game conditions and organizing a team in the preparation before a game.

As described above, in a simulation type team fighting game, the selection of tactics, player changes and so on during a game are performed under automatic control. If the automatic control is executed in a simple thinking pattern, the simulation lacks "reality", and the user may lose interest. Game suppliers have been demanded to provide automatic control which can typically produce more realistic games.

In the real world, in sports that teams match against each other or the police, an expeditionary party or the like in which members behaves in groups, a behavior tendency may appear as a whole which is derived from a request to the team or group. For example, a baseball team having a defiant tradition or a baseball team which is requested by its owner to show up for increasing the number of spectators is desired by fans to match on the basis of fair tactics for making a big game in which players attack from the front, and this is the whole behavior tendency and the whole inclination. The result may often be more important than the safety of the group members in an expeditionary party. In this case, the whole behavior tendency is determined such that higher priority is given to the result in selecting a behavior of a member.

On the other hand, members of a team or group also have individual behavior tendencies. The individual behavior tendencies may mostly include similar factors to those in the whole behavior tendency. Because of the individual behavior tendencies, how much the behavior tendencies of the members are matched with the whole behavior tendency may often affect how much the members can exert their abilities. In the real world, for example, when the way of thinking of a commander is similar to the ways of thinking of his/her subordinates, the subordinates obey their commander and can exert their abilities fully. However, when there is alienation between them, the subordinates lack enthusiasm, and their abilities are not exerted, producing poor results as the group.

It may be considered that the influence of such a difference between in behavior tendency between the whole group and individuals on the behaviors of a group may be an important factor for higher reality. However, publicly known simulation type team fighting games have not reflected the factor to the games.

SUMMARY OF THE INVENTION

The present invention was made in view of the problem. The object of the present invention is to provide a "realistic" game in which groups are formed from a plurality of combinations of characters having predetermined individual behavior tendencies and ability values, and the behaviors of the groups are automatically controlled, reflecting the difference between the behavior tendencies of the groups and the behavior tendencies of the individual characters included on the groups. More desirably, it is an object of the present invention to reflect the behavior tendency requested by a user to the behavior control over the groups.

In order to achieve the objects, according to a first aspect, there is provided a program which causes a computer to control the development of a game by controlling operations of characters included in a group, the program causing the computer to function as: group organizing means (such as a server processing unit 202, a game managing portion 220 and a team organization processing portion 224 in FIG. 12 and steps S12 to S24 in FIG. 28) for forming a plurality of combinations of characters having a predetermined inclination value (such as individual tactic tendency parameter 530 in FIG. 15) for a given inclination item; whole inclination value setting means (such as a server processing unit 202, a game managing portion 220 and a team tactics setting processing portion 226 in FIG. 12 and steps S26 to S28 in FIG. 28) for setting a whole inclination value (such as team tactics setting data 620 and manually set value 620c in FIG. 26) which is an inclination value of the group for the inclination item; and ability value changing means (such as a server processing unit 202, a game managing portion 220 and a team tactics setting processing portion 226 in FIG. 12, player's ability change setting data 588 in FIG. 25, and steps S74 to S76 in FIG. 30) for changing ability values of the characters in accordance with the differences between the whole inclination value and the inclination values of the individual characters.

According to another aspect, there is provided a computer system which controls the development of a game by controlling operations of characters included in a group, the system including: group organizing means for forming a plurality of combinations of characters having a predetermined inclination value for a given inclination item; whole inclination value setting means for setting a whole inclination value which is an inclination value of the group for the inclination item; and ability value changing means for changing ability values of the characters in accordance with the differences between the whole inclination value and the inclination values of the individual characters.

According to the first aspect and other aspect, there can be provided a game which performs automatic control over groups each having a plurality of combinations of characters having predetermined inclination values having an influence on individual behavior tendencies and ability values for behaviors. Under the automatic control, the ability values of the characters can be changed in accordance with the difference between a whole inclination value set for a group and inclination values individually set for member characters of a group. In other words, in accordance with the degree of matching between a behavior tendency of a group and behavior tendencies of member characters of the group, the group may exert its ability or may not fully exert its ability on the contrary. Ups and downs with differences in ways of thinking between a commander and subordinates which can be seen in real world may occur in a game, and a strong interest further grows with the game.

According to a second aspect, there may be provided the program according to the first aspect causing the computer to function such that the ability value changing means can raise the ability value of a character if the difference satisfies a predetermined small difference condition and lower the ability value of the character if the difference satisfies a predetermined large difference condition.

According to the second aspect, a similar effect to that of the first aspect can be provided. In addition, if the whole inclination value of a whole team and individual inclination values of member characters of the group is small, the abilities of the characters increases and the characters can exert their abilities more easily, which is advantageous to a user. On the contrary, if the whole inclination value of a whole team and individual inclination values of member characters of the group is large, it is difficult for the characters to exert their abilities.

In other words, the more similar the ways of thinking of a commander and subordinates, the better the subordinates works. The ups and downs due to the difference in inclination like the more they diverges from each other, the more poorly the subordinates work can be produced in a game.

According to a third aspect, there may be provided the program according to the first or second aspect causing the computer to function as: goodness-of-fit determining means (such as a server processing unit 202, a game managing portion 220, and a team tactics setting processing portion 226 in FIG. 12 and step S74 in FIG. 30) for determining the goodness-of-fit between characters and a group formed by the characters on the basis of the differences between the inclination values of the characters and the whole inclination value; and goodness-of-fit indicator control means (such as a server processing unit 202, a game managing portion 220, and a team tactics setting processing portion 226 in FIG. 12, a goodness-of-fit indicator setting data 586 in FIG. 24, and step S92 in FIG. 30) for controlling the display of the goodness-of-fits of the characters forming the group.

According to the third aspect, the similar effect to that of the first or second aspect can be provided. In addition, the goodness-of-fit between inclination values of individual character members of a group and a whole inclination value of the group can be clearly displayed for each of the characters.

The disclosure of information on the goodness-of-fit provides a user enjoyment of group optimization by changing character members of the group and/or changing the whole inclination value of the group.

According to a fourth aspect, there may be provided the program according to any one of the first to third forms causing the computer to function such that the whole inclination value setting means can set the whole inclination value in accordance with an operation input by a user.

According to the fourth aspect, the similar effect to that of any one of the first to third forms can be provided. In addition, a user can set the whole inclination value having an influence on a behavior tendency as a group. In other words, a behavior tendency requested by a user can be reflected to the behavior control over the group.

According to a fifth aspect, there may be provided the program according to any one of the first to third aspects causing the computer to function such that the whole inclination value setting means can calculate and/or set the whole inclination value on the basis of the inclination values of the characters forming the group.

The whole inclination value can be determined to determine the behavior tendency of a group by handling the group as a set of behavior tendencies of member characters.

According to a sixth aspect, there may be provided the program according to any one of the first to third aspects causing the computer to function such that: the whole inclination value setting means can have temporary value calculating means (such as a server processing unit 202, a game managing portion 220, and a team tactics setting processing portion 226 in FIG. 12) for calculating a temporary value (such as a automatically set value 620d in FIG. 26) of the whole inclination value on the basis of the inclination values of characters forming the group, and amount of correction setting means (such as a server processing unit 202, a game managing portion 220, and a team tactics setting processing portion 226 in FIG. 12) for setting the amount of correction for correcting the temporary value calculated by the temporary value calculating means in accordance with an operation input by a user, and use the temporary value and the amount of correction to set the whole inclination value (such as a manually set value 620c in FIG. 26).

According to the sixth aspect, the similar effect to that of any one of the first to third aspects can be provided. In addition, the whole inclination value calculated on the basis of the inclination values of individual member characters of a group can be handled as a primary value (temporary value), and a user can set the amount of correction for it to determine the whole inclination value. Because the behavior tendency as a collective will of the character members of a group is set as a temporary value and a setting operation is performed for correcting the temporary value, an easy-to-understand operation system can be implemented therewith.

According to a seventh aspect, there may be provided the program according to any one of the first to sixth aspects causing the computer to function as motto control means (such as a server processing unit 202, a game managing portion 220, and a team tactics setting processing portion 226 in FIG. 12 and step S72 in FIG. 30) for controlling the display of the motto corresponding to an inclination value condition which satisfies the whole inclination value set by the whole inclination value setting means among inclination value conditions for the whole inclination value indicating the inclinations corresponding to a plurality of mottoes indicating inclinations of the group.

According to the seventh aspect, the similar effect to that of any one of the first to sixth aspects can be provided. In addition, because the current characteristic of the whole inclination value can be clearly inform to a user, higher operability relating to the setting of the whole inclination value can be provided.

According to an eighth aspect, there may be provided the program according to the seventh aspect causing the computer to function such that an unpermitted character combination condition can be associated with the motto, and the motto control means can control the display of the motto corresponding to an inclination value condition satisfied by the whole inclination value set by the whole inclination value setting means and the motto with which a combination of characters organized by the group organizing means does not satisfy the combination condition.

According to the eighth aspect, the similar effect to that of the seventh aspect can be provided. In addition, the display of a motto which is unmatched with a combination of character members of a group can be prevented.

According to a ninth aspect, there may be provided the program according to any one of the first to eighth aspects causing the computer to function such that a plurality of kinds of the inclination item can be provided, and the ability value changing means can change the ability value of the character on the basis of the result of total evaluation of the difference between the whole inclination value relating to inclination items and the inclination values of the characters.

According to the ninth aspect, the similar effect to that of any one of the first to eighth aspects can be provided. In addition, the difference between the behavior tendency of a whole team and individual behavior tendencies of character members of the team can be reflected to a game in more detail.

According to a tenth aspect, there may be provided the program according to any one of the first to ninth aspects causing the computer to function such that the game is a fighting game in which the groups fight against each other; and the inclination items at least include an offensive inclination item and a defensive inclination item.

According to the tenth aspect, the similar effect to that of any one of the first to ninth aspects can be provided. In addition, the difference between the behavior tendency of a whole team and individual behavior tendencies of character members of the team can be reflected to a game in more detail so as to be more suitable for a fighting game in which groups fight against each other.

According to an eleventh aspect, there is provided a computer readable information storage medium which stores the program according to any one of the first to tenth aspects. The term "information storage medium" here may refer to a magnetic disk, an optical disk, an IC memory or the like, for example. According to the eleventh aspect, a computer is caused to read and execute a program according to any one of the first to eleventh aspects to cause the computer to provide the similar effect to that of any one of the first to ninth aspects.

BRIEF DESCRIPTION OF THE DRAWINGS

FIG. 19 illustrates an example of a data configuration of a sacrifice bunt appropriateness condition table;

FIG. 20 illustrates an example of a data configuration of a sacrifice bunt selection probability table;

FIG. 21 illustrates an example of a data configuration of a normal offensive tactics selection possibility table;

FIG. 22 illustrates an example of a data configuration of a normal defensive tactics selection possibility table;

FIG. 23 illustrates an example of a data configuration of tactics motto setting data;

FIG. 24 illustrates an example of a data configuration of goodness-of-fit indicator setting data;

FIG. 35 illustrates a variation example of a parameter value setting section.

DESCRIPTION OF THE PREFERRED EMBODIMENTS

First Embodiment

A first embodiment according to the present invention will be described. According to the first embodiment, a simulation type fighting baseball game is implemented in which players are registered by using trading cards. A group of a plurality of combinations of characters having individually predetermined behavior tendencies and ability values is formed, and the behaviors of the group are automatically controlled.

Configuration of Game System

Figure 1:
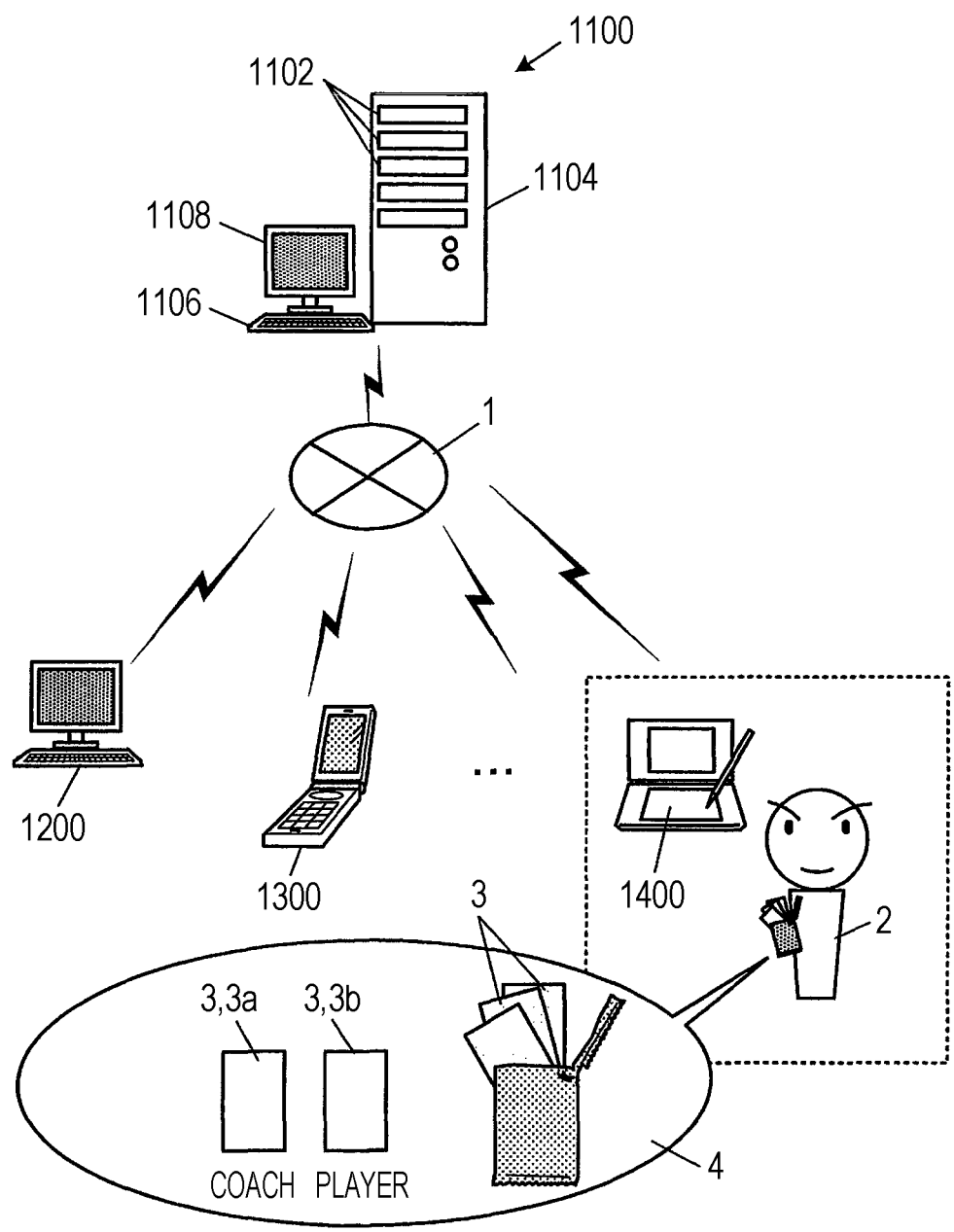
FIG. 1 illustrates an example of the configuration of a game system.

FIG. 1 illustrates an example of the configuration of a game system according to the first embodiment. This embodiment is implemented by a system in which a user terminal such as a PC 1200, a smart phone 1300, and a mobile game apparatus 1400 is connected to a server system 1100 through a communication line 1 to exchange data required for execution of a game.

The communication line 1 refers to a communication path through which data can be exchanged. In other words, the communication line 1 may include a leased line (leased cable) for direct connection, a LAN (Local Area Network) with Ethernet (registered trademark), for example, and a communication network such as a telephone communication network, cable network, and the Internet. Both wired and wireless communication methods are applicable.

The server system 1100 includes a housing 1104 having a plurality of blade servers 1102, and a keyboard 1106 and display monitor 1108 to be used for control operations over the blade servers 1102. Each of the blade servers 1102 includes a CPU, an I/O module, and storage such as an IC memory and a hard disk and functions as one server computer. The housing 1104 contains the blade servers 1102, a power supply module which supplies power, and a communication apparatus for connecting to the communication line 1.

The server system 1100 according to this embodiment may entirely support a CGI (Common gateway interface) program implementation language, for example, and use the CGI system to provide functions of a user registration procedure, registered user authentication (so-called sign-in processing), communications between users as in a baseball game and a chat.

Notably, the server system 1100 may have a configuration implemented by a standalone server computer. Alternatively, a desktop home game apparatus may function as the server apparatus.

All of the PC 1200, smart phone 1300 and mobile game apparatus 1400 are computers which can execute a game screen display program. The game screen display program refers to a program which implements a function of displaying a screen on the basis of display information received from the server system 1100 and a function of transmitting request information according to an operation input to the server system 1100.

The game screen display program may be implemented by a special client program if display information generated in the server system 1100 has a special data format. It may be implemented by a generic web browser program if the display information has a format with which interactive control is allowed over an image and/or a sound by using HTML and Adobe Flash (Adobe is a registered trademark).

A user 2 is required to purchase in advance a special trading card 3 having a baseball player or coach design in order to play a baseball game according to this embodiment. A predetermined number of the trading cards 3 may be put on sale in one package.

There are two kinds of the trading cards 3 including a coach card 3*a* and a player card 3*b* being a pitcher, a catcher or a fielder. The cards corresponding a coach and players which appear in a game may be prepared in advance. (A plurality of kinds may be provided for one player. However, according to this embodiment, the same types are provided for simple description). Each of the cards has unique card information associated with a coach or player who appears in a game. According to this embodiment, a card number is printed as the card information. Alternatively, the card information may be a bar code or QR code.

Figure 2:
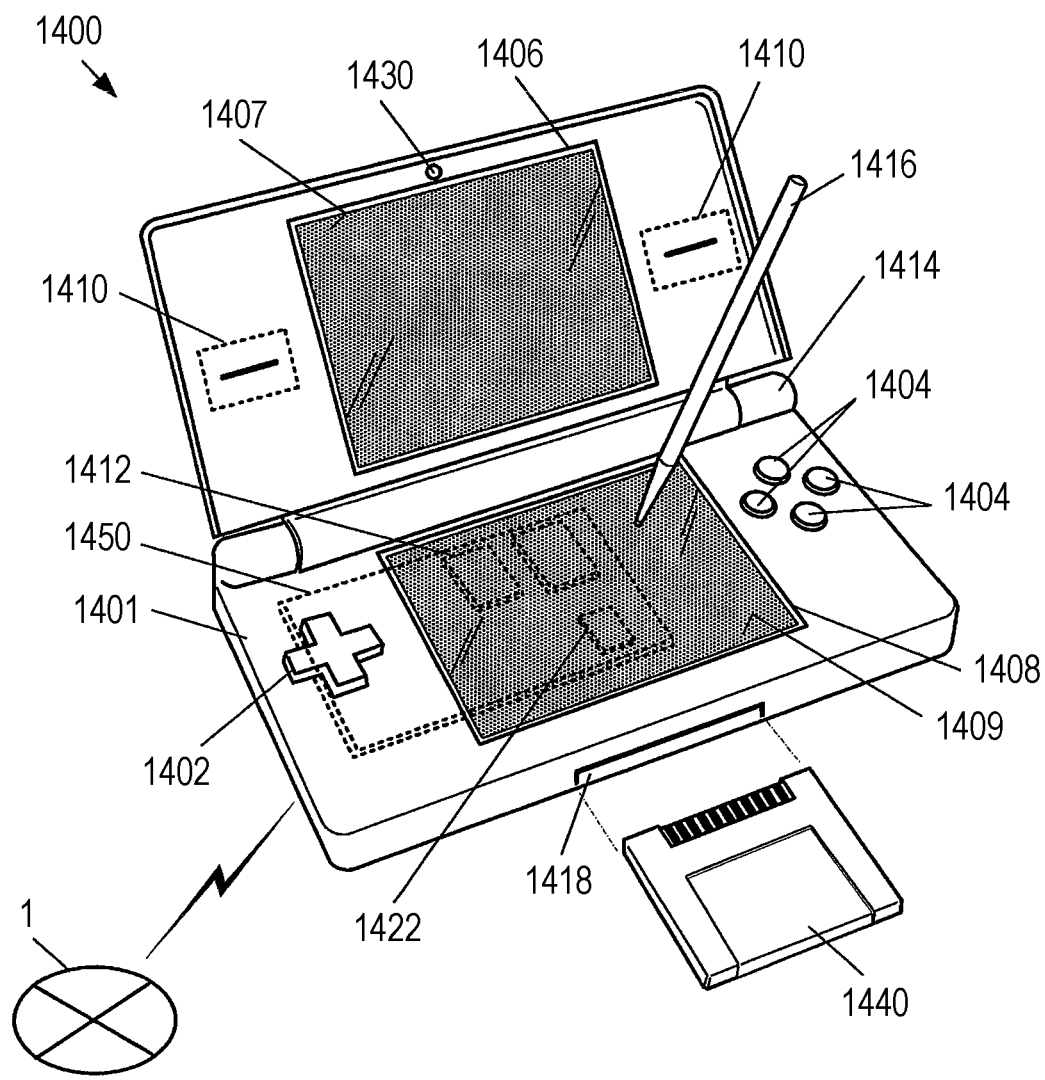
FIG. 2 is an external view for describing an example of the configuration of a mobile game apparatus being a user terminal.

The user 2 registers the trading card 3 that he or she has acquired through a user terminal and enables the player corresponding to the card. The user 2 may use the enabled players to organize his or her team and enjoy a baseball game by fighting against teams of other players in a league match.
Configuration of User Terminal Next, there will be described a configuration example of the mobile game apparatus 1400 as a typical user terminal. FIG. 2 is an external view for describing an example of the configuration of the mobile game apparatus 1400 being a user terminal in this embodiment.

The mobile game apparatus 1400 has an apparatus body 1401 which is foldable and openable and closeable with a hinge 1414. The apparatus body 1401 includes a direction input key 1402, a push switch 1404, a first liquid crystal display unit 1406, a second liquid crystal display unit 1408, a speaker 1410, an image sensor 1430, and a control unit 1450. Touch panels 1407 and 1409 are mounted on the display surfaces of the first liquid crystal display unit 1406 and second liquid crystal display unit 1408. The touch panels 1407 and 1409 may be touched with a stylus pen 1416, for example, for contact input of an arbitrary position of the display screens.

The apparatus body 1401 further includes a memory card reader 1418 which allows data reading and data writing from a memory card 1440 being a computer-readable information storage medium. The memory card 1440 stores a program and/or setting data which are necessary for a control unit 1450 of the mobile game apparatus 1400 to execute arithmetic processing relating to game play. The apparatus body 1401 further includes an internal battery, a power supply button, and a volume control button, for example, not illustrated.

The touch panels 1407 and 1409 cover substantially all areas of the display screens of the first liquid crystal display unit 1406 and second liquid crystal display unit 1408 without blocking the display screens. If a user performs a contact operation with the stylus pen 1416 (or a finger, for example), the touched position coordinates in an orthogonal coordinate system having its origin in an upper left part can be output to the control unit 1450.

The image sensor 1430 is an imaging device such as a CCD image sensor (Charge Coupled Device Image Sensor) and a CMOS image sensor (Complementary Metal Oxide Semiconductor Image Sensor). The Image sensor 1430 is used for imaging to read a bar code or QR code, for example, which gives card information on the trading card 3.

The control unit 1450 corresponds to a control substrate of a game apparatus and includes a microprocessor such as a CPU (Central Processing Unit), a GPU (Graphics Processing Unit), and a DSP (Digital Signal Processor) and an IC memory such as an ASIC (Application Specific Integrated Circuit), a VRAM, a RAM, and a ROM.

The control unit 1450 further includes a radio communication module 1412, a driver circuit for the first liquid crystal display unit 1406 and second liquid crystal display unit 1408, a driver circuit for the touch panel 1407 and touch panel 1409, a circuit which receives a signal from the direction input key 1402 and/or push switch 1404, an amplifier circuit which outputs a voice signal to the speaker 1410, and a what-is-called I/F circuit (interface circuit) which is a signal input/output circuit to/from the memory card reader 1418. These elements provided in the control unit 1450 are electrically connected to each other via a bus circuit to allow data reading and writing and signal transmission and reception.

The control unit 1450 reads a program or data stored in the memory card 1440 with the memory card reader 1418 and temporarily stores it to the IC memory provided in the control unit 1450. The control unit 1450 executes the read program, performs the corresponding arithmetic processing, and controls the component or components of the mobile game apparatus 1400 in accordance with an operation input from the direction input key 1402, push switch 1404 or touch panel 1407 or 1409.

According to this embodiment, the mobile game apparatus 1400 reads necessary program or setting data from the memory card 1440. However, a main program and/or data provided in the control unit 1450 may be pre-stored in the IC memory. Alternatively, the mobile game apparatus 1400 may be connected to the wired/wireless communication line 1 such as the Internet, LAN (Local Area Network), and WAN (Wide Area Network) through the radio communication module 1412 and download and acquire a main program or data from an external device.

Outline of Game

Figure 3:
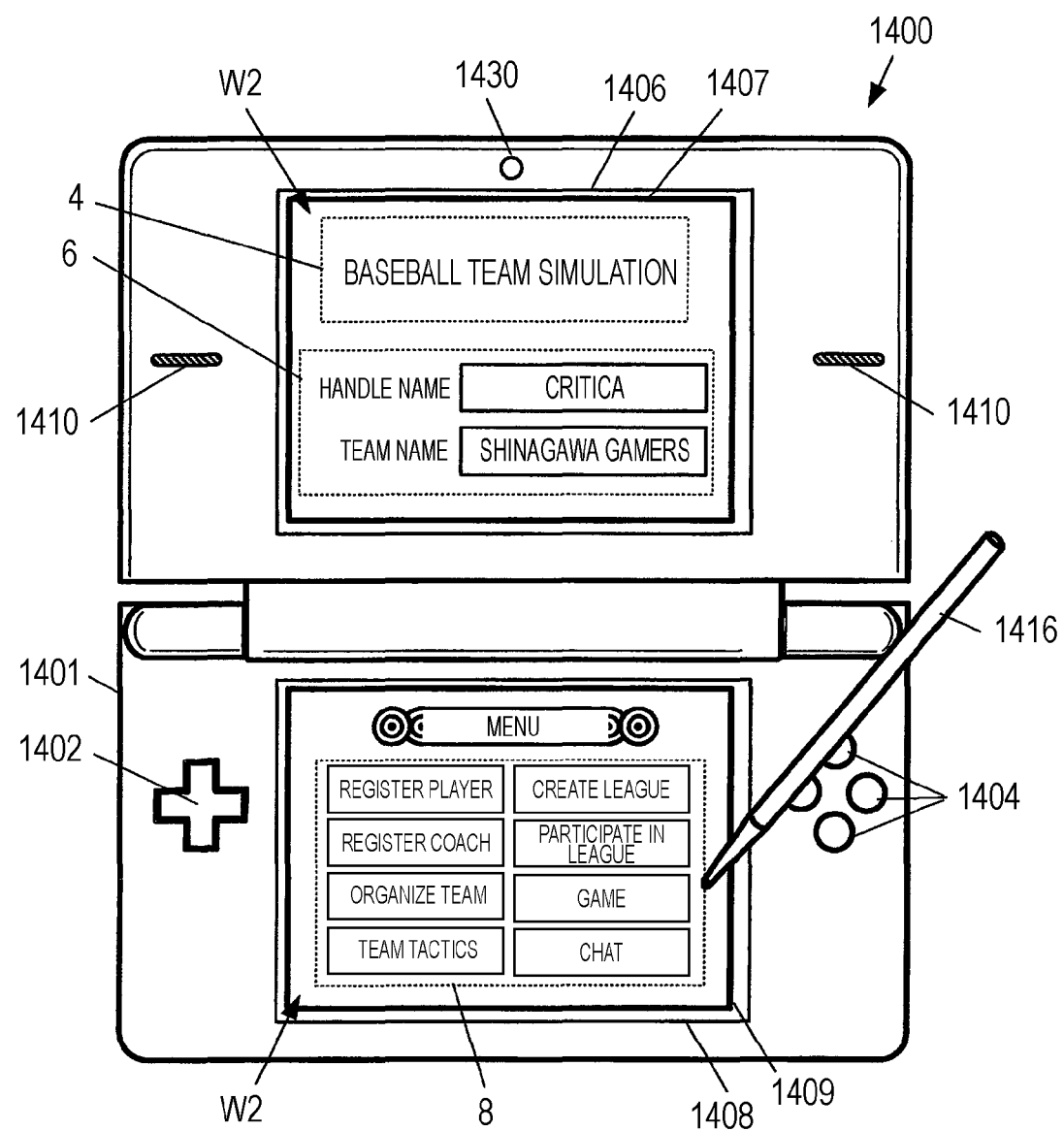
FIG. 3 illustrates an example of display of a menu screen.

Next, the outline of a baseball game according to this embodiment will be described with reference to FIG. 3 to FIG. 11. A user first starts the mobile game apparatus 1400 being a user terminal and executes a game screen display program. The mobile game apparatus 1400 is next connected to the server system 1100 via the communication line 1, and the user performs a predetermined sign-in procedure. As a result, a menu screen W2 as illustrated in FIG. 3 is displayed.

The mobile game apparatus 1400 of this embodiment is a dual display. The first liquid crystal display unit 1406 displays a title display 4 and an account display 6, and the second liquid crystal display unit 1408 displays a menu selection icon display 8 having a plurality of menu selection icons. A user may touch a menu selection icon requested by him/or her with the stylus pen 1416 to perform a selection operation or may use the direction input key 1402 and push switch 1404 to select one menu selection icon.

In order to enjoy a baseball game of this embodiment, a user may be required to register a player card 3b of the trading card 3 acquired by himself or herself to use it in the game. This is called "player registration".

If a "player registration" icon is selected from the menu selection icon display 8, the request information corresponding to the operation is transmitted from the mobile game apparatus 1400 to the server system 1100. If receiving the request information on the "player registration", the server system 1100 returns display information for displaying a player registration screen to the mobile game apparatus 1400 which has transmitted the information.

In the same manner, if some operation input is performed on the mobile game apparatus 1400, the request information corresponding to it is transmitted to the server system 1100. The server system 1100 executes the game management processing corresponding to the received request information and returns new display information and so on to the mobile game apparatus 1400.

Figure 4:
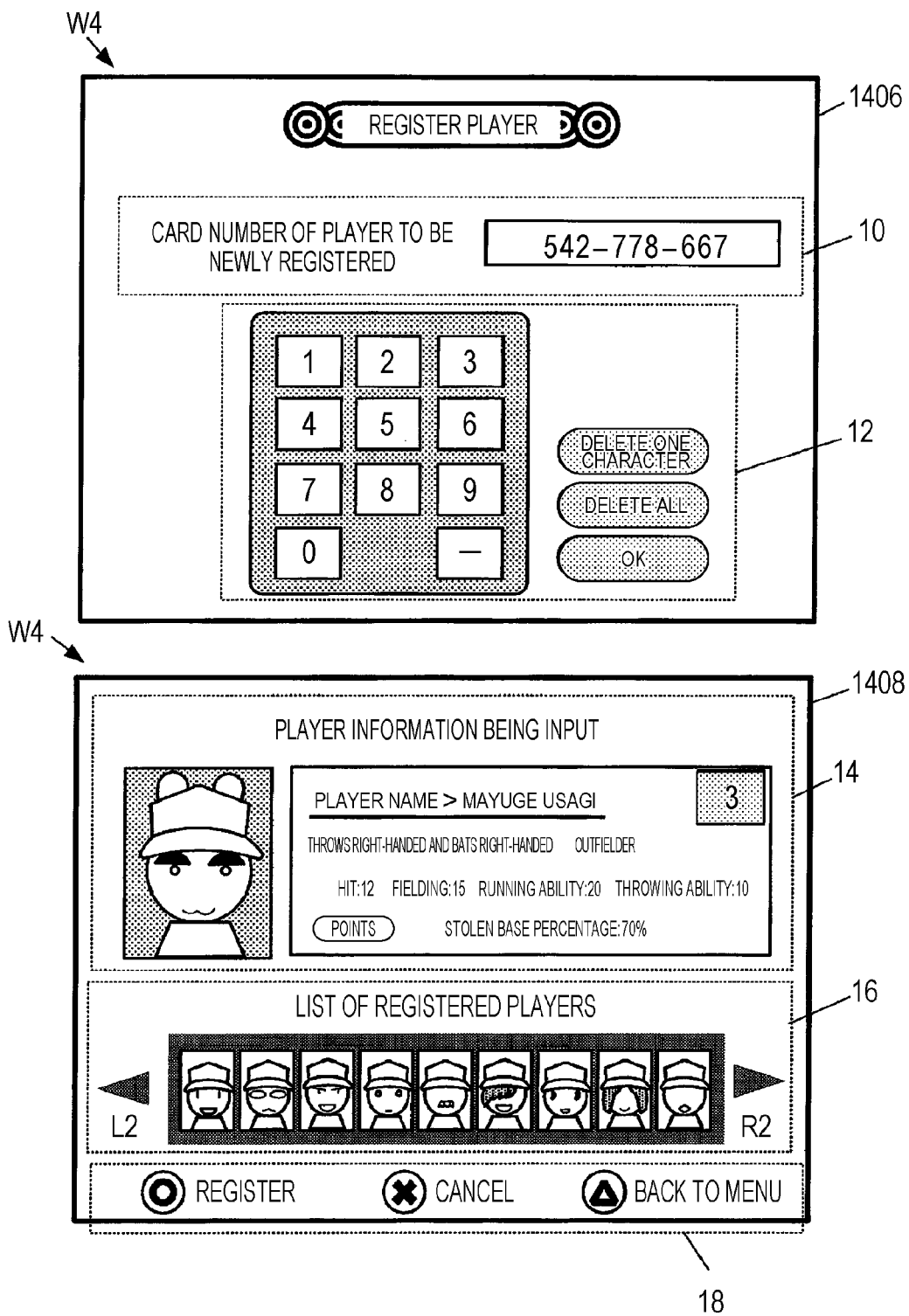
FIG. 4 illustrates an example of display of a player registration screen.

FIG. 4 illustrates a game screen displaying an example of a player registration screen W4 according to this embodiment, and the upper and lower parts of FIG. 4 are an upper screen and a lower screen, respectively.

The same is true in the drawings illustrating screens. The player registration screen W4 displays a card number input field 10 for inputting a card number of a card to be newly registered, a software keyboard 12 for inputting a card number, a player information display 14 which displays a description or ability value, for example, relating to the player corresponding to the input card number, a registered player list 16 displaying a player icon of the registered player, and an operation guiding display section 18. A user may check the content in the player information display 14 and perform a predetermined registration operation by following the operation guiding display section 18 to register the player if requesting to do so. After a requested player card 3b is registered and a menu back operation is performed to return to the menu screen, the menu screen W2 is displayed again.

In the same manner, if "COACH REGISTRATION" is selected from the menu selection icon display 8 on the menu screen W2, a coach card 3a may be registered like the "player registration" to install the corresponding coach as the team coach.

After the player registration and coach registration are performed, the user may organize the first team of his or her team by selecting and setting starting players, replacements, and a backup pitcher from the enabled players. For the team organization, "ORGANIZE TEAM" is selected from the menu selection icon display 8 of the menu screen W2. (Refer to FIG. 3).

Figure 5:
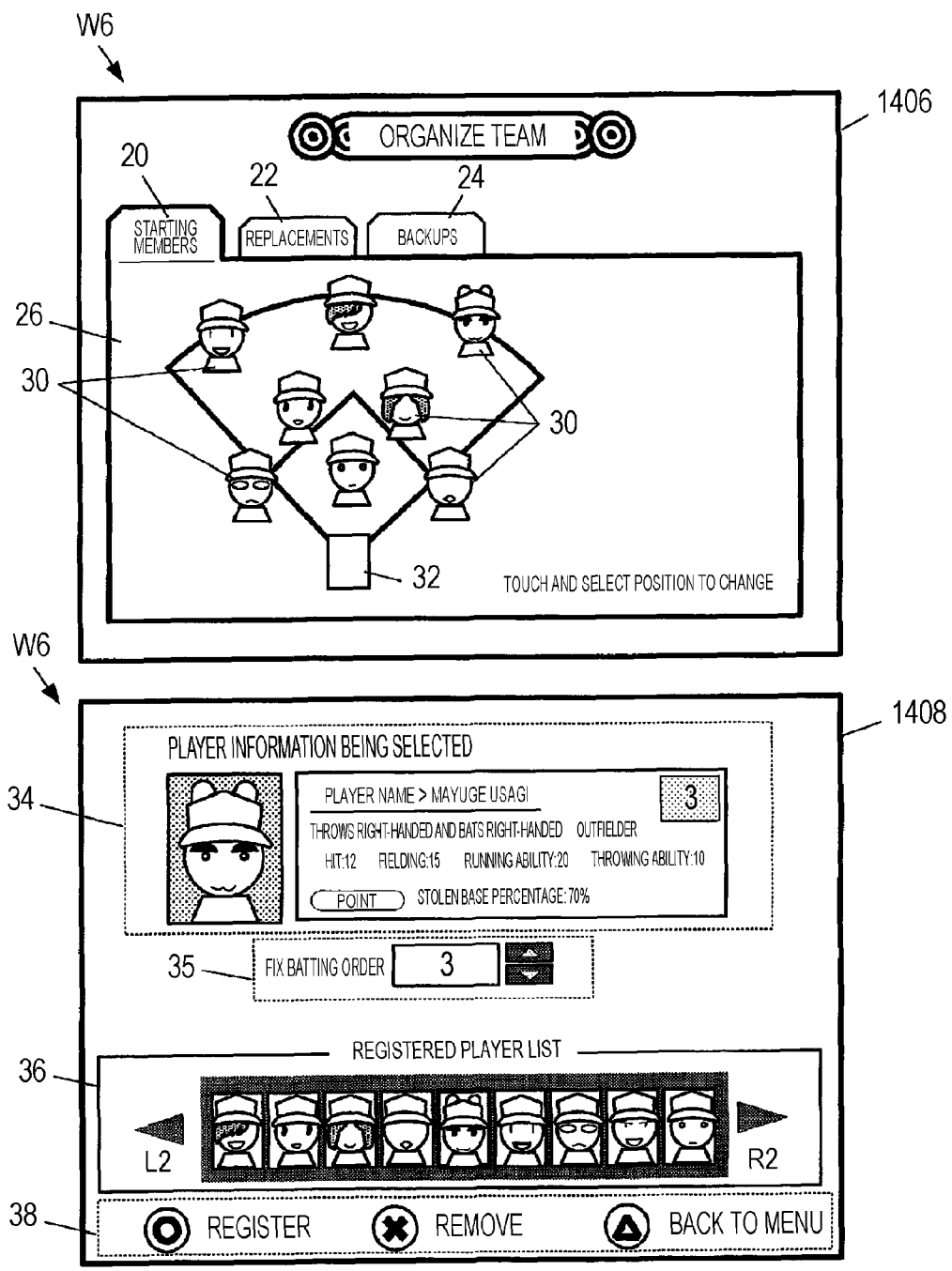
FIG. 5 illustrates an example of display of a team organization screen.

If "ORGANIZE TEAM" is selected, the mobile game apparatus 1400 displays a team organization screen W6, for example, as illustrated in FIG. 5. The team organization screen W6 displays a starting player organization tag 20 for switching to display a starting player organization screen, a replacement organization tag 22 for switching to display a replacement organization screen, and a backup pitcher organization tag 24 for switching to display a backup pitcher organization screen. A user selects the tag corresponding to the unit that he or she requests to organize.

If the starting player organization tag 20 is selected, a starting player set state display 26 is displayed. This display provides a player icon 30 of the player currently registered with a defensive position over the schematic bird's view of the field. A blank icon 32 is displayed at a defensive position with which no player is registered.

These icons can be selected by a touch operation with the stylus pen 1416 or an operation on the direction input key 1402 and push switch 1404. (Refer to FIG. 2). If one of the icons is selected on the starting player set state display 26, the information on the player registered with the defensive position is displayed on the player information display 34.

If a user requests to cancel a player currently registered with the selected defensive position, a predetermined "cancel" operation is performed in an operation guiding display section 38. In order to register a player with the selected defensive position, a player icon of a requested player is touched to select on the registered player list 36. The batting order of the player provided in the player information display 34 can be set in a batting order designation field 35.

If the replacement organization tag 22 is selected, a replacement is to be set. However, the organization operation can be performed similarly to the organization of starting players basically. More specifically, for example, a field for setting a replacement is displayed instead of the starting player set state display 26. The replacement setting field displays the player icon 30 of the player set in the field or the blank icon 32. If a replacement field is operated by touching with the stylus pen 1416, for example to activate for editing and a player requested to set to the replacement field to be edited is selected from the registered player list 36, the player information display 34 provides information on the selected player.

Similarly, if the backup pitcher organization tag 24 is selected, a backup pitcher can be set in the same manner as the replacement organization. More specifically, for example, setting fields for backup pitchers of two sections of "middle relief" and "relief" may be displayed on the screen, instead of the starting player set state display 26. Then, the field to be changed is selected with the stylus pen 1416, for example, and one of the players is selected from the registered player list 36 to edit the setting.

If the team organization completes, a user can set a behavior tendency of the organized team. According to this embodiment, how the game is to be developed may be selected in accordance with the condition during a game, or a tactic tendency may be set.

Figure 6:
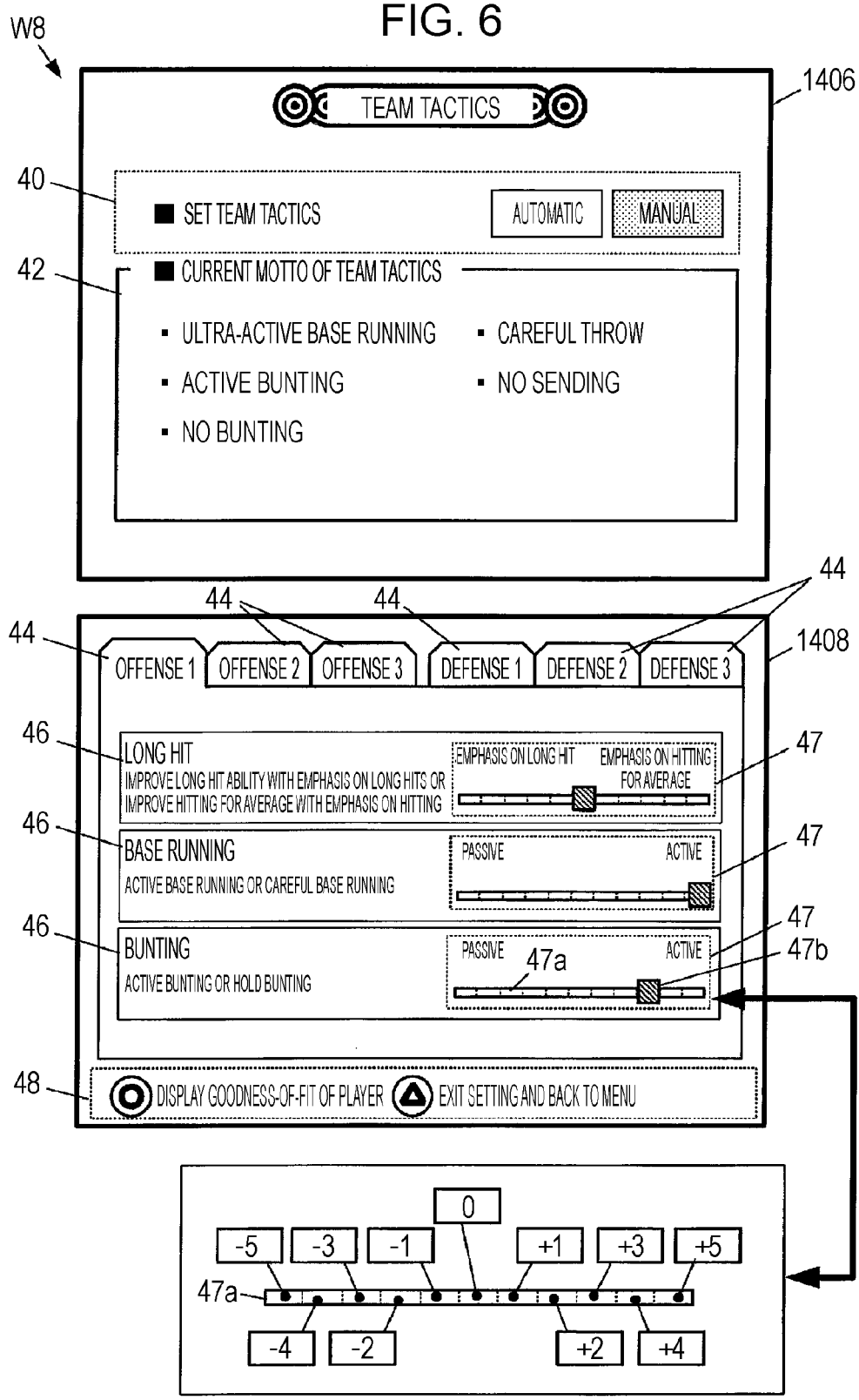
FIG. 6 illustrates an example of display of a team tactic setting screen.
Figure 7:
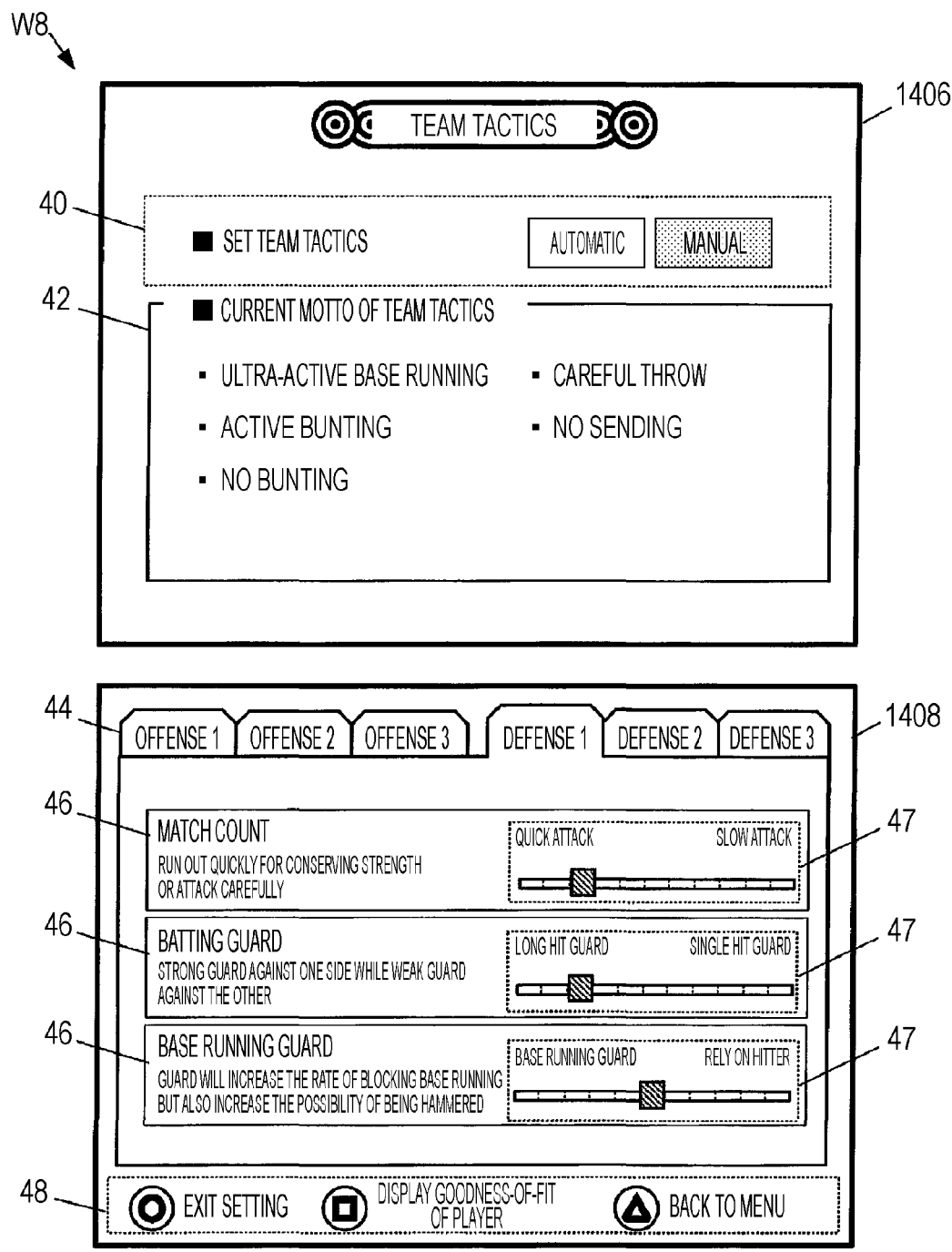
FIG. 7 illustrates an example of display of a team tactic setting screen.

More specifically, if "TEAM TACTICS" is selected in the menu selection icon display 8 on the menu screen W2 (refer to FIG. 3), the mobile game apparatus 1400 may display a team tactic setting screen W8 as illustrated in FIG. 6 or FIG. 7, for example. The screen displays a tactics setting method selection box 40, a tactic motto display 42, a plurality of tags 44 simultaneously displaying a plurality of team tactic tendency parameter setting operation sections 46, and an operation guiding display section 48.

The tactics setting method selection box 40 displays "AUTOMATIC" and "MANUAL" such that one of which can be selected. If "AUTOMATIC" is selected, the tactic tendency of a team is automatically determined by a computer operation. If "MANUAL" is selected, a user operates the team tactic tendency parameter setting operation section 46 for setting. For example, selection buttons for "AUTOMATIC" and "MANUAL" are displayed, and one of them is selected with a touch operation, for example.

The tactic motto display 42 displays an easy-to-understand motto describing the characteristic of the current team tactic tendency. A plurality of mottoes may be displayed if they satisfy the applicable characteristic.

The tags 44 may largely be divided into two of an offensive category and a defensive category in accordance with the displayed team tactic tendency parameter setting operation section 46. The total number of tags 44 may be set as required. FIG. 6 illustrates an example of the state where the tag 44 of the offensive category is selected. FIG. 7 illustrates an example of the state where the tag 44 of the defensive category is selected. The way of showing the team tactic tendency parameter setting operation section 46 is not limited to such a tag form. All team tactic tendency parameter setting operation sections 46 may be display in a scroll form.

The team tactic tendency parameter setting operation section 46 is prepared for each settable parameter. The "tactic tendency parameter" refers to a parameter which has an influence on the tendency of the selection of a factor characterizing a tactic. Each of the team tactic tendency parameter setting operation sections 46 includes a parameter name (such as "long hit" "base running" "match count" "batting guard"), a supporting description giving a hint for setting (such as "active base running or cautious base running" and "early match for strength preservation or thorough offense"), and a parameter value setting section 47 for inputting a set value of the parameter.

The parameter value setting section 47 of this embodiment has a horizontal axis 47a with left and right ends indicating the both extreme states of the parameter and a lever 47b which can be moved to the left and right on the horizontal axis 47a. The lever 47b may be used for inputting a set value. More specifically, the lever 47b is controlled its movement so as to click stop at any one of 11 steps. The 11 steps are assigned set values "−5" to "+5" including "0" on arithmetic processing.

The types and number of settable tactic tendency parameters may be set as required in accordance with the content of a game. Since this embodiment relates to a baseball game, the parameters are "long hit", "base running", "match count", "batting guard" and so on. However, for example, if the game is a soccer game, the parameters may be "fast-break oriented/slow-break-oriented", "zone-press-oriented/man-mark-oriented", "depth of defense line" and "vertical-oriented/horizontal-oriented of pass line" in offense. In a role-playing game (RPG), the settable parameters may be "magic-oriented/magic-refrained" and "active use/passive use of recovery spell", for example.

Detail or rough steps of set values selectable in the parameter value setting section 47 may be possible in accordance with the type of parameter to be set or the assumed age bracket of users or in accordance with the content of the game. The numerical values to be assigned can be set as required.

Figure 8:
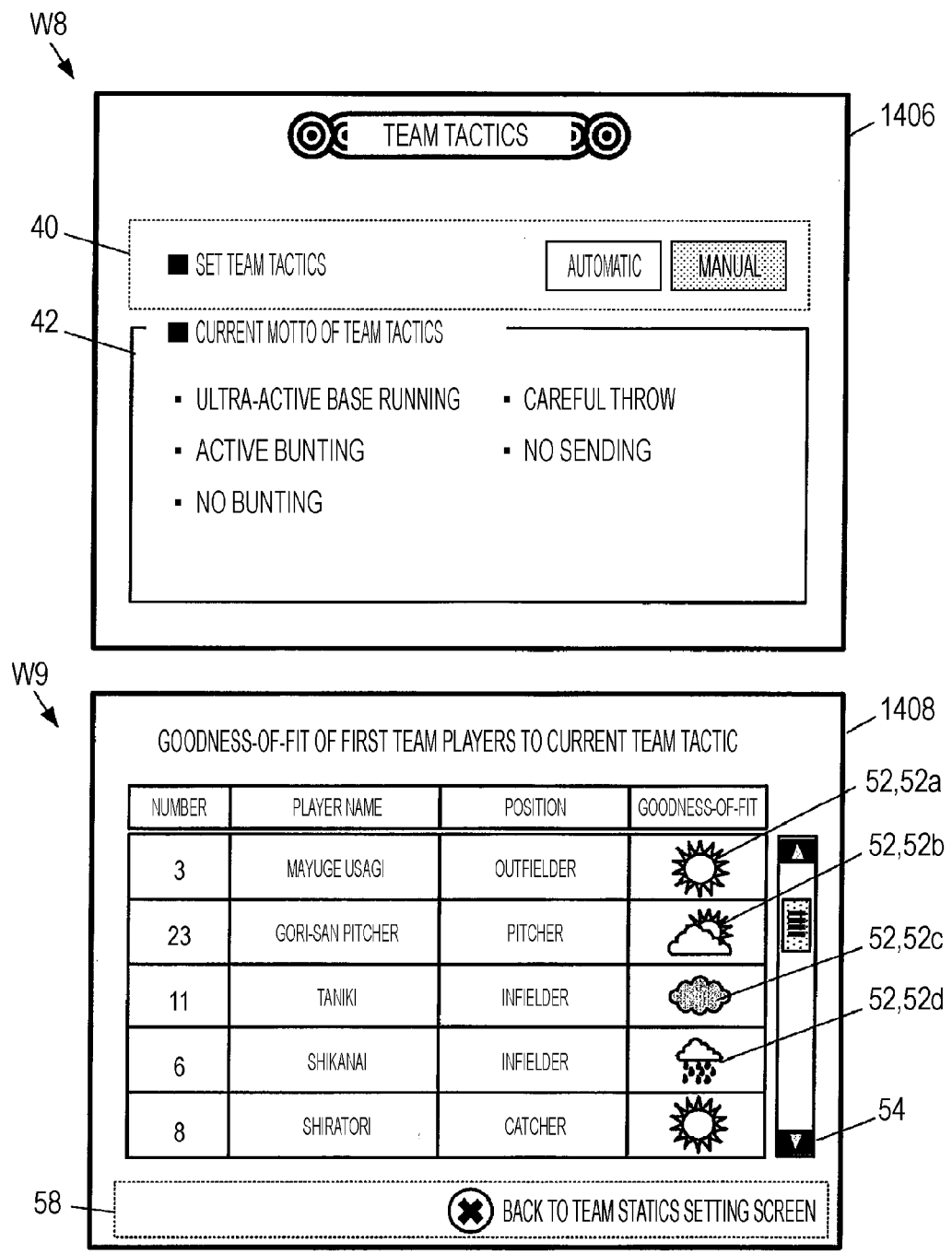
FIG. 8 illustrates an example of display of a goodness-of-fit indicator screen.

If a predetermined "DISPLAY GOODNESS-OF-FIT OF PLAYER" operation is performed through the operation guiding display section 48 on the team tactic setting screen W8, the display of the second liquid crystal display unit 1408 is changed to a goodness-of-fit screen W9, for example, as illustrated in FIG. 8.

The term "goodness-of-fit" refers to the degree of matching or chemistry between a behavior tendency of the whole team (whole inclination) and individual behavior tendencies predetermined for members of the first team (individual inclinations). The "inclination" is a qualitative expression and is calculated actually by using the value of inclination, that is, an inclination value. According to this embodiment, the same tactic tendency parameter can be preset for each player as one which can be set for the team tactics. This is called an "individual tactic tendency parameter". According to this embodiment, the "goodness-of-fit" is expressed by the magnitude of the difference between the value of the team tactic tendency parameter (whole inclination value) and the value of the individual tactic tendency parameter (individual inclination value).

On the goodness-of-fit screen W9, the first team formed by starting players, backup players and backup pitchers is associated with goodness-of-fit indicators 52 showing player's numbers, player's names, defensive positions, and goodness-of-fits. They are displayed in a list which can be scrolled with a scroll bar 54.

The goodness-of-fit indicators 52 may be a series of magnitude correlations, numbers that exhibits levels, symbols, patterns, for example. According to this embodiment, a sunny mark 52 (52a), a sunny-with-occasional-cloudy mark 52 (52b), a cloudy mark 52 (52c), a rainy mark 52 (52d) and so on are used in accordance with the goodness-of-fits. When the difference in set value of the tactic tendency parameter is small between a team and an individual player, that is, when the goodness-of-fit is high, the goodness-of-fit indicator 52 is assigned the sunny mark 52 (52a). In order to show the drop of the goodness-of-fit, the sunny mark 52 (52a), sunny-with-occasional-cloudy mark 52 (52b), cloudy mark 52 (52c) and rainy mark 52 (52d) are assigned in the decreasing order of application.

A user may watch the display of the goodness-of-fit screen W9 to check how much the team tactics determined by himself or herself fit to the tactics orientations that the members of the team originally have. The higher goodness-of-fit of the players, the better. However, when players have lower goodness-of-fit, the user may be troubled by team running regarding whether "AUTOMATIC" is to be set as the tactics setting method for the game, "MANUAL" is to be kept while changing the team tactics in accordance with the current team organization, or the team organization is to be changed such that players fitting to the team tactics requested by the user can join his or her team.

If "AUTOMATIC" is selected in the tactics setting method selection box 40, the computer arithmetic processing automatically determines the set value of the tactic tendency parameter of the team on the basis of the set values of the individual tactic tendency parameter of the players organizing the teams. From the viewpoint of goodness-of-fit, suitable tactics to some extent are selected for the team organization though it does not guarantee the best. It further does not guarantee that the state that the user wishes is always given. Alternatively, the selection of "AUTOMATIC" may be eliminated, and whether "MANUAL" is to be set or not may be selected. In this case, if "MANUAL" is not set, a standard value may be selected. (For example, the set value of the tactic tendency parameter may be a predetermined value (such as zero (0)).

If a user performs a predetermined "BACK TO TEAM TACTIC SETTING SCREEN" operation through an operation guiding display section 58 on the goodness-of-fit screen W9, the game screen returns to the team tactic setting screen W8 again. (Refer to FIG. 6 and FIG. 7). If a user selects "EXIT SETTING AND BACK TO MENU" through the operation guiding display section 48, the display returns to the menu screen W2. (Refer to FIG. 3).

If the team organization and setting the team tactics complete, the user determines the league that his or her organized team will participate in. The league that his or her team can participate in may be created by himself or herself or may be selected from the leagues already created by other users.

Figure 9:
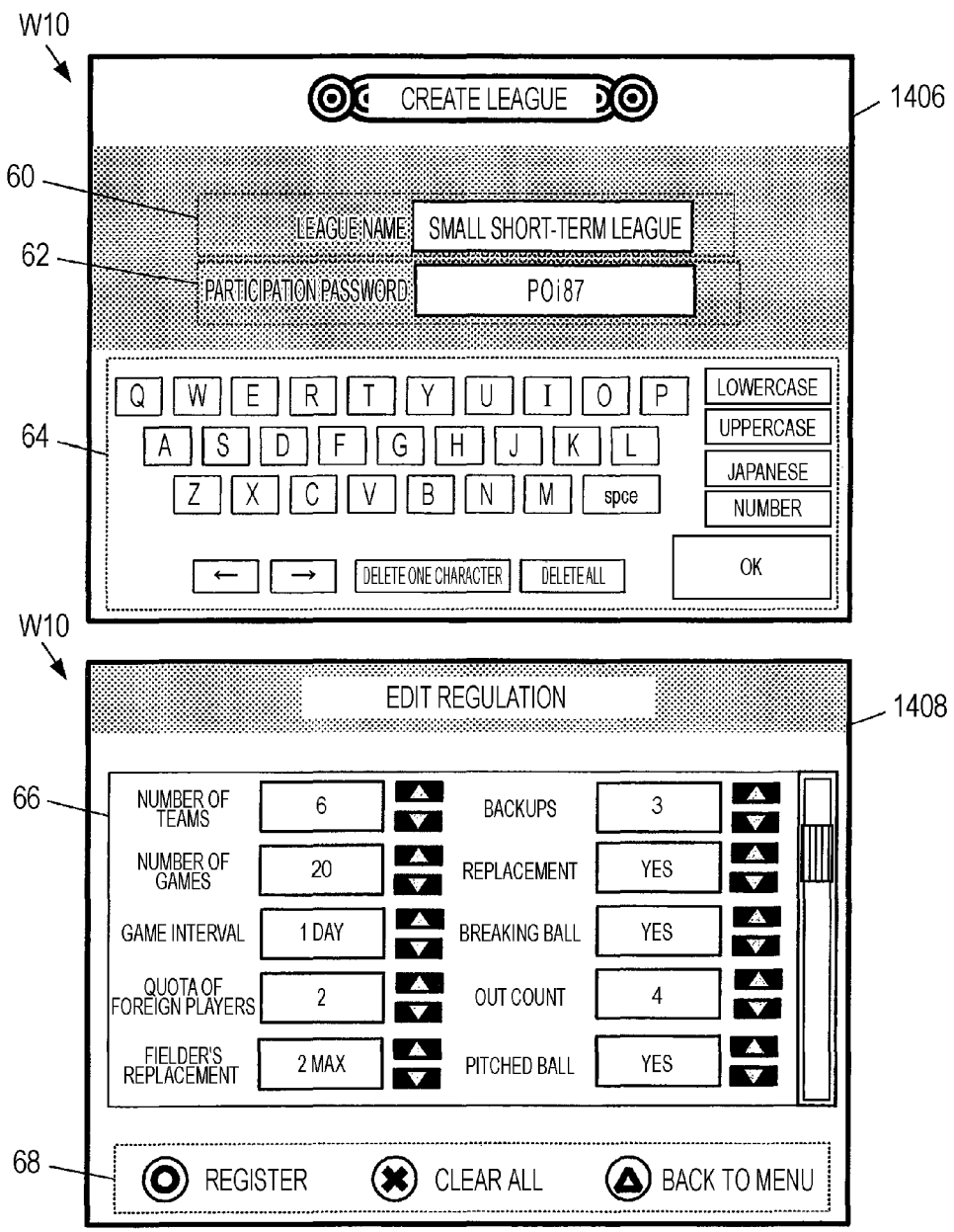
FIG. 9 illustrates an example of display of a league creation screen.

If "CREATE LEAGUE" is selected in the menu selection icon display 8 on the menu screen W2 (refer to FIG. 3), the mobile game apparatus 1400 displays a league creation screen W10 as illustrated in FIG. 9, for example. The screen displays a league ID setting box 60 for setting a league name, a participation password setting box 62 for setting a password required for participating in the league, software keyboard 64 for inputting a league name, characters and numbers of the password, a regulation setting section 66, and an operation guiding display section 68.

The regulation setting section 66 displays a plurality of combinations of a regulation item of the league and an item selection field for selecting the setting detail of the item in a pull-down form.

On the league creation screen W10, a user can freely set a league name, a participation password and a regulation. If a predetermined "REGISTER" operation is performed through the operation guiding display section 68, a new league is registered. The league name and the participation password can be spread by the user separately by informing them to close friends. In other words, a league may be formed by close friends to enjoy a game.

Figure 10:
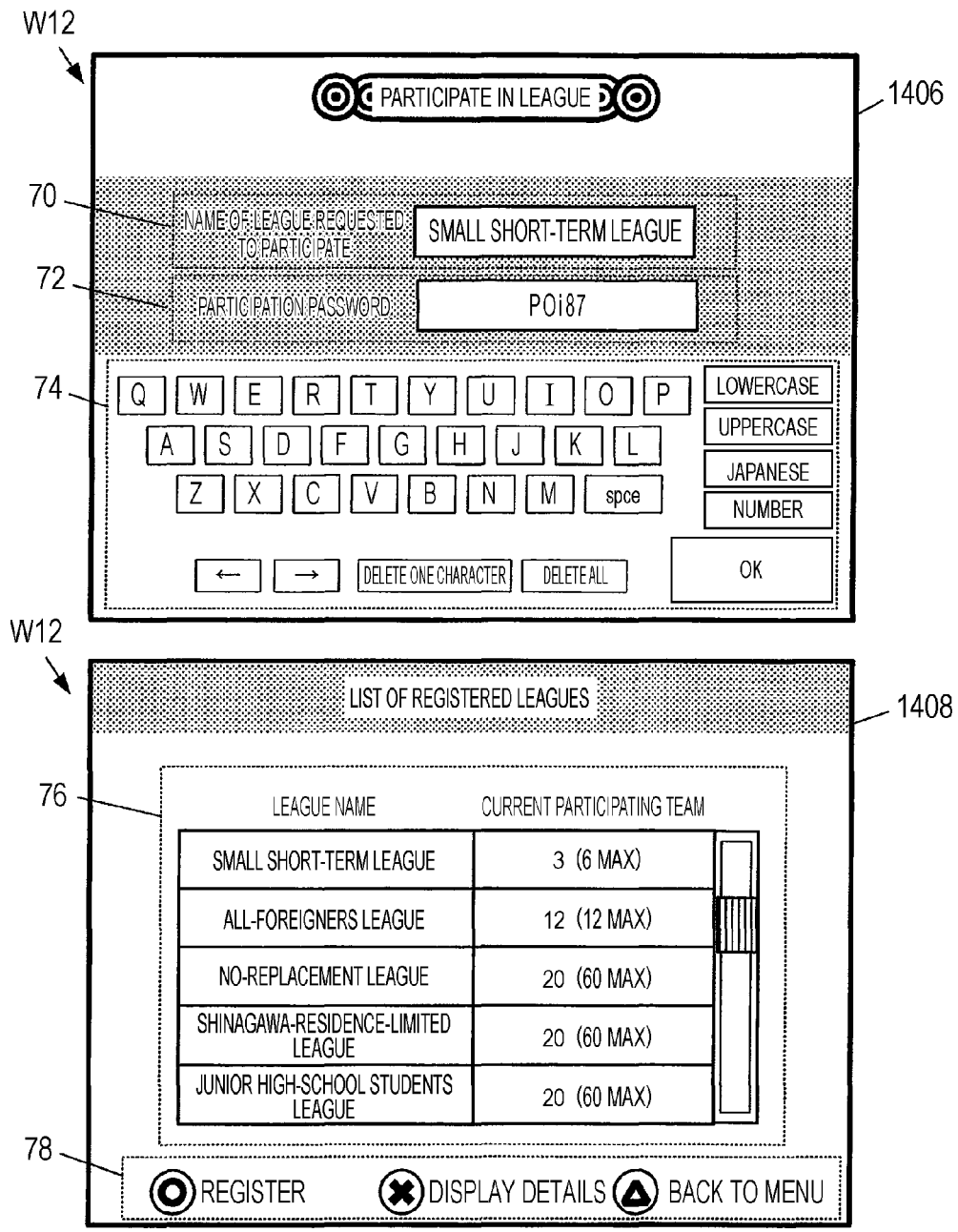
FIG. 10 illustrates an example of display of a participating league setting screen.

If "PARTICIPATE IN LEAGUE" is selected in the menu selection icon display 8 on the menu screen W2 (refer to FIG. 3), the mobile game apparatus 1400 displays a participating league setting screen W12, for example, as illustrated in FIG. 10. The screen displays a league ID input box 70 for inputting the league ID requested to participate, a password input box 72 for inputting a password required for participation, a software keyboard 74 for inputting a league ID and/or the characters and/or numbers of a password, a league list display section 76 for display information on the registered league, and an operation guiding display section 78.

A user may select a league name (league ID according to this embodiment) requested to participate by performing a touch operation on the league name displayed on the league list display section 76 or by inputting with the software keyboard 74. Then, the user may input with the software keyboard 74 the participation password for the league which is acquired in advance and perform a predetermined registration operation through the operation guiding display section 78. Thus, it is set such that the user's team can participate in the input league.

After the team organization and the registration of the league that the team will participate in complete, the user is allowed to cause his or her team to fight with other user's teams.

Figure 11:
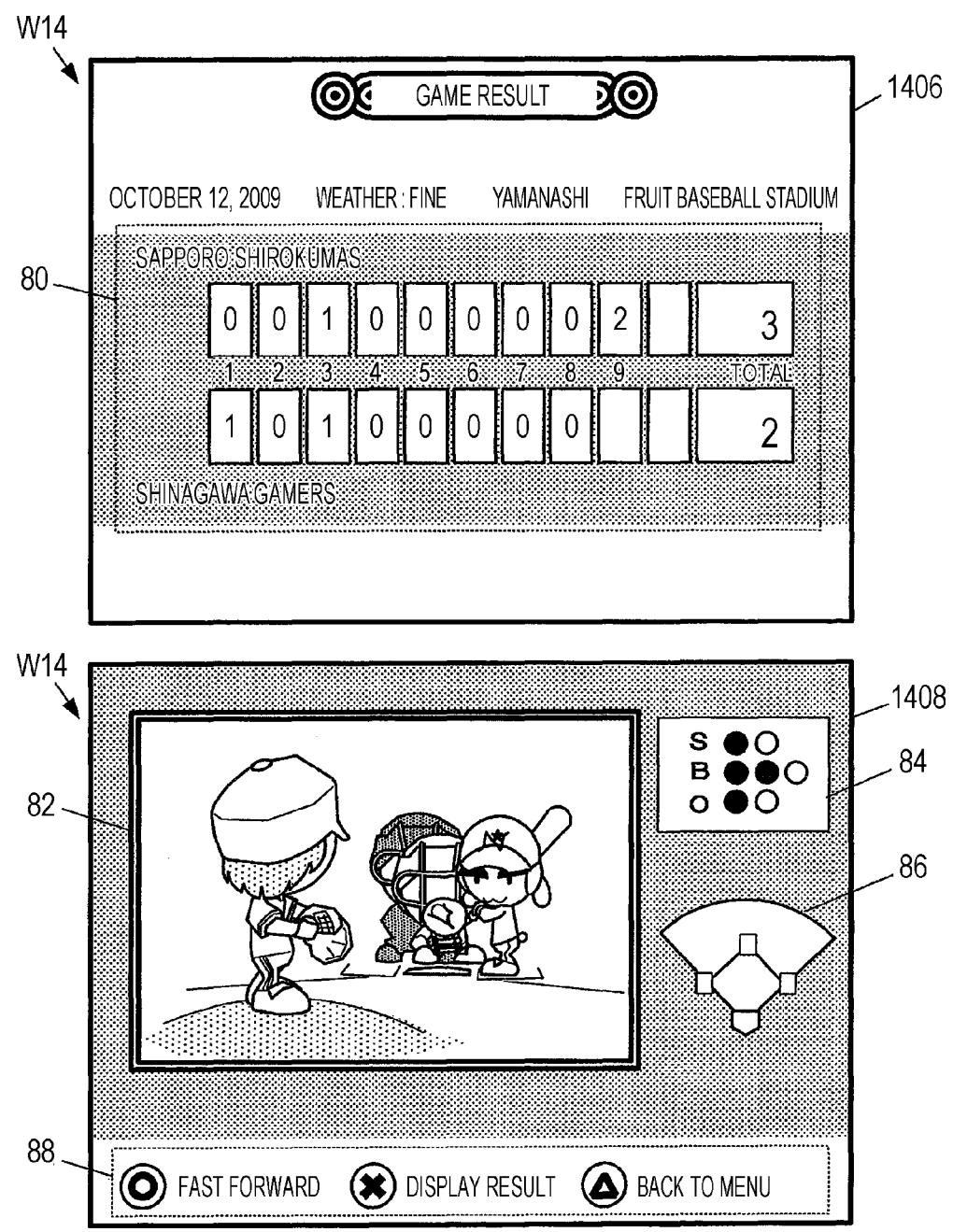
FIG. 11 illustrates an example of display of a game simulation screen.

If "GAME" is selected in the menu selection icon display 8 on the menu screen W2 (refer to FIG. 3), simulation processing on a game of the user's team and another team in the same league (that is, game automatic control) in the server system 1100. The result is transmitted to the mobile game apparatus 1400 as required. The mobile game apparatus 1400 displays a game simulation screen W14, for example, as illustrated in FIG. 11.

The game simulation screen W14 displays a score board 80, a game screen display 82, a count indicator 84, a runner advance status display 86, an operation guiding display section 88.

The game screen display 82 displays an image of a state of a game. The game image is an image reproducing the game development condition as a result of the execution of a simulation of a game in the server system 1100. The processing relating to generation of display information for displaying a game image and display of a game screen in the mobile game apparatus 1400 based on the display information can be implemented in the same manner as the display of a screen of game play in a publicly known CGI game.

A user may watch the team that he or she has organized in a game on the game simulation screen W14 and enjoys the outcome of the game together with his/her friend participating in the same league.

Description on Function Blocks

Next, a functional configuration of this embodiment will be described.

Figure 12:
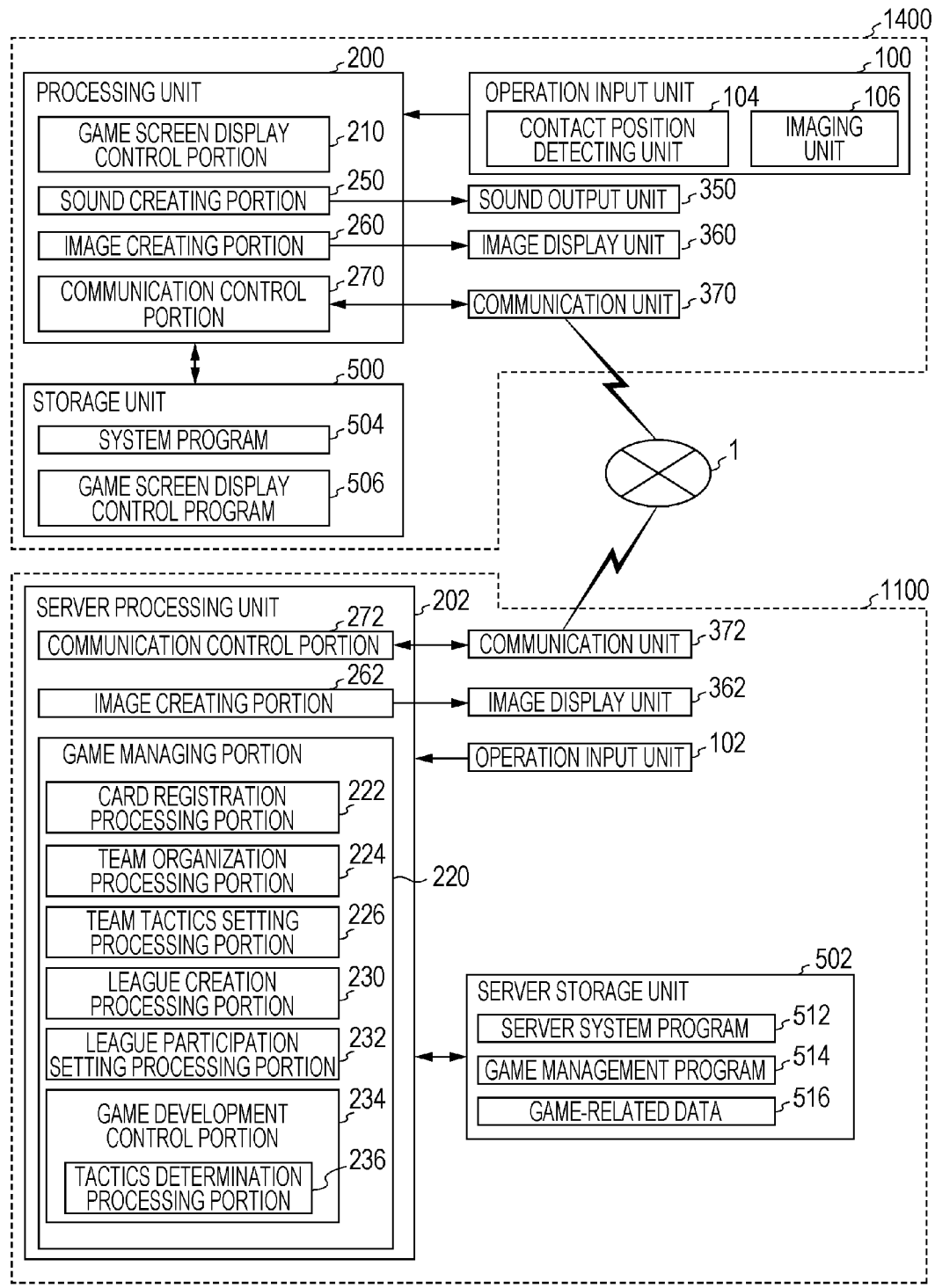
FIG. 12 is a functional block diagram illustrating examples of functional configurations of a mobile game apparatus which is a user terminal and a server system.

FIG. 12 is a functional block diagram illustrating examples of functional configurations of the mobile game apparatus 1400 which is a user terminal according to this embodiment and the server system 1100.

The mobile game apparatus 1400 includes an operation input unit 100, a processing unit 200, a sound output unit 350, an image display unit 360, a communication unit 370, and a storage unit 500.

The operation input unit 100 outputs an operation input signal in accordance with an operation input performed by a user to the processing unit 200. For example, the operation input unit 100 may be implemented by a push switch, a joystick, a touch pad, a trackball, a multi-axial detection type acceleration sensor having two or more detection axes or uni-axial detection type acceleration sensor unit combining different axial directions of detection, or a multi-direction detection type tilt sensor allowing at least two or more detection directions or uni-direction detection type tilt sensor unit combining different detection directions. The direction input key 1402, push switch 1404, and tri-axial acceleration sensor 1422 in FIG. 2 correspond thereto.

The operation input unit 100 includes a touched position detecting portion 104 and an imaging unit 106. The touched position detecting portion 104 may be implemented by a device which can detect a touched position on a display screen range. The touch panels 1407 or 1409 in FIG. 2 correspond thereto.

The imaging unit 106 is means for acquiring image information and may be implemented by a sensor or a CMOS Image sensor, for example. The image sensor 1430 in FIG. 2 corresponds thereto. In a configuration that a bar code or QR code is given as card information on the coach card 3 (3a) or player card 3 (3b), the code is preferably read by the imaging unit 106.

The processing unit 200 may be implemented by a microprocessor such as a CPU and a GPU or an electronic part such as an ASIC (application-specific integrated circuit) and an IC memory, for example, and data input/output control is performed between function units including the operation input unit 100 and storage unit 500. The processing unit 200 performs arithmetic processing on the basis of a predetermined program or data and an operation input signal from the operation input unit 100 and controls the operations by the mobile game apparatus 1400. The control unit 1450 in FIG. 2 corresponds to the processing unit 200. The processing unit 200 according to this embodiment includes a game screen display control portion 210, a sound creating portion 250, an image creating portion 260, and a communication control portion 270.

The game screen display control portion 210 performs processing of receiving display information from the server system 1100, displaying game screens such as the menu screen W2, player registration screen W4, team organization screen W6, team tactic setting screen W8, goodness-of-fit indicator screen W9, league creation screen W10, participating league setting screen W12 and game simulation screen W14, and transmitting request information to the server system 1100 in accordance with the operation performed on the operation input unit 100 in the game screen.

More specifically, the game screen display control portion 210 may be implemented by using a web technology which actively controls screen display by using Java (registered trademark) and/or CSS (Cascading Style Sheets) along with HTML on the basis of a web browser or an active plug-in such as Adobe Flash (Adobe is a registered trademark) but may be implemented by other methods.

The sound creating portion 250 may be implemented by a digital signal processor (DSP), a processor such as a sound synthesis IC, or an audio codec which can reproduce a sound file, for example. The sound creating portion 250 generates a sound signal of a sound effect, BGM or an operation sound relating to a game on the basis of the processing result by the game screen display control portion 210 and outputs it to the sound output unit 350.

The sound output unit 350 may be implemented by an apparatus which outputs the sound of a sound effect, BGM or the like on the basis of the sound signal input from the sound creating portion 250. The speaker 1410 in FIG. 2 corresponds thereto.

The image creating portion 260 may be implemented by a processor such as a GPU and a digital signal processor (DSP), a video signal IC, a program such as a video codec, or a rendering frame IC memory such as a frame buffer, for example. The image creating portion 260 generates one game screen every one frame time (such as 1/60 seconds) on the basis of the processing result by the game screen display control portion 210 and outputs the image signal of the generated game screen to the image display unit 360.

The image display unit 360 displays a game image on the basis of an image signal input from the image creating portion 260. The image display unit 360 may be implemented by an image display device such as a flat panel display, a cathode-ray-tube (CRT), a projector, and a head mount display, for example.

According to this embodiment, the first liquid crystal display unit 1406 and second liquid crystal display unit 1408 in FIG. 2 correspond thereto.

The communication control portion 270 performs data processing relating to data communication and implements data exchange with an external device through the communication unit 370.

The communication unit 370 is connected to the communication line 1 to implement communication. The communication unit 370 may be implemented by a radio communication apparatus, a modem, a TA (terminal adapter) or a jack or control circuit for a communication cable for wired communication, for example. The radio communication module 1412 in FIG. 2 corresponds thereto.

The storage unit 500 stores a system program which implements a function for causing the processing unit 200 to totally control the mobile game apparatus 1400 and a program and/or data required for game play. The storage unit 500 is further used as a work area of the processing unit 200 and temporarily stores operation results of a program executed by the processing unit 200 and/or input data input from the operation input unit 100. This function may be implemented by an IC memory such as a RAM and a ROM, a magnetic disk such as a hard disk, or an optical disk such as a CD-ROM and a DVD, for example. The IC memory or memory card 1440 mounted in the control unit 1450 in FIG. 2 corresponds thereto.

According to this embodiment, the storage unit 500 stores a system program 504 and a game screen display control program 506. The system program 504 is a program for implementing a basic function of input/output as a computer of the mobile game apparatus 1400. The game screen display control program 506 is application software read and executed by the processing unit 200 to implement a function as the game screen display control portion 210. Alternatively, the game screen display control program 506 may be built in a part of the system program 504.

The server system 1100 according to this embodiment includes an operation input unit 102, a server processing unit 202, an image display unit 362, a communication unit 372, and a server storage unit 502.

The operation input unit 102 is means for inputting an operation for control over a server and may be implemented similarly to the operation input unit 100 in the mobile game apparatus 1400. The keyboard 1106 in FIG. 1 corresponds thereto.

The server processing unit 202 may be implemented by a microprocessor such as a CPU and a GPU or an electronic part such as an ASIC (application-specific integrated circuit) and an IC memory, for example and perform data input/output control with functions including the operation input unit 102 and server storage unit 502. The server processing unit 202 performs arithmetic processing on the basis of a predetermined program or data or an operation input signal from the operation input unit 102 and totally controls an operation by the server system 1100. According to this embodiment, the server processing unit 202 includes a game managing portion 220, an image creating portion 262, and a communication control portion 272.

The game managing portion 220 performs processing relating to generation of display information for displaying a game screen on a user terminal, management of information on a player who participates in a baseball team simulation game, management of information on settings o a team, team tactics settings and player's ability change according to the settings, a simulation and so on.

More specifically, the game managing portion 220 includes a card registration processing portion 222, a team organization processing portion 224, a team tactics setting processing portion 226, a league creation processing portion 230, a league participation setting processing portion 232, and a game development control portion 234. The game development control portion 234 further includes a tactic determination processing portion 236.

The card registration processing portion 222 registers a trading card 3 (coach card 3a or player card 3b; refer to FIG. 1) and performs processing for enabling the trading card 3 to be used by a user in a game. For example, the card registration processing portion 222 may generate display information (refer to FIG. 4) on the player registration screen W4, checks the card number and creates a list of players of registered cards.

The team organization processing portion 224 generates display information for displaying the team organization screen W6 (refer to FIG. 5) on a user terminal and performs processing of organizing the user's team in accordance with an operation input in the user terminal on the team organization screen W6, that is, processing relating to organization of starting players, processing relating to organization of replacements, and processing of organization of backup pitchers. The processing relating to organization of replacements includes processing of setting the purposes of change of replacements.

The team tactics setting processing portion 226 determines the tendency of the whole team regarding a predetermined tactic determination factor. According to this embodiment, the team tactics setting processing portion 226 performs processing of generating information required for displaying the team tactic setting screen W8 and goodness-of-fit indicator screen W9 in the user terminal, receiving setting information set by a user in the user terminal, and storing data setting the team tactics of the team of the user using the terminal to the server storage unit 502. In other words, the team tactics setting processing portion 226 performs various processes relating to setting of team tactics.

With the setting of the team tactics, the team tactics setting processing portion 226 performs processing of determining the player's individual goodness-of-fits to team tactics from the set values of the team's tactic tendency parameter and individual tactic tendency parameters of the first team members and changing the abilities of the players in accordance with the determined goodness-of-fits.

The league creation processing portion 230 performs processing relating to creation of a framework of a population for selecting the team to match on the basis of a user's operation input. More specifically, the league creation processing portion 230 performs processing for setting an ID of a league such as a name, a requirement (including a password) for participating in the population, and a regulation to be applied to the match with the team selected from the population. More specifically, the league creation processing portion 230 performs processing of generating display information on the league creation screen W10 and storing league setting information in the server storage unit 502 on the basis of an operation input on the screen. If the matches are not executed in a league but in a tournament, the population is the tournament.

The league participation setting processing portion 232 performs procedure processing for allowing the team created by a user to participate in the population created by the league creation processing portion 230. More specifically, the league participation setting processing portion 232 performs processing of generating display information for displaying the participating league setting screen W12 in a user terminal and performing participation registration on the basis of an operation input on the screen.

The game development control portion 234 is one function block which implements automatic control over a match and performs simulation processing on a baseball game according to this embodiment. In other words, member players of a user's team and another team in the same league are controlled by a predetermined program (what-is-called AI control, for example) to determine the respective behaviors and simulate a baseball game. The display information for displaying the simulated game image in a user terminal is then generated. The game development control portion 234 according to this embodiment includes a tactic determination processing portion 236.

The tactic determination processing portion 236 is one function block which implements automatic control over a match and determines offensive and defensive tactics and how players are to behave in offense and defense on the basis of the tendency of a tactics determination factor for the whole team.

More specifically, when the tactics setting method for the team tactics is set to "AUTOMATIC", offensive tactics and defensive tactics are determined on the basis of the tendency relating to a tactics determination factor for a whole team, the tendency determined for main characters of the team (a pitcher, a batter and a coach in this embodiment or characters having a strong influence on tactics selection in scenes), and a game development condition.

More specifically, on the basis of the individual tactic tendency parameters of the member players of the first team including starting players, backups and backup pitchers, a basic offensive tactic tendency parameter 660 and basic defensive tactic tendency parameter 662 are calculated. (Refer to FIG. 27). Next, the set values of the individual tactic tendency parameters 530 (refer to FIG. 15) of the players having an influence on the tactics determination at that time (a pitcher and a batter in this embodiment) are added to the basic offensive tactics parameter for each type of parameter to calculate the middle offensive tendency parameter 664 and middle defensive tendency parameter 666. They are then added the set value of the individual tactic tendency parameter 530 of the coach for each type of parameter to calculate a final offensive tactic tendency parameter 668 and final defensive tactic tendency parameter 670 to be finally provided for the tactics selection. Specific tactic is selected on the basis of the final offensive tactic tendency parameter 668 and final defensive tactic tendency parameter 670 and conditions for determining the tactics.

On the other hand, when the tactics setting method for team tactics is set to "MANUAL", the basic offensive tactic tendency parameter 660 and basic defensive tactic tendency parameter 662 are calculated from tactic tendency parameter values stored in the team tactics setting data 620 of team setting data 600. The method for calculating the middle and final offensive tactic tendency parameters and final defensive tactic tendency parameter from the basic offensive tactic tendency parameter 660 and basic defensive tactic tendency parameter 662 is the same as that for the "AUTOMATIC" setting.

The image creating portion 262 generates an image relating to maintenance of the server system 1100 and outputs it to the image display unit 362. In order to transmit information on a still picture or moving picture which is display information on a game screen, a function for creating it may be provided.

The image display unit 362 displays an image for system management on the basis of an image signal input from the image creating portion 262. The image display unit 362 may be implemented by an image display device such as a flat panel display, cathode-ray-tube (CRT), a projector, and a head mount display, for example. The display monitor 1108 in FIG. 1 corresponds thereto.

The communication control portion 272 performs data processing relating to data communication and implements data exchange with an external device through the communication unit 372.

The communication unit 372 is connected to the communication line 1 to implement communication. The communication unit 372 may be implemented by a radio communication apparatus, a modem, a TA (terminal adapter) or a jack or control circuit for a communication cable for wired communication, for example.

The server storage unit 502 stores a system program which implements a function for causing the server processing portion 202 to totally control the server system 1100 and a program and/or data required for managing a game. The server storage unit 502 is further used as a work area of the server processing portion 202 and temporarily stores operation results of a program executed by the server processing portion 202 and so on. This function may be implemented by an IC memory such as a RAM and a ROM, a magnetic disk such as a hard disk, or an optical disk such as a CD-ROM and a DVD, for example. The information storage medium such as the IC memory or hard disk mounted in the blade server 1102 in FIG. 1 corresponds thereto.

The server storage unit 502 of this embodiment stores a server system program 512, a game management program 514, and game-related data 516.

The server system program 512 is read and executed by the server processing unit 202 to implement a fundamental input/output function required for the server system 1100. The game management program 514 is read and executed by the server processing unit 202 to implement the function as the game managing portion 220.

Figure 13:
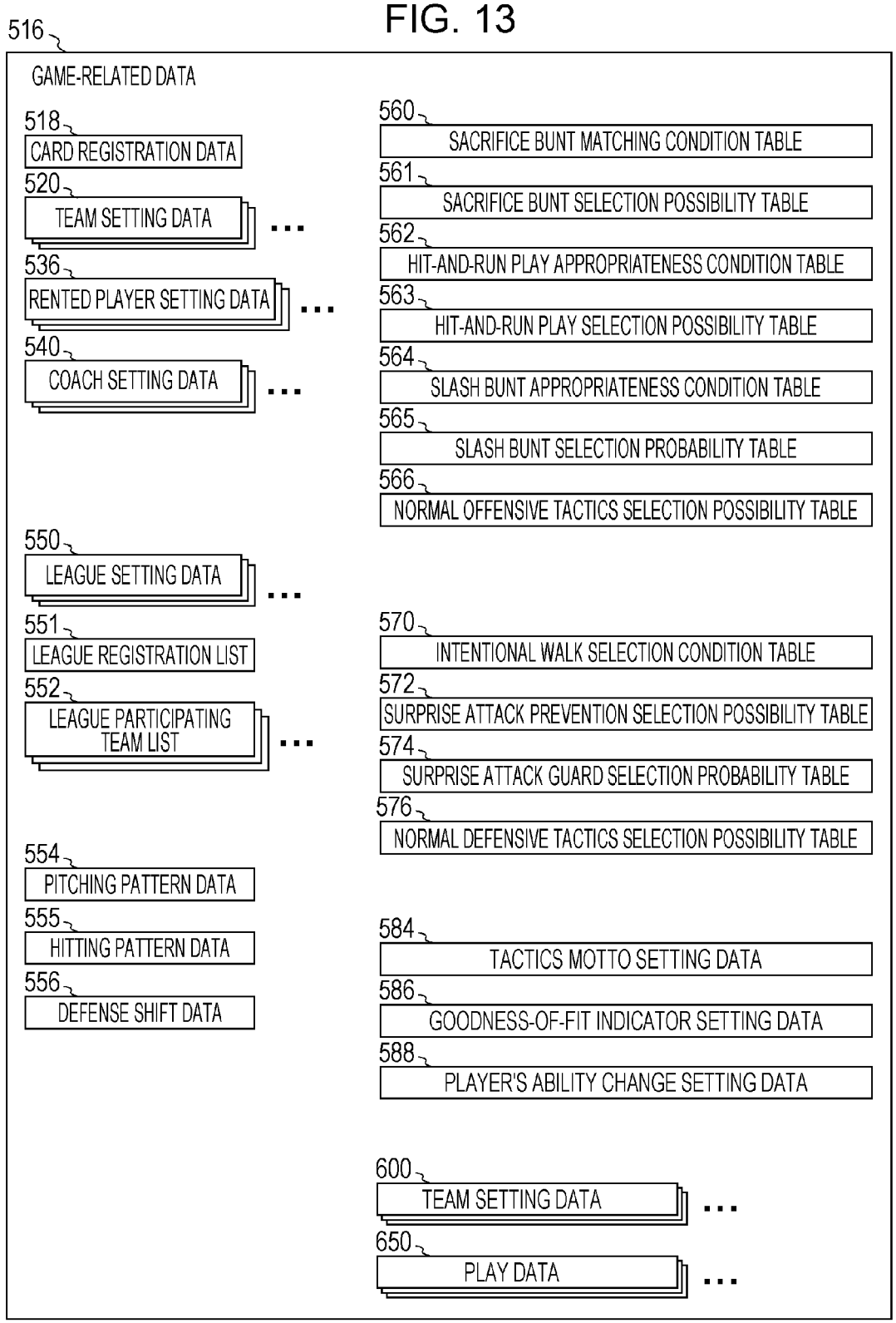
FIG. 13 illustrates an example of a data configuration of game-related data.

FIG. 13 illustrates an example of the game-related data 516. The game-related data 516 stores information on registration of cards and setting of a character appearing in a game and stores card registration data 518, a plurality of player setting data pieces 520, a plurality of rental player setting data pieces 536, and a plurality of coach setting data pieces 540.

The game-related data 516 further stores information on a league and stores league setting data 550, a league registration list 551, a league participating team list 552.

The game-related data 516 stores pitching pattern data 554, batting pattern data 555, and defense shift data 556 in a game simulation as information for determining specific behaviors of players corresponding to offensive tactics and defensive tactics.

As information for selecting offensive tactics of an offensive team in a game simulation, the game-related data 516 further stores a sacrifice bunt appropriateness condition table 560, a sacrifice bunt selection probability table 561, a hit-and-run appropriateness condition table 562, a hit-and-run selection probability table 563, a slash bunt appropriateness condition table 564, a slash bunt selection probability table 565, and a normal offensive tactics selection possibility table 566.

As information for selecting defensive tactics regarding a defense-related ability parameter in a game simulation, the game-related data 516 further stores an intentional walk selection condition table 570, a surprise attack guard appropriateness condition table 572, a surprise attack guard selection probability table 574, and a normal defensive tactics selection possibility table 576.

As data on settings for team tactics, the game-related data 516 further stores tactics motto setting data 584, goodness-of-fit indicator setting data 586, and player's ability change setting data 588.

The game-related data 516 further stores team setting data 600 which stores information on a team set by a player and play data 650 which stores information to be generated and/or updated as required with the development of a game play. The game-related data 516 further stores a timer, a counter, a flag required for game management and control and information required for data communication such as an IP address of the mobile game apparatus 1400 that has signed-in as required.

These data will be described one by one in detail.

The card registration data 518 stores a card number given to a trading card 3 and the identification information of the player corresponding to the number (player ID) or identification information of a coach (coach ID) in association. For example, this information may be implemented similarly to the information having correspondence between a trading card type and a character type in a publicly known game in which a trading card is used to cause the corresponding character to appear in a videogame.

The player setting data 520 is information defining a player type such as a fielder, a catcher, and a pitcher and is prepared in advance for each type of player appearing in a baseball game of this embodiment.

Figure 14:
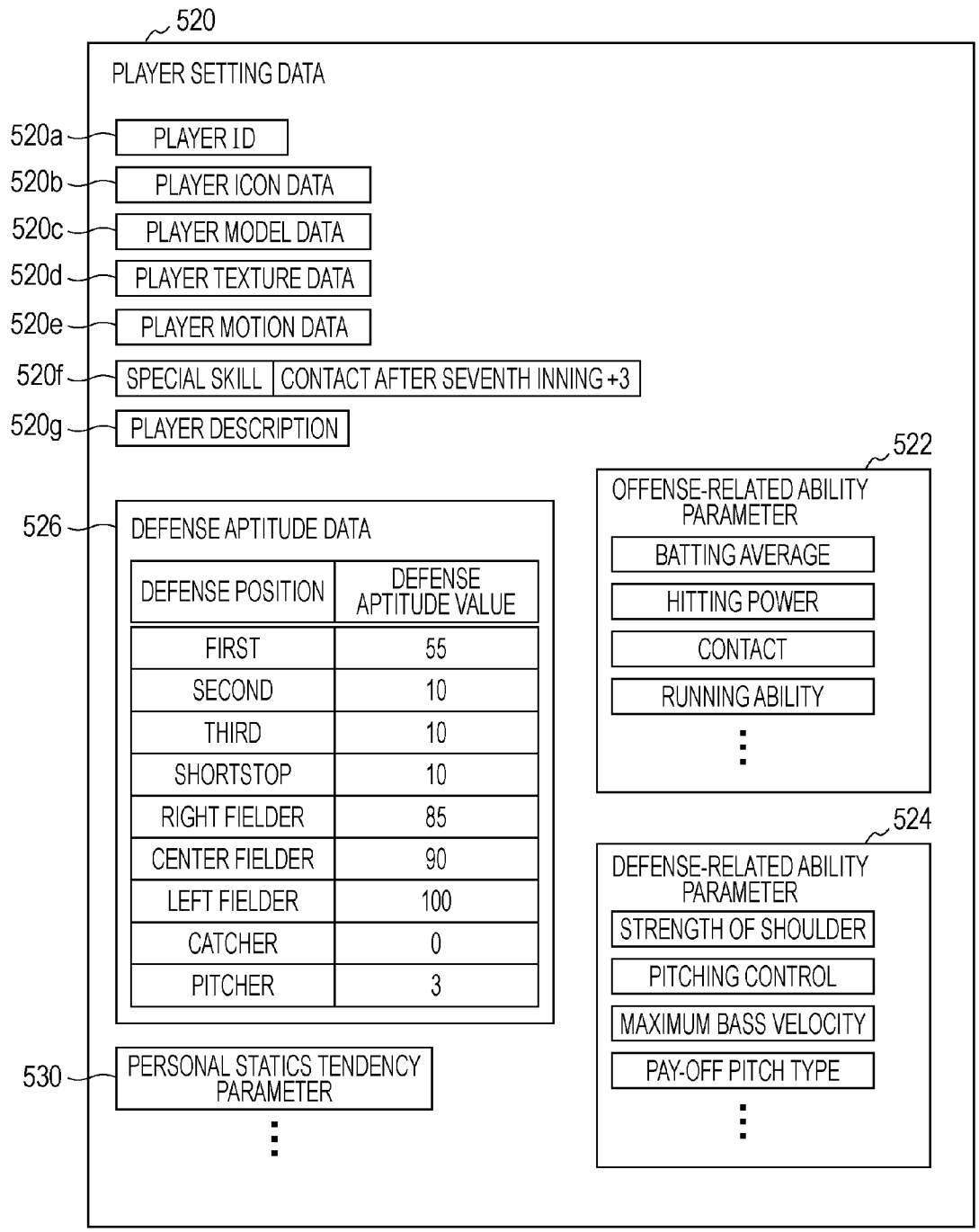
FIG. 14 illustrates an example of a data configuration of player setting data.

One player setting data 520 piece may store, as illustrated in FIG. 14, a player ID 520$a$ storing identification information such as a name of a player, player icon data 520$b$ to be displayed on the team organization screen W6, player model data 520$c$ for displaying a player who is playing baseball on a game screen display 82 (refer to FIG. 11), player texture data 520$d$ and player motion data 520$e$ for example.

One player setting data 520 piece further stores a player's special skill 520$f$ and player description 520$g$. The special skill 520$f$ is a specific initiation condition and information defining a process inherent to a player to be applied when the initiation condition is satisfied. The initiation condition is defined with a parameter value indicating a game condition (such as a numerical value indicating the number of innings, out count, batting order, strike or ball count or runner advance status). The process to be applied may be defined as the increase or decrease value of an ability parameter value, for example.

The player description 520$g$ stores text information to be displayed on player information display 14 or 34 of the player registration screen W4 or team organization screen W6. (Refer to FIG. 4 and FIG. 5).

The player setting data 520 further stores information on the ability, aptitude and/or behavior tendency inherent to the player including an offense-related ability parameter 522, a defense-related ability parameter 524, a defense aptitude value 526, and a individual tactic tendency parameter 530.

The offense-related ability parameter 522 defines an offensive ability such as batting and/or base running of a player. For example, the offense-related ability parameter 522 may store an initial set value of an ability parameter such as a batting average, the power to hit long, contact, and a running ability. The defense-related ability parameter 524 defines a defensive ability such as pitching and defense of the player. For example, the defense-related ability parameter 524 stores the set value of an ability parameter such as a shoulder strength, control, a maximum ball speed, pay-pitch type (what-is-called best pitch).

The defense aptitude value 526 is information describing the defensive position that the player has an aptitude and stores correspondence between a defensive position and a defensive aptitude value (0: no aptitude to 100: maximum aptitude).

Figure 15:
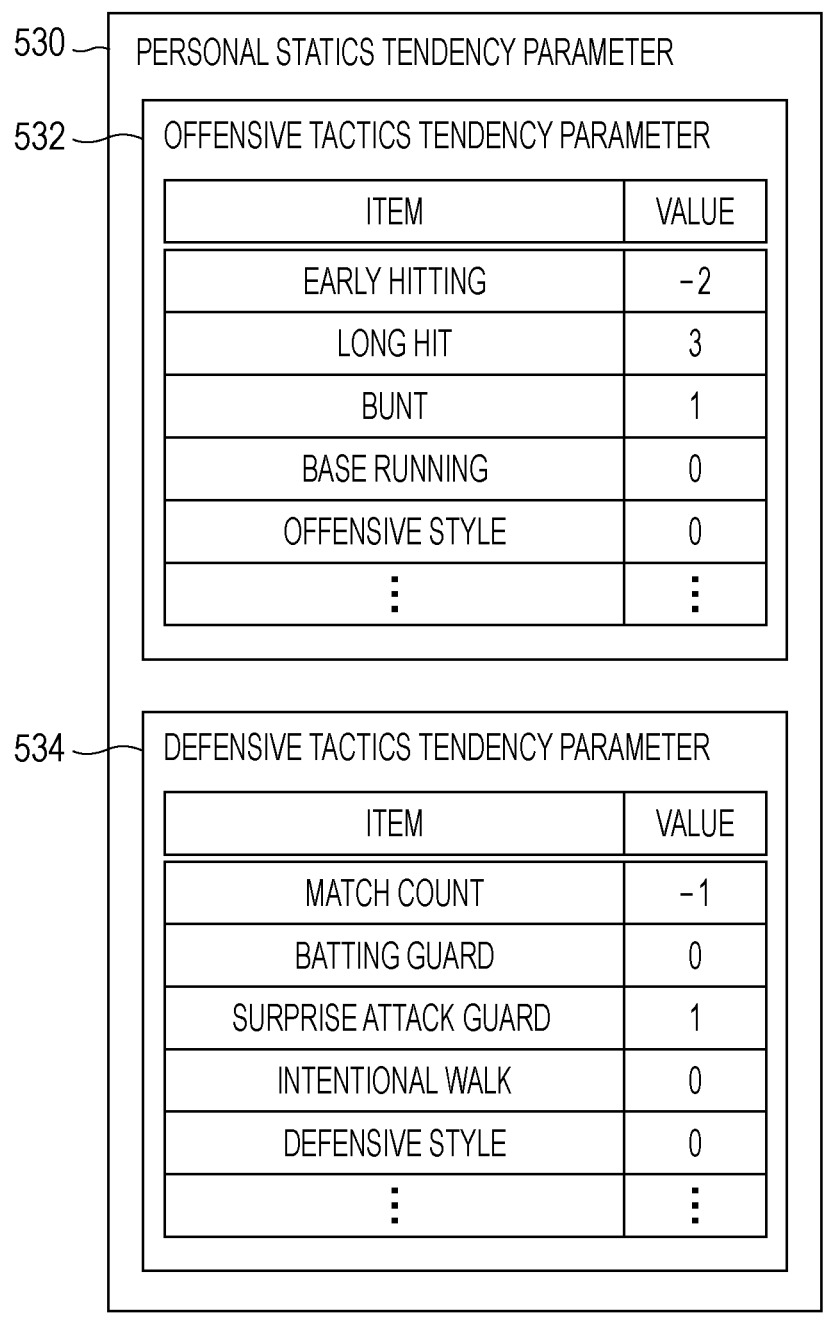
FIG. 15 illustrates examples of a data configuration of an individual tactic tendency parameter.

The individual tactic tendency parameter 530 is information describing a individual preference or inclination regarding the selection of an offensive behavior such as batting and base running during play or a defensive behavior. For example, as illustrated in FIG. 15, the individual tactic tendency parameter 530 stores an offensive tactic tendency parameter 532 and a defensive tactic tendency parameter 534.

The offensive tactic tendency parameter 532 stores correspondence between a parameter item and a parameter value such as (1) "early batting" having a numerical value which increases to indicate a higher tendency that the player tries to bat at an earlier count, (2) "long hit" having a numerical value which increases to indicate a higher tendency of preference for a long hit, (3) "bunt" having a numerical value which increases to indicate a higher bunt success rate, (4) "base running" having a numerical value which increases a higher tendency that the player actively aims for a steal, and (5) "offensive style" having a numerical value which increases to indicate a higher tendency of preference of offensive play and a tendency of active preference for being offensive at a late period of a game development time such as the opening, midpoint, and late innings. The parameter item may be set as required in accordance with the game content.

The defensive tactic tendency parameter 534 stores correspondence between a parameter item and a parameter value such as (1) "match count" having a numerical value which increases to indicate a tendency that the player takes a trick at an earlier count, (2) "batting guard" having a numerical value which increases to indicate a tendency of more guard against long hits by batters, (3) "surprise attack guard" having a numerical value which increases to indicate a tendency of the guard against surprise attacks such as slash bunt, hit-and-run, and squeeze play, (4) "intentional walk" having a numerical value which increases to indicate a higher tolerance to intentional walk, and (5) "defensive style" having a numerical value which increases to indicate a higher tendency of preference for steady defense and a higher tendency of strict defense at a late period of a game development time such as the opening, midpoint, and late innings. The parameter item may be set as required in accordance with the game content.

According to this embodiment, offensive tactic tendency parameter 532 and defensive tactic tendency parameter 534 store one of integers "−5" to "+5" with "0" at the middle.

The rental player setting data 536 stores setting data of a player automatically rented if the number of cards acquired by the user is lower than number of the participating members. The data configuration may fundamentally be similar to that of the player setting data 520, but a rental player is set to have a poorer ability than a regular player set in the player setting data 520.

The coach setting data 540 corresponds to the player setting data 520 for a player and stores setting information for a coach. The coach setting data 540 is prepared in advance for each type of coach appearing during a game.

The coach setting data 540 may fundamentally be implemented by the similar data configuration as that of the player setting data 520. In other words, the coach setting data 540 includes a coach ID storing identification information such as a name of a coach, coach icon data to be displayed on a screen for registering a card of a coach, a special skill, coach description, and individual tactic tendency parameter. The individual tactic tendency parameter of a coach stores offensive and defensive tactic tendency parameters for each type of individual tactic tendency parameter 530 in the player setting data 520.

The set value of the individual tactic tendency parameter of a coach is also set to one of integers "−5" to "+5" like the player setting data 520. According to this embodiment, because a coach character does not appear during a game simulation, the model data, texture data and so on are omitted. The data corresponding to the offense-related ability parameter 522, defense-related ability parameter 524, and defense aptitude value 526 are also omitted.

Figure 16:
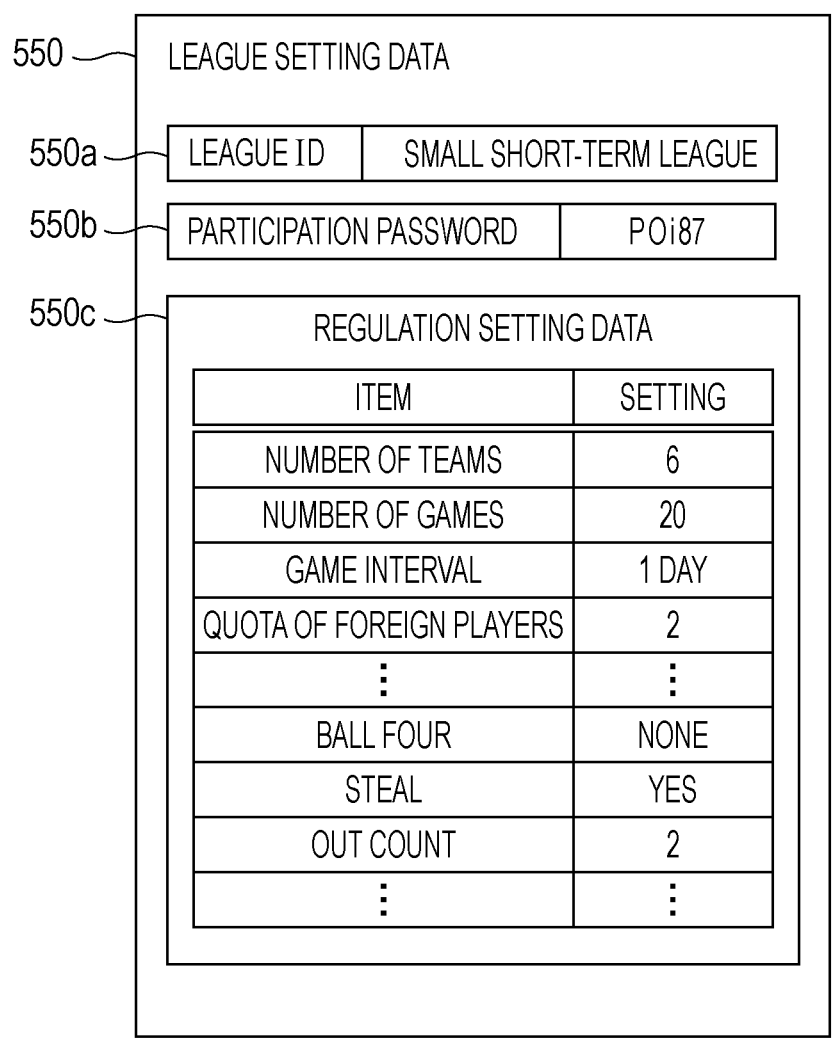
FIG. 16 illustrates an example of a data configuration of league setting data.

The league setting data 550 stores setting information on a league created by a user or is prepared for each created league. According to this embodiment, for example, as illustrated in FIG. 16, the league setting data 550 includes a league ID 550a storing identification information such as a name of a league, a participation password 550b, and regulation setting data 550c. The regulation setting data 550c stores a setting in association with a regulation item.

The league registration list 551 is a list of all leagues created by a user and stores correspondence between a league ID and a participation password.

The league participating team list 552 is a data set storing information on a team currently participating in a league and is prepared for each corresponding league. For example, the league participating team list 552 includes a corresponding league ID storing an ID of a corresponding league and a team record in association with a participating team ID.

Figure 17:
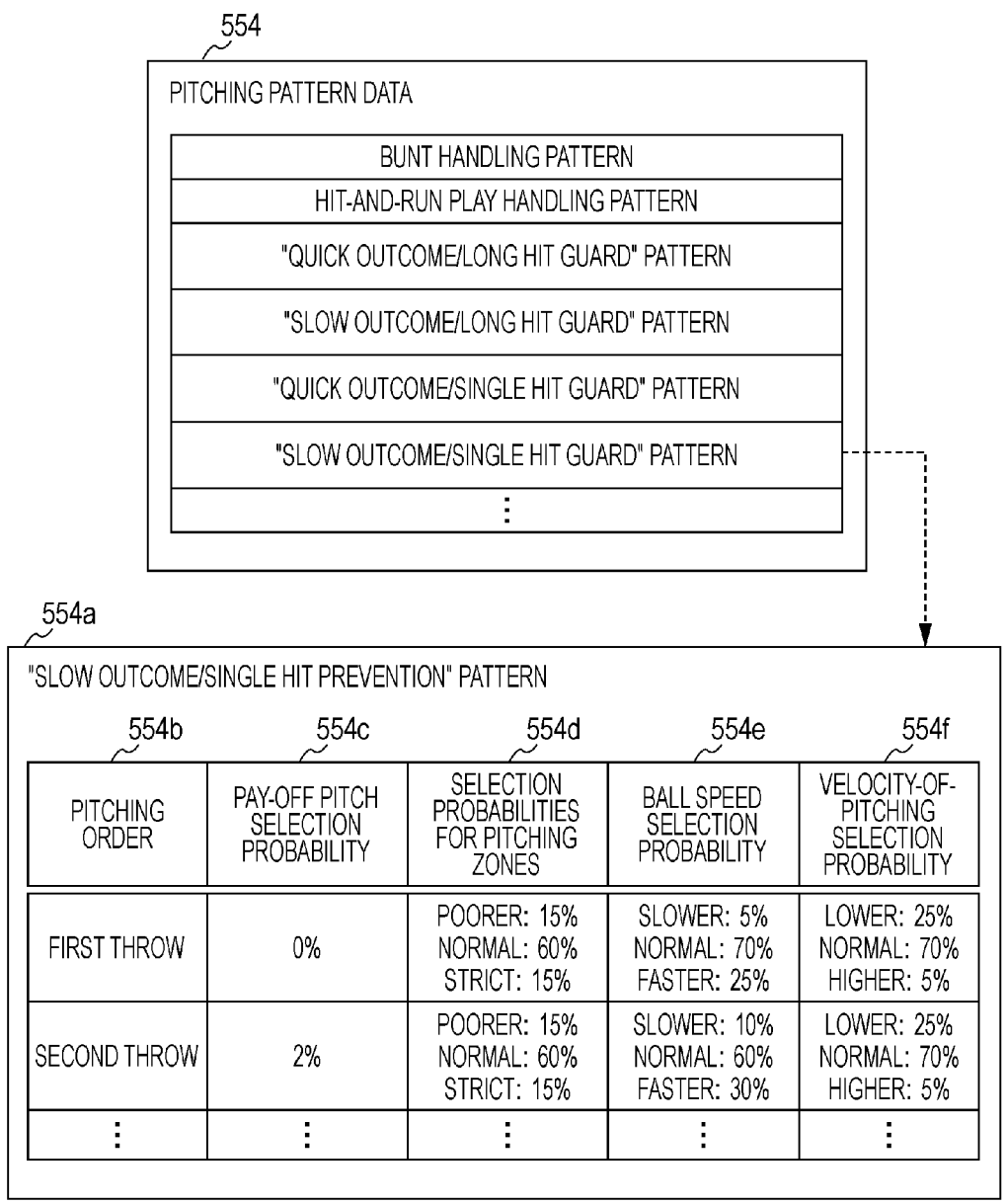
FIG. 17 illustrates an example of a data configuration of pitching pattern data.

The pitching pattern data 554 is basic information for determining a combination of pitches for one at bat and is prepared in advance for each defensive tactic. For example, as illustrated in FIG. 17, pitching patterns are prepared such as a bunt corresponding pattern, a hit-and-run corresponding pattern, and "quick outcome/long hit guard" pattern. One pitching pattern 554a stores, in the pitching order 554b, a pay-pitch (best pitch) selection probability 554c, pitching zone selection probability 554d, a ball speed selection probability 554e, and a velocity of pitching selection probability 554f in association. The pitching combination is determined under a lottery system based on these probabilities.

The batting pattern data 555 is basic information for determining a combination of battings one at a bat and is prepared in advance for each type of offensive tactics.

Figure 18:
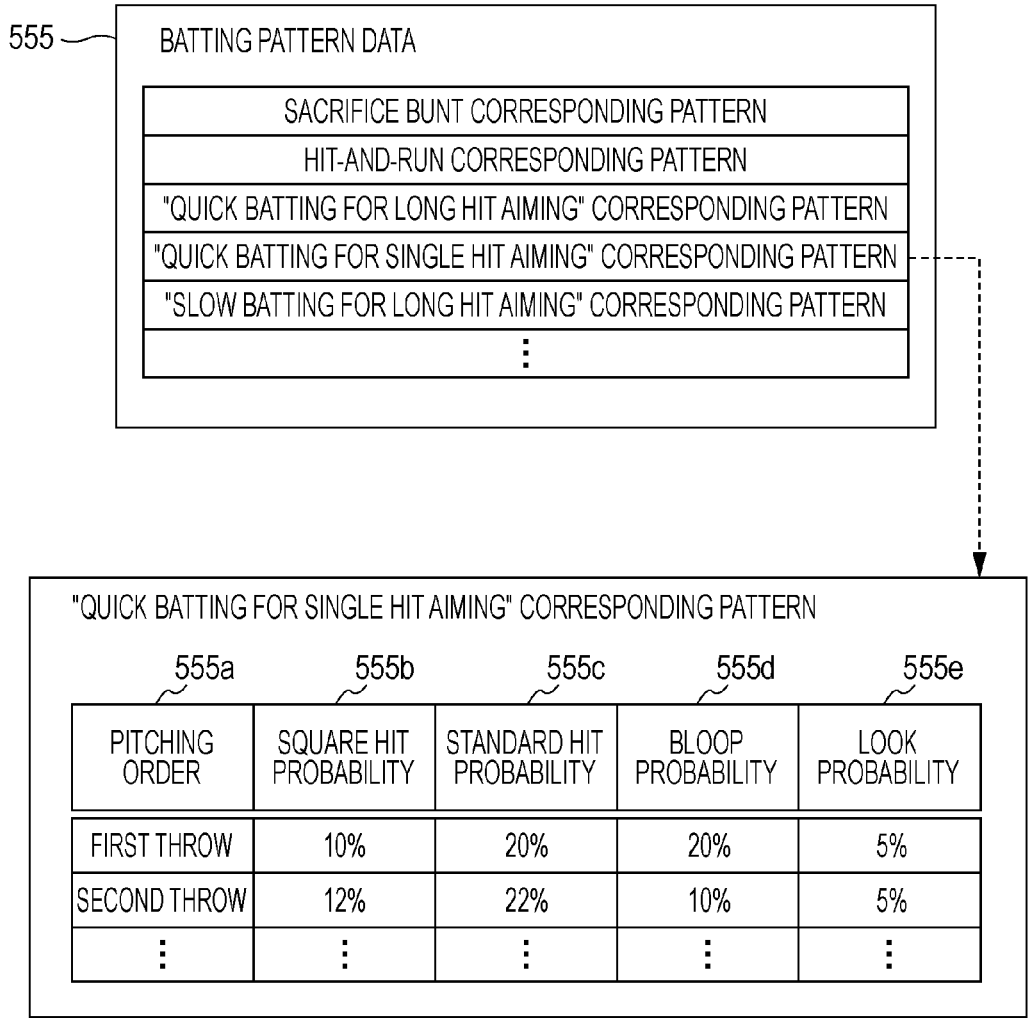
FIG. 18 illustrates an example of a data configuration of batting pattern data.

According to this embodiment, for example, as illustrated in FIG. 18, a sacrifice bunt corresponding pattern, hit-and-run corresponding pattern, "quick batting for long hit" corresponding pattern and so on are prepared. One corresponding pattern stores, in the pitching order 555a, a square hit probability 555b, a standard hit probability 555c, a bloop probability 555d, and a look probability 555e. The batting combination is determined under a lottery system based on these probabilities.

The way of setting a batting pattern is not limited thereto, but probabilities of items may be stores such as the appropriateness of swing, swing position (high and inside, center and inside, low and inside, high and outside, center and outside, lower and outside, or center), and square hit/late/early of swing timing.

The defense shift data 556 is data for determining a defensive position in accordance with the type of defensive tactics and stores a relative position about the standard defensive position for each defensive tactic.

The sacrifice bunt appropriateness condition table 560 defines a condition matched with the selection of an offensive tactic "sacrifice bunt". For example, as illustrated in FIG. 19, an appropriateness condition 560b having factors of offense-related ability parameters 522 such as a batter's "contact" and "running ability" is stored in association with a on-base status 560a.

The sacrifice bunt selection probability table 561 defines the probability that a sacrifice bunt is actually selected when the offensive tactic "sacrifice bunt" is determined as appropriate. For example, as illustrated in FIG. 20, the sacrifice bunt selection probability table 561 stores selection probabilities in a matrix of a "bunt" value 561a of the final offensive tactic tendency parameter and a score difference 561b from the offensive team viewpoint.

The hit-and-run appropriateness condition table 562 defines the condition that the selection of the offensive tactic "hit-and-run" is appropriate. The data configuration may be implemented similarly to that of the sacrifice bunt appropriateness condition table 560. In other words, the factors of the appropriateness condition 560b and offensive parameters may be replaced by batter's "contact" and a runner's "running ability", for example.

The hit-and-run selection probability table 563 defines the probability that hit-and-run is actually selected if the offensive tactic "hit-and-run" is determined as appropriate. The data configuration may be implemented similarly by replacing the "bunt" value in the sacrifice bunt selection probability table 561 by the "base running" value of the final offensive tactic tendency parameter.

The slash bunt appropriateness condition table 564 defines a condition that the selection of the offensive tactic "slash bunt" is determined as appropriate. According to this embodiment, the appropriateness condition may be that the batter's "contact" and "running ability" are both higher than a predetermined reference value. A matrix of batter's "contact" and "running ability" may be used to define the probability of the satisfaction of the appropriateness condition.

The slash bunt selection probability table 565 defines the probability that a slash bunt is actually selected is a slash bunt is determined as appropriate. Like the sacrifice bunt selection probability table 561, the selection probability is stored in a matrix of the "bunt" value of the final offensive tactic tendency parameter and the score difference from the offensive team viewpoint.

The normal offensive tactics selection possibility table 566 defines the probabilities of selection of hitting tactics. According to this embodiment, four types of tactics of "early batting for long hit", "late batting for long hit", "early batting for single hit" or "late batting for single hit" is selectable. This table stores, as illustrated in FIG. 21, the selection probabilities of the four types of tactics in a matrix of a "long hit" value 566a, "early batting" value 566b of the final offensive tactic tendency parameter.

The intentional walk selection condition table 570 defines a condition that a defensive tactic "intentional walk" is selected. For example, a total matrix of the "intentional walk" value of the final defensive tactic tendency parameter 670 and batter's "contact" and "power to hit long" is used to store the probability of selection of "intentional walk".

The surprise attack guard appropriateness condition table 572 defines a condition that the selection of a defensive tactic "surprise attack guard", that is, a tactic for preventing a slash bunt or a hit-and-run is determined as appropriate. For example, in association with an on-base status (such as "no runner", "first base" and "second base"), a selection condition having factors of batter's "contact" and "running ability" is stored (such as a condition that the "contact" is equal to or higher than a first reference value and the batter's "running ability" is equal to or higher than a second reference value). If the selection condition is satisfied, the "surprise attack guard" is selected.

The surprise attack guard selection probability table 574 defines the probability that surprise attack guard is actually selected if the surprise attack guard is determined as appropriate. For example, the selection probability is stored in a matrix of the value of the "surprise attack guard" of the final defensive tactic tendency parameter 670 and the score difference from the defensive team viewpoint.

The normal defensive tactics selection possibility table 576 defines the probability of selection of a pitching tactic. According to this embodiment, a pitching tactic may be selected from four types of "early match for long hit guard", "late match for long hit guard", "early match for single hit guard" and "late match for single hit guard". For example, as illustrated in FIG. 22, the selection probabilities of the four types of defensive tactics are stored in a matrix of a value 576a of the "batting guard" of the final defensive tactic tendency parameter and the value 576b of the "match count" of the final defensive tactic tendency parameter.

The tactics motto setting data 584 stores text data clearly expressing the characteristic of the tactic implemented by the setting of the current team tactic tendency parameter. More specifically, for example, as illustrated in FIG. 23, the text data of a tactic motto 584b is stored in association with the motto selection condition 584a. The motto selection condition 584a is set by a combination of a parameter included in tactic tendency parameters and player's ability parameters.

For example, for a tactic motto 584b "ultra-active base running", a tactic tendency parameter "base running" and one of player's offense-related ability parameters 522, "running ability", configure the motto selection condition 584a. In this example, "ultra-active base running" may surely be determined from the tactic tendency, but the tactic motto is not selected if the player's ability is not matched with it. The proper setting of the motto selection condition 584a can provide a condition for selecting the tactic motto 584b and a condition which prevents the selection under an appropriate condition (character combination condition for inhibiting the use). A character combination condition for allowing the use may be added instead of a combination for inhibiting the use.

The goodness-of-fit indicator setting data 586 defines the goodness-of-fit indicator 52 to be displayed on the goodness-of-fit indicator screen W9. For example, as illustrated in FIG. 24, display data 586b of the goodness-of-fit indicator 52 is stored in association with a display selection condition 586a. The display selection condition 586a defines a total of "individual goodness-of-fit indices" which are an absolute values of the differences between set values of the same type of parameters as a conditional construct for each of the team tactic tendency parameters and player's individual tactic tendency parameters.

Figure 25:
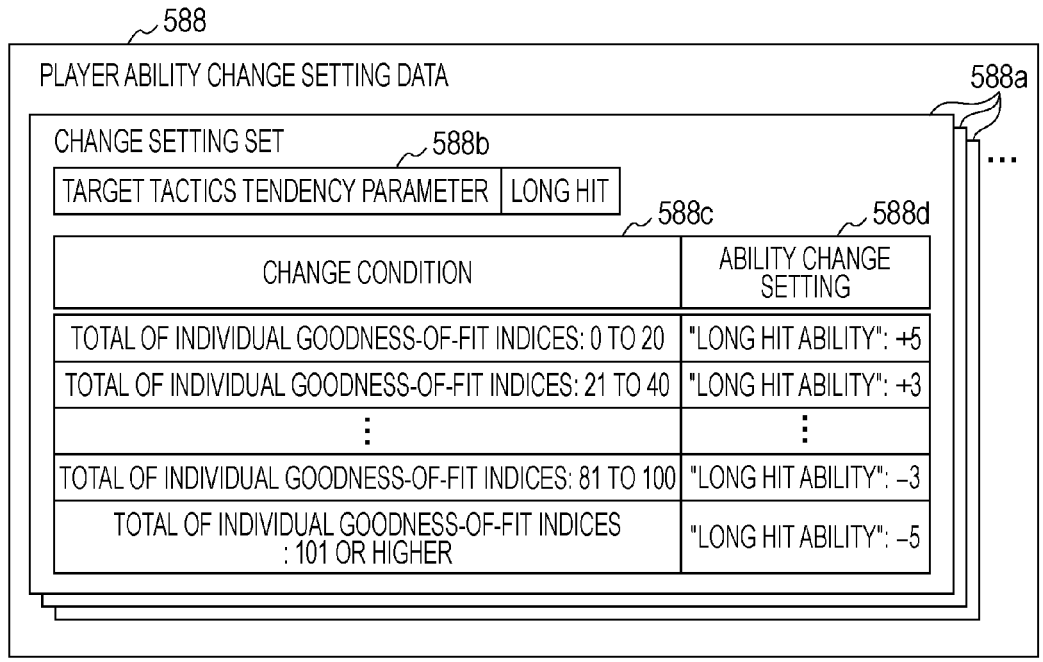
FIG. 25 illustrates an example of a data configuration of player's ability change setting data.

The player's ability change setting data 588 defines the amount to change the ability of the player in accordance with the "individual goodness-of-fit index". For example, as illustrated in FIG. 25, a plurality of change setting sets 588a are stored. One change setting set 588a stores correspondence among a target tactic tendency parameter 588b, a change condition 588c, and an ability change setting 588d.

The target tactic tendency parameter 588b designates the tactic tendency parameter to which the set is to be applied.

The change condition 588c designates the range of a total of values of the individual goodness-of-fit indices for the parameter designated by the target tactic tendency parameter 588b.

The ability change setting 588d defines the player's ability to be increased or decreased and the amount.

According to this embodiment, if the difference between a team tactic tendency and an individual tactic tendency satisfies a predetermined small difference condition (such as "a total of the individual goodness-of-fit indices: 0 to 20"), the change is set so as to raise the player's ability value. If it satisfies a predetermined large difference condition (such as "a total of individual goodness-of-fit indices: 81 to 100"), the change is set so as to reduce the ability value.

Figure 26:
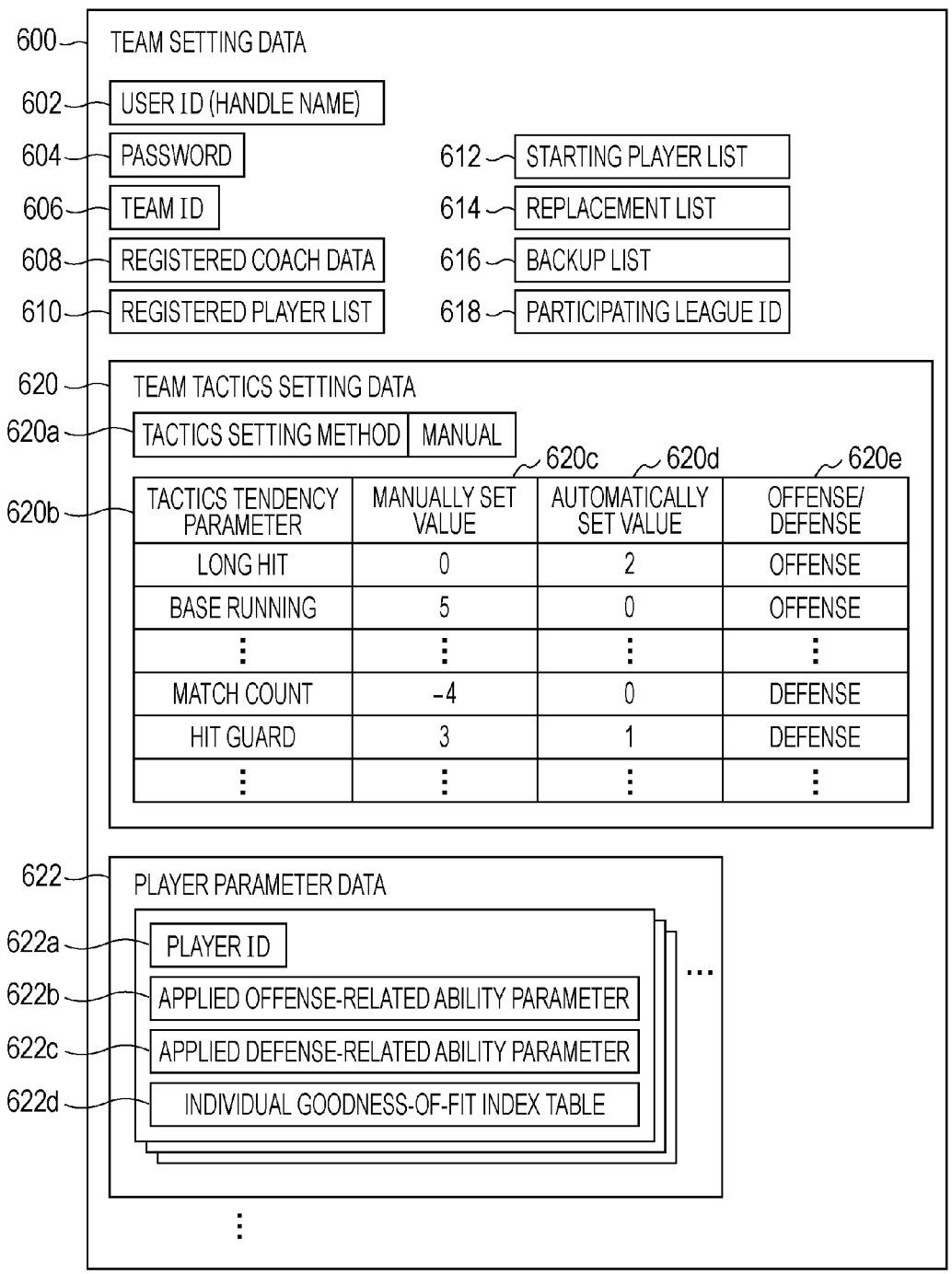
FIG. 26 illustrates an example of a data configuration of team setting data.

The team setting data 600 is prepared for each user and stores information on a team created by a user. For example, as illustrated in FIG. 26, the team setting data 600 includes a user ID 602, a password 604, a team ID 606, a registered coach data 608, a registered player list 610, a starting player list 612, a replacement list 614, a backup pitcher list 616, a participating league ID 618, team tactics setting data 620, and player parameter data 622.

The starting player list 612 stores a defensive position of a player registered as a starting player and information such as a batting order. For example, a player ID of a player assigned to a defensive position and a batting order are stored in association for each defensive position.

The replacement list 614 stores a player registered as a replacement and setting information for the purpose of change. For example, a player ID of a player set to a replacement field is stored in association with the replacement field.

The backup pitcher list 616 stores information describing the purpose of change such as "middle relief" and "relief" in association with a player ID of a player registered as a backup pitcher.

The participating league ID 618 stores an league ID in which the team is currently participating.

The team tactics setting data 620 stores setting information for determining a team tactic. According to this embodiment, the currently set tactics setting method 620a and a manually set value 620c, an automatically set value 620d and an offensive and defensive category 620e in association with each tactic tendency parameter 620b are stored.

The manually set value 620c stores the value set on the basis of an operation by a player on the parameter value setting section 47 of each of the team tactic tendency parameter setting operation sections 46.

If the tactics setting method is "AUTOMATIC", the automatically set value 620d stores calculation results of the basic offensive tactic tendency parameter 660 and basic defensive tactic tendency parameter 662.

In the initial state of the team tactics setting data 620, the tactics setting method 620a stores "AUTOMATIC", and the manually set value 620c and automatically set value 620d store "0".

The player parameter data 622 stores a set value of an ability parameter to be applied to the first team members in a game simulation for each member. For example, in association with the player ID 622a, an applied offense-related ability parameter 622b, an applied defense-related ability parameter 622c, and an individual goodness-of-fit index table 622d are stored.

The set values of ability parameters stored in the applied offense-related ability parameter 622b and applied defense-related ability parameter 622c have an offense-related ability parameter 522 and an defense-related ability parameter 524 of the player setting data 520 as their initial values, and the values changed in accordance with the player's ability change setting data 588 are stored therein.

The individual goodness-of-fit index table 622d stores the "individual goodness-of-fit indices" calculated for tactic tendency parameters player by player.

Figure 27:
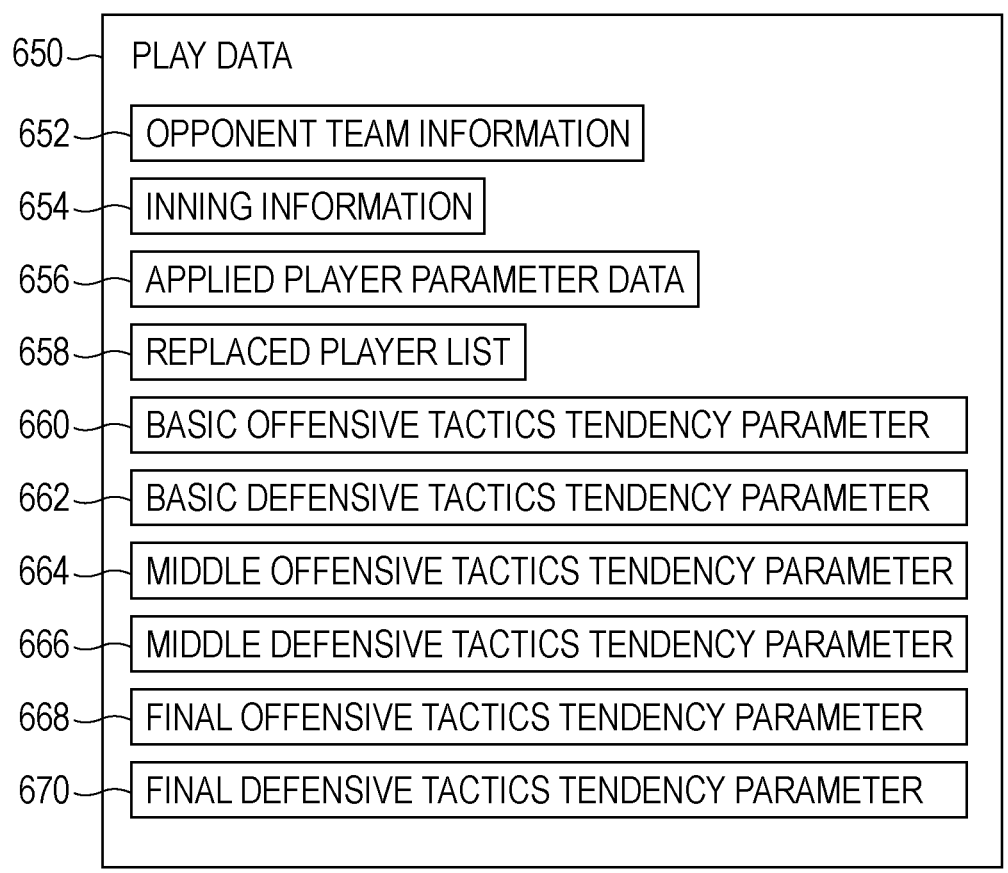
FIG. 27 illustrates an example of a data configuration of play data.

The play data 650 is generated for each game and stores information describing a game condition and information for controlling games. For example, as illustrated in FIG. 27, the play data 650 stores (1) matching team information 652 storing team IDs of matching two teams, (2) inning information 654 storing the current number of innings and offense/defense identification information, (3) applied player parameter data 656 storing parameters of all players participating in a game in association with the player IDs, (4) changed player list 658 storing a player ID of a player already changed among replacements and backup pitchers, (5) a basic offensive tactic tendency parameter 660, (6) a basic defensive tactic tendency parameter 662, (7) a middle offensive tactic tendency parameter 664, (8) a middle defensive tactic tendency parameter 666, (9) a final offensive tactic tendency parameter 668, and (10) a final defensive tactic tendency parameter 670.

The player parameter data 622 of the team setting data 600 is copied to the applied player parameter data 656 before a game starts. When a player's ability parameter is changed, the value stored in the applied player parameter data 656 is changed accordingly.

Description of Operations

Next, operations by the server system 1100 according to this embodiment will be described. It is assumed that a user who has already registered uses the mobile game apparatus 1400 to sign-in.

Figure 28:
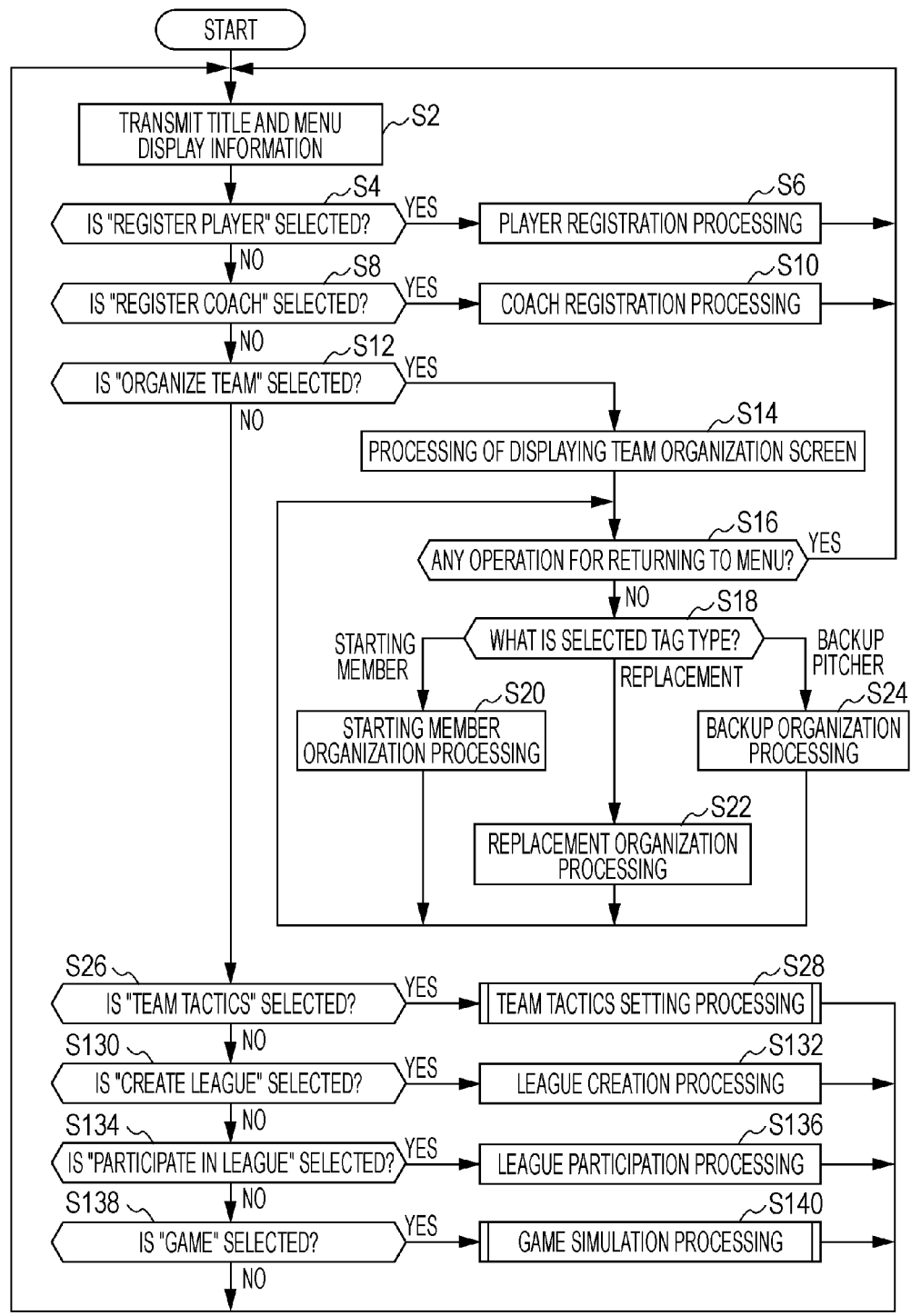
FIG. 28 is a flowchart for describing a flow of main processing relating to the present invention in a server system.

FIG. 28 is a flowchart for describing a flow of main processing relating to the present invention in the server system 1100 according to this embodiment.

The server processing unit 202 in the server system 1100 first transmits display information for displaying a title and a menu to the mobile game apparatus 1400 (step S2). The display information is HTML information if the program to be used for image display in the mobile game apparatus 1400 is a web browser, for example, and the menu screen W2 as illustrated in FIG. 3 is displayed. If some operation input is performed in the mobile game apparatus 1400, request information based on the operation input is transmitted to the server system 1100.

If it is determined from the received request information that "player registration" for registering a fielder and a pitcher has been selected (YES in step S4), the server processing unit 202 performs player registration processing (step S6).

The player registration processing transmits to the mobile game apparatus 1400 as illustrated in FIG. 4, display information and a Java (registered trademark) program for displaying the card number input field 10 and a software keyboard 12 for number input and a CGI source for displaying the registered player list 16 with which the player is registered.

From the mobile game apparatus 1400, information on the card number based on the operation input information is transmitted to the software keyboard 12. The server processing unit 202 compares the received number with the card registration data 518. If it is matched with the registered information, display information for displaying the information on the character corresponding to the card number on the player information display 14 is transmitted. If the request information corresponding to the "REGISTER" operation input is received from the mobile game apparatus 1400, the character is registered with the registered player list 610 of the player's team setting data 600. (Refer to FIG. 26). If the "BACK TO MENU" operation is input in the mobile game apparatus 1400, and the request information corresponding to "BACK TO MENU" is received from the mobile game apparatus 1400, the player registration processing ends. The processing returns to step S2.

Similarly, if it is determined from the received request information that "coach registration" for registering the character of a card with a coach of a player's team has been selected on the menu screen W2 (YES in step S8), the server processing unit 202 performs coach registration processing similarly to the player registration processing (step S10).

The coach registration processing is fundamentally the same as the player registration processing except that the character corresponding to a card is a coach. Because one coach can be registered, the registered coach data 608 of the team setting data 600 of the player is updated with the ID of a newly registered coach. (Refer to FIG. 26).

If it is determined from the received request information that the menu selection icon "ORGANIZE TEAM" has been selected on the menu screen W2 (YES in step S12), the server processing unit 202 performs team organization screen display processing and transmits display information for displaying the team organization screen W6 (refer to FIG. 5) to the mobile game apparatus 1400 (step S14).

The team organization screen W6 further displays a starting player editing tag 20, a replacement organization tag 22 and a backup pitcher organization tag 24 for invoking a special organization screen. If an operation of selecting a tag or an operation of returning to a menu screen is input in mobile game apparatus 1400, the request information based on the selection operation is transmitted to the server system 1100.

If it is determined from the received request information that the "BACK TO MENU" operation has been input on the team organization screen W6 (YES in step S16), the server processing unit 202 moves to step S2.

If it is determined from the received request information that an operation of selecting the starting player editing tag 20 has been performed on the team organization screen W6 ("STARTING PLAYER" in step S18), the server processing unit 202 performs starting player organization processing (step S20).

In the same manner, if it is determined that the replacement organization tag 22 has been selected ("REPLACEMENT" in step S18), replacement organization processing is executed (step S22). If it is determined that the backup pitcher organization tag 24 has been selected ("BACKUP PITCHER" in step S18), replacement organization processing is performed (step S24).

If it is determined from the received request information that a menu selection icon of "TEAM TACTICS" has been selected on the menu screen W2 (YES in step S26), the server processing unit 202 performs team tactics setting processing (step S28).

Figure 29:
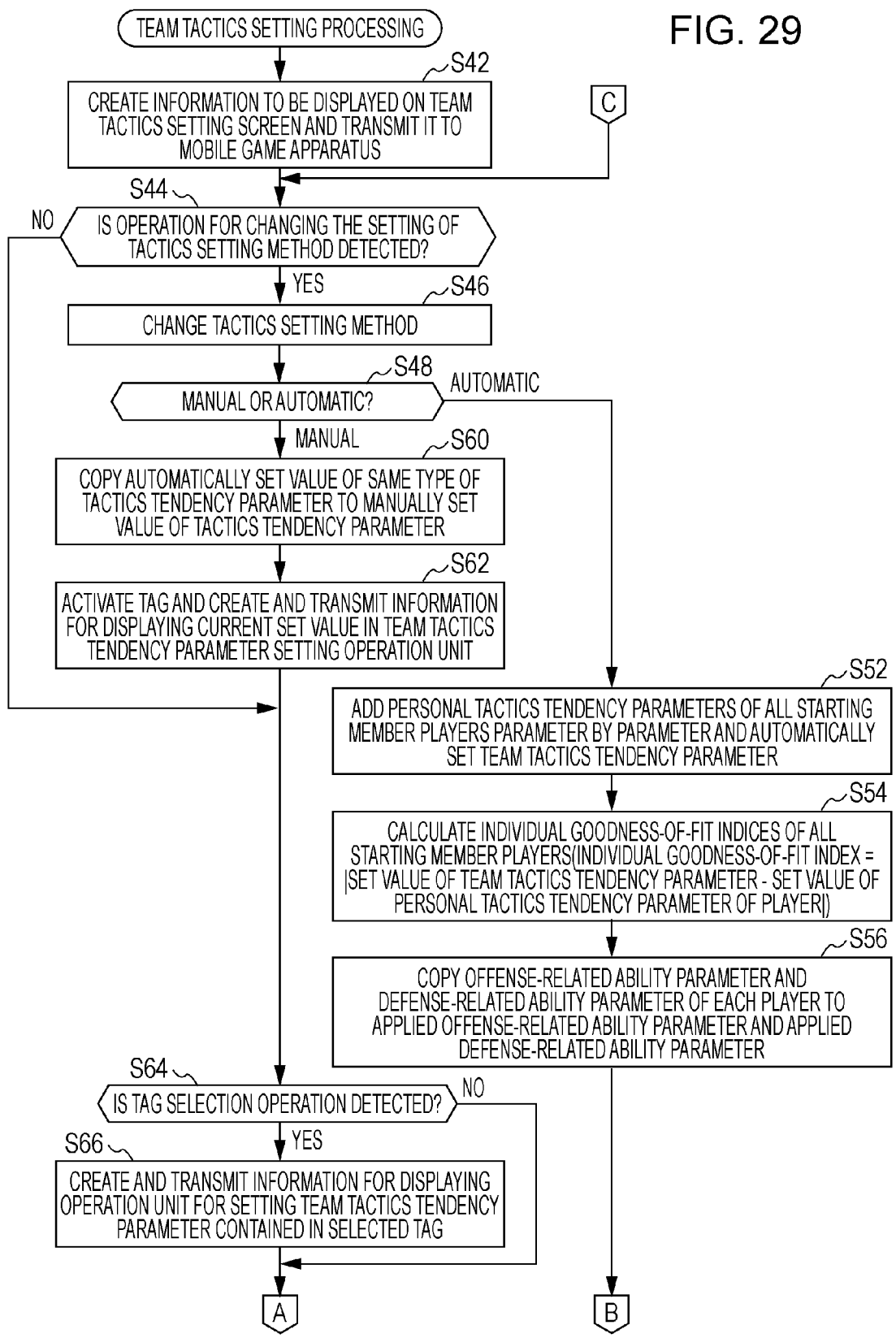
FIG. 29 is a flowchart for describing a flow of team tactics setting processing portion.
Figure 30:
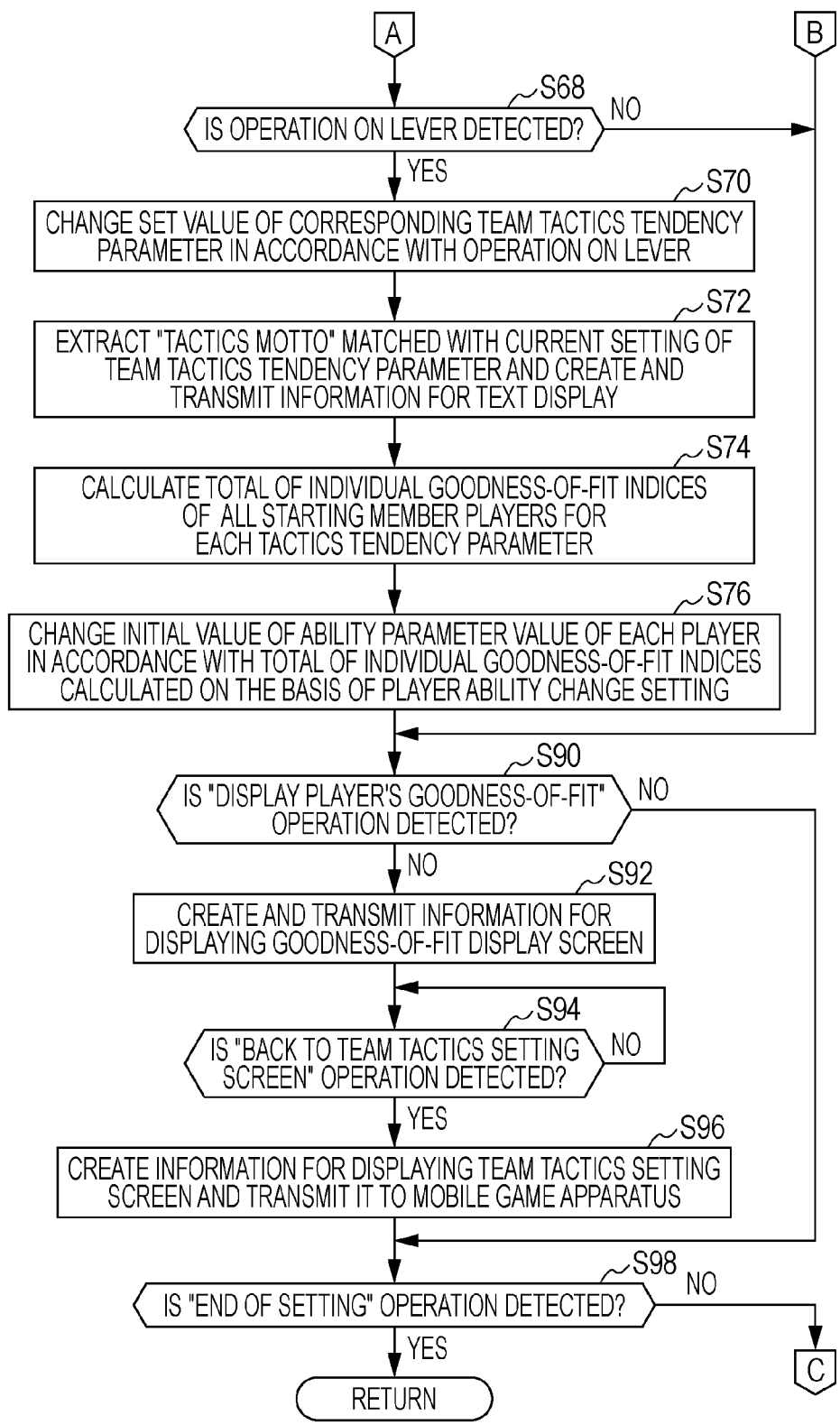
FIG. 30 is a flowchart following FIG. 29.

FIG. 29 and FIG. 30 are flowcharts for describing flows of the team tactics setting processing portion in this embodiment. In the processing, the server processing unit 202 first generates information for displaying the team tactic setting screen W8 in the mobile game apparatus 1400 and transmits it to the mobile game apparatus 1400 (step S42).

In the mobile game apparatus 1400, the team tactic setting screen W8 is displayed. Because the initial value of the tactics setting method 620*a* in the team tactics setting data 620 is "AUTOMATIC", the tags 44 are displayed as in active when the team tactic setting screen W8 is first displayed. If "MANUAL" is set, the tags 44 are displayed as active. The mobile game apparatus 1400 transmits the request information based on the operation input to the server system 1100.

If it is determined from the received request information that a setting/switching operation on the tactics setting method selection box 40 has been performed (YES in step S44), the server processing unit 202 switches the tactics setting method 620*a* of the team tactics setting data 620 of the team setting data 600 between "AUTOMATIC" and "MANUAL" (step S46; refer to FIG. 26).

If the setting is switched to "AUTOMATIC" ("AUTOMATIC" in step S48), the server processing unit 202 adds values of the individual tactic tendency parameters 530 of all first team players registered as starting players, replacement and backup players for each parameter item, divides the result by the number of members of the first team to calculate the average value. The average value is rounded to an integer and is stored in the automatically set value 620*d* (step S52; refer to FIG. 26).

Next, "individual goodness-of-fit indices" of all first team players are calculated (step S54).

According to this embodiment, the individual goodness-of-fit index is an absolute value of the difference between a set value of the team tactic tendency parameter relating to a same type parameter (manually set value 620*c*) and a set value of a individual tactic tendency parameter 530 of a player (refer to FIG. 15). The calculation result is stored in the individual goodness-of-fit index table 622*d* of the player parameter data 622 in the team setting data 600 for reference in other processes.

The server processing unit 202 copies, for all first team players, the initial values of the ability parameters stored in the offense-related ability parameters 522 and defense-related ability parameters 524 of the player setting data 520 of the players to the applied offense-related ability parameters 622*b* and applied defense-related ability parameters 622*c* of the player parameter data 622 in the team setting data 620 (step S56).

On the other hand, if the tactics setting method 620*a* is switched to "MANUAL" ("MANUAL" in step S48), the server processing unit 202 copies the automatically set value 620*d* of the tactic tendency parameter to the manually set value 620*c* of the team tactics setting data 620 (step S60).

The tags 44 are activated, and information for displaying the current set value in the team tactic tendency parameter setting operation sections 46 is generated and is transmitted to the mobile game apparatus 1400 (step S62). In the mobile game apparatus 1400, the set value is become changeable in the team tactic tendency parameter setting operation section 46.

If it is determined from the received request information that the operation of switching the tag 44 has been performed (YES in step S64), the server processing unit 202 generates information for displaying the team tactic tendency parameter setting operation section 46 corresponding to the switched tag 44 and transmits it to the mobile game apparatus 1400 (step S66).

If the current setting of the tactics setting method 620*a* is "MANUAL" and if it is determined from the received request information that a slide operation is performed on the lever 47*b* of the parameter value setting section 47 (YES in step S68), the server processing unit 202 determines that the set value has been changed and changes the manually set value 620*c* in the team tactics setting data 620 of the corresponding team in accordance with a slide operation on the lever 47*b* (step S70; refer to FIG. 26).

With reference to the tactics motto setting data 584, the tactic motto 584*b* corresponding to the motto selection condition 584*a* matched with the manually set value 620*c* of the current team tactics setting data 620 is extracted, and information for displaying the tactic motto display 42 is generated and is transmitted to the mobile game apparatus 1400 (step S72).

Next, the server processing unit 202 recalculates the number of individual goodness-of-fits of all first team players and updates the individual goodness-of-fit index table 622*d*. In addition, on the basis of the recalculated result, the sum value of the individual goodness-of-fit indices of all first team players is calculated for each tactic tendency parameter item (step S74). The sum value indicates the goodness-of-fit to the current team tactics of the entire first team for each tactic tendency parameter.

The server processing unit 202 changes the ability parameter value for each of the first team players in accordance with the changed tactic tendency parameter (step S76).

More specifically, player's ability change setting data 588 are referenced. (Refer to FIG. 25). For each target tactic tendency parameter 588*b*, the server processing unit 202 handles the set values of the ability parameters stored in the offense-related ability parameters 522 and defense-related ability parameters 524 of the player setting data 520 as initial values, and the initial values are increased or reduced by applying the ability change setting 588*d* set in association with the change condition 588*c* matched with the calculated sum value of the individual goodness-of-fit indices. The results are stored in the applied offense-related ability parameter 622*b* and applied defense-related ability parameter 622*c* of the player parameter data 622. In other words, player's ability is increased or decreased in accordance with the goodness-of-fit of the entire first team to the newly set team tactics.

If it is determined from the received request information that the "DISPLAY GOODNESS-OF-FIT OF PLAYER" operation has been performed on the team tactic setting screen W8 (YES in step S90), the server processing unit 202 generates and transmits information for displaying the goodness-of-fit indicator screen W9 (step S92).

More specifically, with reference to the individual goodness-of-fit index table 622*d*, a total of goodness-of-fit indices for the individual first team players is calculated. The display data 586*b* is selected with reference to the display selection condition 586*a* of the goodness-of-fit indicator setting data 586. Further with reference to the player setting data 520, information pieces on the back numbers, player names and defensive positions of the players are acquired, and information for displaying a list of them in a scrollable manner along with the goodness-of-fit indicator 52 on the basis of the selected display data 586*b* is generated and is transmitted. (Refer to FIG. 8).

If it is determined from the received request information that a "BACK TO TEAM TACTIC SETTING SCREEN" operation has been performed on the goodness-of-fit indicator screen W9 (YES in step S94), the server processing unit 202 transmits the information for displaying the team tactic setting screen W8 to the mobile game apparatus 1400 (step S96).

If it is determined from the received request information that a "COMPLETE SETTING AND BACK TO MENU" operation has been performed on the team tactic setting screen W8 (YES in step S98), the server processing unit 202 exits the team tactics setting processing.

Referring back to the flowchart in FIG. 28, if it is determined from the received request information that the "CREATE LEAGUE" menu selection icon has been selected in the menu screen W2 (YES in step S130), the server processing unit 202 performs league creation processing (step S132).

In the processing, the server processing unit 202 first performs league setting screen display processing, transmits the display information for displaying the league setting screen W10 to the mobile game apparatus 1400 and creates a new league setting data 550. In this case, the settings of items of the regulation setting data 550*c* are predetermined defaults.

If an operation input is performed on the league setting screen W10 in the mobile game apparatus 1400, request information pieces according to the operation inputs to the league ID setting box 60, participation password setting box 62 and regulation setting section 66 are transmitted to the server system 1100.

The server processing unit 202 receives request information pieces based on operation inputs to the league ID setting box 60 and participation password setting box 62 and set the generated league ID 550*a* and participation password 550*b* of the generated league setting data 550. If receiving the request information based on the operation input to the regulation setting section 66, the server processing unit 202 changes the settings of items of the regulation setting data 550*c* of the generated league setting data 550 in accordance with the received request information. If the received request information corresponds to a setting end operation, the server processing unit 202 stores the league ID of the league generated this time and a participation password in association to the league registration list 551 and generates the new league participating team list 552 corresponding to the league. If the received request information corresponds to the operation for returning to the menu screen, the server processing unit 202 exits the league creation processing.

If it is determined from the received request information that the menu selection icon for "PARTICIPATE IN LEAGUE" is selected on the menu screen W2 (YES in step S134), the server processing unit 202 performs league participation processing (step S136).

In the processing, the server processing unit 202 first performs a process for displaying a participating league setting screen including transmitting display information for displaying the participating league setting screen W12 to the mobile game apparatus 1400. In the mobile game apparatus 1400, the software keyboard 74 may allow input to the league ID input box 70 and participation password input box 72, and request information in accordance with the inputs is transmitted to the server system 1100.

If the received request information corresponds to a league ID and a participation password, the server processing unit 202 compares them with the league setting data 550. If the league ID 550*a* and participation password 550*b* are not matched with the registered ones, the server processing unit 202 transmits display information for notifying an input error to the mobile game apparatus 1400.

If they are matched with the registered ones, the server processing unit 202 sets the matched league ID 550*a* to the participating league ID 618 of the team setting data 600 of the user, registers and updates the team information of the user with the league participating team list 552 of the league and exits the league participation processing. Alternatively, if the received request information corresponds to the operation of returning to the menu screen, the server processing unit 202 exits the league participation processing.

If it is determined from the received request information that the menu selection icon for "GAME" has been selected on the menu screen W2 (YES in step S138), the server processing unit 202 performs match simulation processing (step S140).

Figure 31:
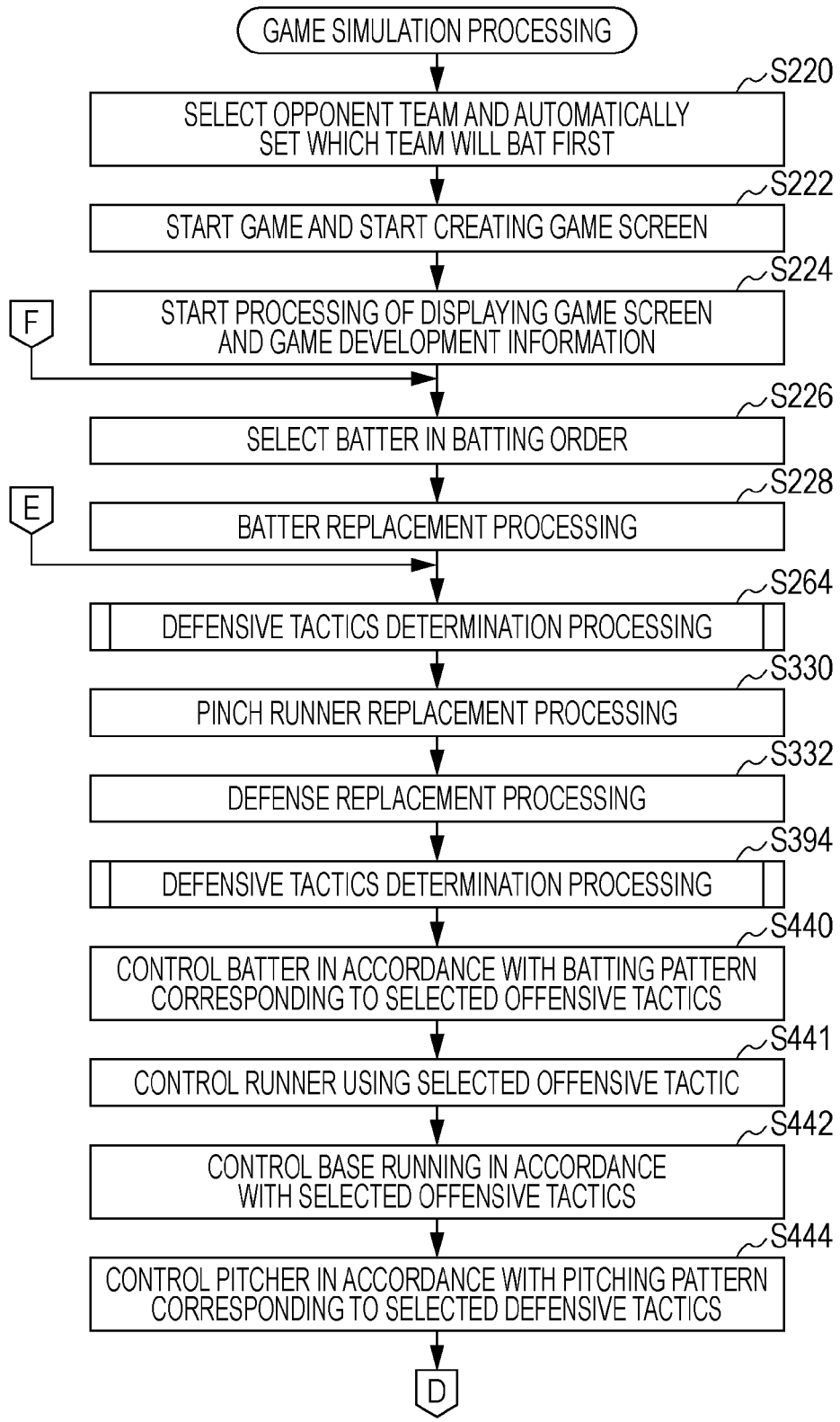
FIG. 31 is a flowchart for describing a flow of match simulation processing.
Figure 32:
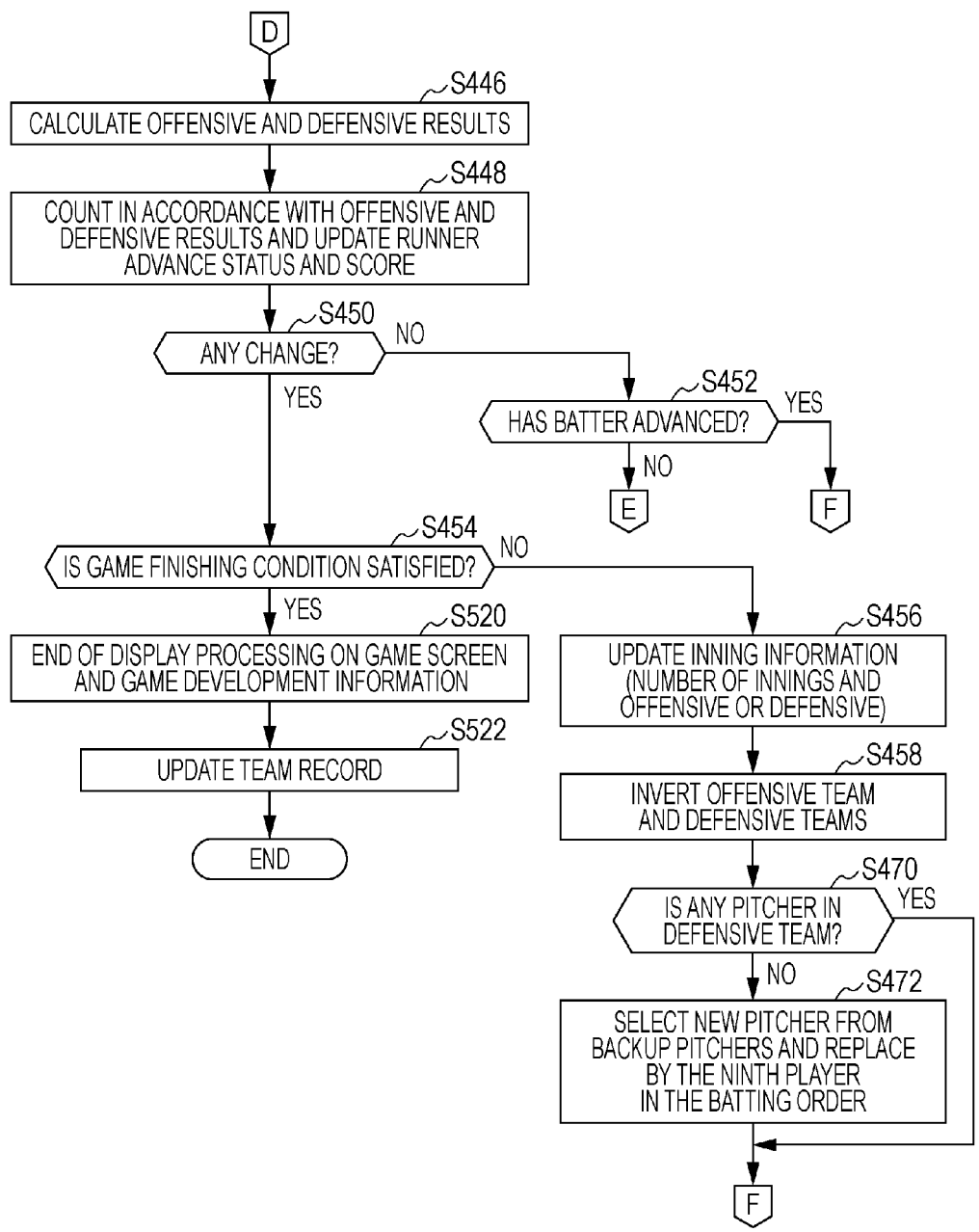
FIG. 32 is a flowchart following FIG. 31.

FIG. 31 and FIG. 32 are flowcharts for describing a flow of match simulation processing. In the processing, the server processing unit 202 first generates play data 650 newly in the server storage unit 502. With reference to the participating league ID 618 of the team setting data 600, a team to match with a user's team is randomly selected from the league participating team list 552 in which the user's team is currently participating, and which team will bat first and second is automatically set (step S220). The team IDs of the two teams which will match and information on which will bat first and second is stored in the matching teams information 652 of the play data 650. (Refer to FIG. 27).

Next, the server processing unit 202 starts a match and starts generating a match image (step S222). Information on the identification of the bottom/top of the current inning is stored in the play data 650 as inning information 654.

If the game has started, the server processing unit 202 starts transmitting to the mobile game apparatus 1400 display information for displaying a match image and game development information (such as a count, base advancement information and score information) (step S224). With this, in the mobile game apparatus 1400, the game simulation screen W14 is displayed, and how the match develops is displayed on the game screen display 82. Then, the display of the score board 80, count indicator 84 and runner advance status display 86 is started. (Refer to FIG. 11).

If a match has started, the server processing unit 202 first selects a batter in accordance with the batting order of the offensive team (step S226) and next performs batter change processing (step S228).

More specifically, for example, in the batter change processing, the server processing unit 202 determines whether a predetermined pinch hitter appropriateness condition is satisfied or not. The pinch hitter appropriateness condition refers to a match condition for determining whether a batter change is appropriate or not. For example, the pinch hitter appropriateness condition may be implemented similarly to a condition for batter change in a publicly known baseball game such as a condition that the current batter is a pitcher and the inning is at or after the sixth.

If it is determined that the pinch hitter appropriateness condition is satisfied, the server processing unit 202 next determines whether the batter's batting-related parameter (such as the power to hit long and contact) is lower than a predetermined reference value or not with reference to the applied player parameter data 656 in the play data 650. If so, the server processing unit 202 performs use-of-pinch-hitter determination processing. In the processing, the probability of selecting the use of a pinch hitter is set lower if the inning is before the seventh and set higher at and after the seventh inning.

If a pinch hitter is used, the server processing unit 202 refers to the replacement list 614 to select a player to change, replaces the current batter by one player registered as a replacement and ends the batter change processing. If no replacement player is found, the batter change processing ends.

If the batter change processing ends, the server processing unit 202 next performs offensive tactic determination processing (step S264).

Figure 33:
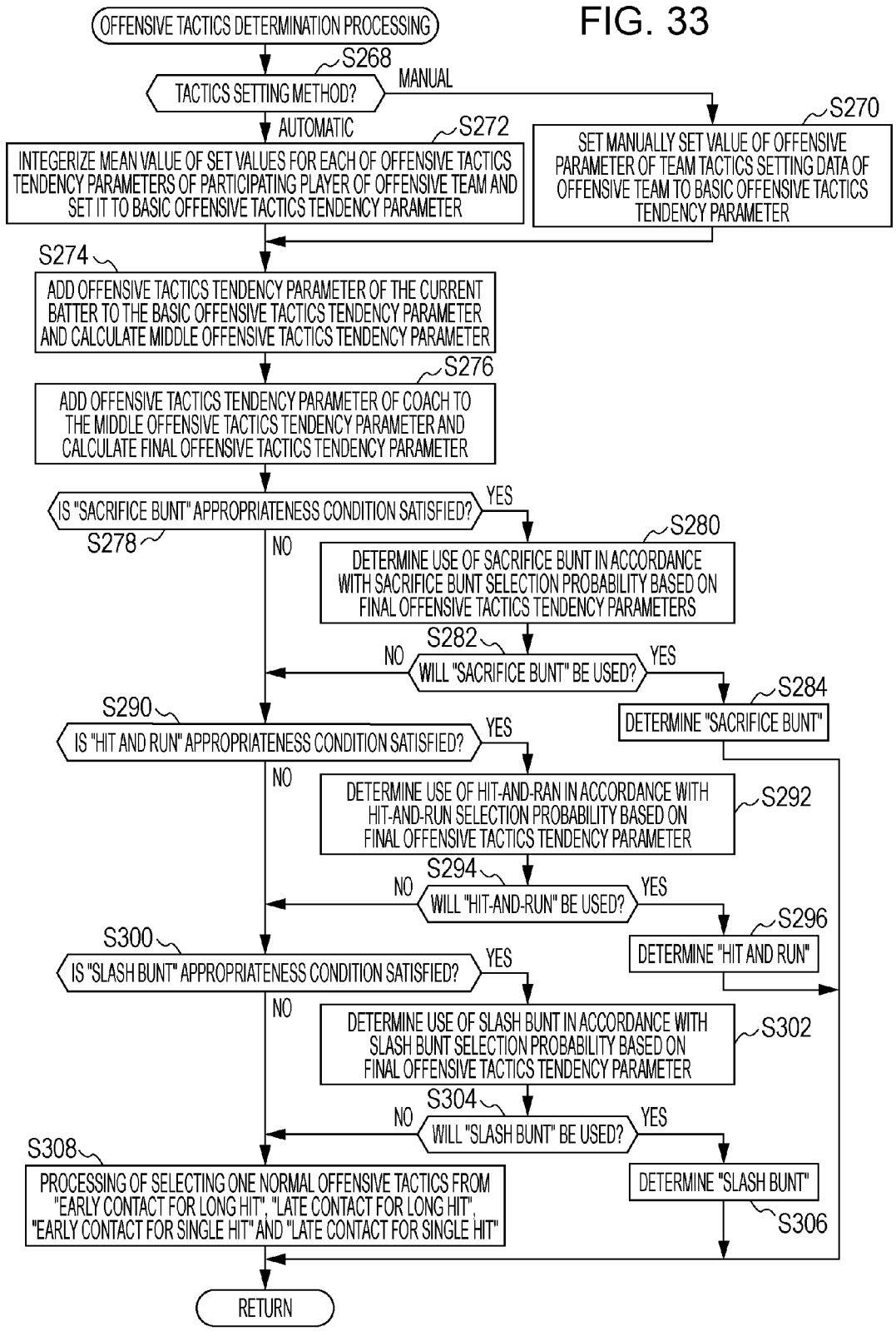
FIG. 33 is a flowchart for describing a flow of offensive tactic determination processing.

FIG. 33 is a flowchart for describing a flow of the offensive tactic determination processing.

In the processing, the server processing unit 202 first refers to the setting of the tactics setting method 620a. If "MANUAL" is set ("MANUAL" in step S268), the manually set value 620c of the tactic tendency parameter with "OFFENSE" as the offense and defensive category 620e stored in the team tactics setting data 620 is stored in the basic offensive tactic tendency parameter 660 (step S270).

On the other hand, if "AUTOMATIC" is set ("AUTOMATIC" in step S268), the server processing unit 202 refers to the offensive tactic tendency parameters 532 of the individual tactic tendency parameter 530 of the currently playing members (who are the same as the set starting players when a game starts or members after a change if any) in the offensive team and calculates a total of the set values of the playing players in the offensive team parameter by parameter. Then, the average value is calculated with the number of playing players from the total, and the calculated average value is rounded to an integer of "−5" to "+5" and is handled as the basic offensive tactic tendency parameter 660 (step S272).

In other words, on the basis of the individual tactic tendency parameters 530 of players which satisfy a predetermined member condition, the tendency of selection of the team's basic offensive tactics is determined. Having described that the predetermined member condition is currently playing members, all players registered with the current game including a replacement and a backup pitchers may be the predetermined member condition to determine the value of the basic offensive tactic tendency parameter 660.

The server processing unit 202 next adds the offensive tactic tendency parameter 532 of a player who is the current batter (main character who has a strong influence on the offense) to the basic offensive tactic tendency parameter 660 parameter by parameter again to calculate the middle offensive tactic tendency parameter 664 (step S274). The server processing unit 202 further adds the offensive tactic tendency parameter 532 of a coach which is one of main characters according to this embodiment to the middle offensive tactic tendency parameter 664 parameter by parameter to determine the final offensive tactic tendency parameter 668 at the current time at bat (step S276).

Next, the server processing unit 202 determines whether a "sacrifice bunt" appropriateness condition is satisfied or not (step S278). With reference to a sacrifice bunt appropriateness condition table 560 (refer to FIG. 19), if a sacrifice bunt appropriateness condition 560b is satisfied for each on-base status 560a (YES in step S278), the server processing unit 202 further refers to the sacrifice bunt selection probability data 561 and determines the selection of a sacrifice bunt with the selection probability according to the final offensive tactic tendency parameter 668 (step S280). If "sacrifice bunt" is selected (YES in step S282), the offensive tactic at the current time at bat is set to "SACRIFICE BUNT" (step S284), and the offensive tactic determination processing ends.

If it is determined that the sacrifice bunt appropriateness condition is not satisfied (NO in step S278) or "sacrifice bunt" is not selected (NO in step S282), the server processing unit 202 next determines whether a hit-and-run appropriateness condition is satisfied or not (step S290).

With reference to a hit-and-run appropriateness condition table 562, if a condition for determining that the selection of hit-and-run determined on the basis of the on-base status, for example, is appropriate is satisfied (YES in step S290), the server processing unit 202 further refers to a hit-and-run selection probability table 563 and determines the selection of hit-and-run with the selection probability according to the final offensive tactic tendency parameter 668 (step S292). If "hit-and-run" is selected (YES in step S294), the offensive tactic at the current time at bat is set to "HIT-AND-RUN" (step S296), and offensive tactic determination processing ends.

If it is determined that the hit-and-run appropriateness condition is not satisfied (NO in step S290) or if "hit-and-run" is not selected (NO in step S294), the server processing unit 202 next determines whether a slash bunt appropriateness condition is satisfied or not (step S300).

With reference to a slash bunt appropriateness condition table 564, if a slash bunt appropriateness condition based on the batter's batting ability and running ability is satisfied (YES in step S300), the server processing unit 202 further refers to a slash bunt selection probability table 565 and determines the selection of "slash bunt" with the selection probability according to the final offensive tactic tendency parameter 668 (step S302). If "slash bunt" is selected (YES in step S304), the offensive tactic at the current time at bat is set to "slash bunt" (step S306), and the offensive tactic determination processing ends.

If none of the appropriateness conditions for sacrifice bunt, hit-and-run and slash bunt is satisfied, the server processing unit 202 selects an offensive tactic with normal batting (step S308).

More specifically, one of the tactics is determined in accordance with the selection probabilities of "early batting for long hit", "late batting for long hit", "early batting for single hit" and "late batting for single hit" defined in the normal offensive tactics selection possibility table 566 (refer to FIG. 21), and offensive tactic determination processing ends.

Referring back to the flowchart in FIG. 31, the server processing unit 202 next performs runner change processing (step S330).

More specifically, the server processing unit 202 first determines whether a predetermined pinch-run appropriateness condition is satisfied or not. The "pinch-run appropriateness condition" may be a case that "a runner exists and the offensive team is losing or winning by a hair", for example, and may be implemented similarly to an initiation condition for a runner change in a publicly known baseball game.

If it is determined that the pinch-run appropriateness condition is satisfied, the presence of a runner having a lower running ability than a predetermined reference value among the current runners is determined with reference to player application parameter data 656 in the play data 650. If the applicable runner exists, pinch-run selection determination processing is performed. In the processing, the probability of selection of pinch-run is inning is set lower if the inning is before the seventh and set higher at and after the seventh inning. If pinch-run is selected, the server processing unit 202 refers to the replacement list 614 to select the player to change and replaces an unchanged player by a runner having an ability that is lower than the reference value. Then, the runner change processing ends. If no unchanged player is found, the player change with the pinch-run is cancelled, and the runner change processing ends.

The server processing unit 202 next performs defense change processing (step S332).

More specifically, for example, the server processing unit 202 first determines whether a predetermined defense change appropriateness condition is satisfied or not. The "defense change appropriateness condition" defines the condition for changing the defense. For example, it may be set similarly to a defense change appropriateness condition in a publicly known baseball game such as "the inning is at or after the seventh, the defensive team is winning by a point difference of three or smaller points, and the batter is one of the first to third in the batting order".

If it is determined that the defense change condition is satisfied, the server processing unit 202 refers to defense aptitude values 526 in the player setting data 520 of all of the fielders and determines the presence of a fielder having a lower defensive aptitude value than a predetermined reference value about the current defensive position. If a fielder having lower value than the reference value is found, the server processing unit 202 performs defense change selection determination processing. In the processing, the selection probability of the defense change is set lower if the inning is before the seventh and set higher at and after the seventh inning.

If defense change is selected, the server processing unit 202 refers to the replacement list 614 and searches an unchanged player to select the player to change. If an applicable players exists, one of them is replaced by the fielder having a value lower than the reference value, and the defense change processing ends. If no applicable unchanged player exists, the defense change processing ends without change.

Next, the server processing unit 202 performs defensive tactic determination processing (step S394).

Figure 34:
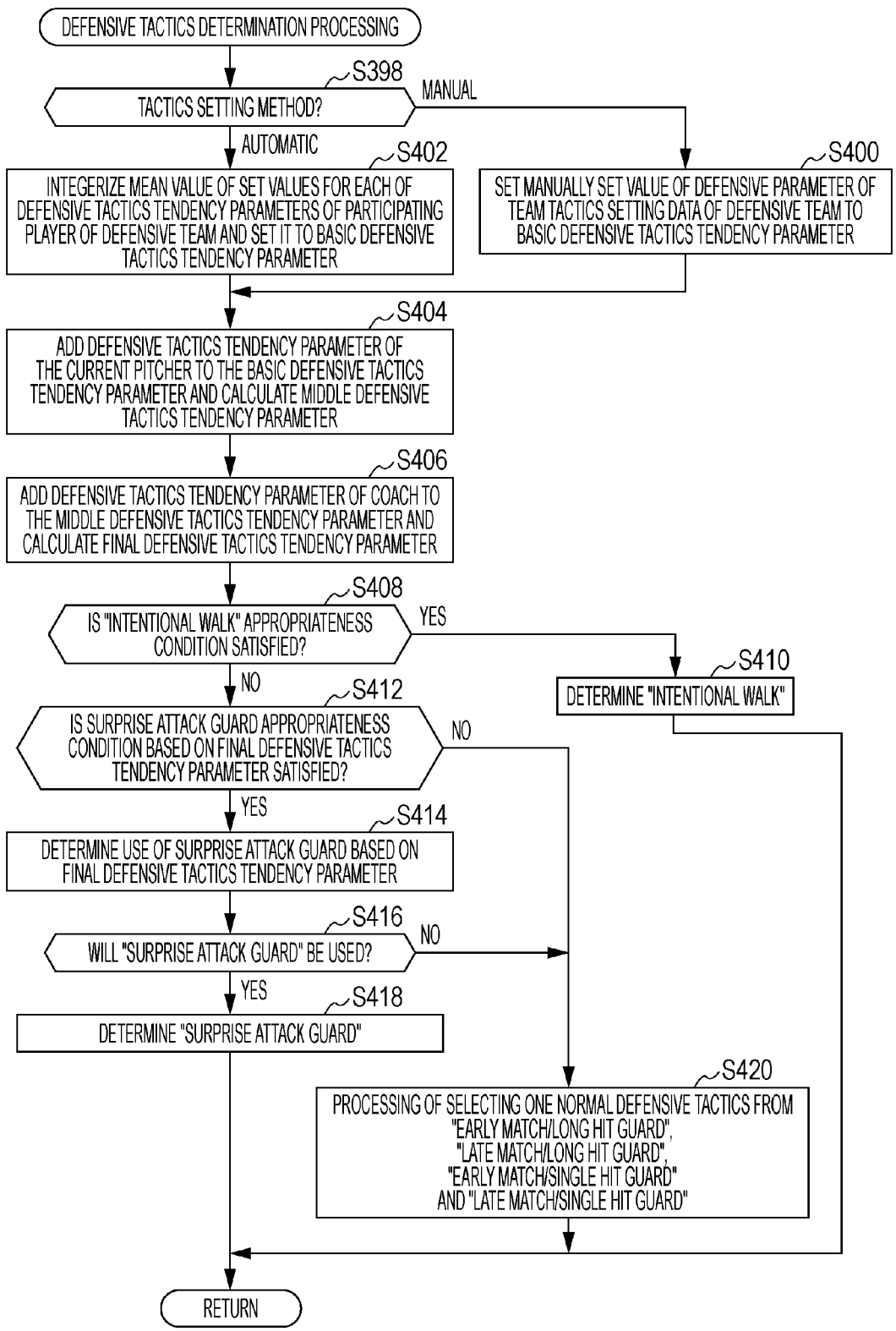
FIG. 34 is a flowchart for describing a flow of defensive tactic determination processing.

FIG. 34 is a flowchart for describing a flow of the defensive tactic determination processing. In the processing, the server processing unit 202 first refers to the setting of the tactics setting method 620*a*.

If the tactics setting method 620*a* is set to "MANUAL" ("MANUAL" in step S398), the manually set value 620*c* of the tactic tendency parameter with "DEFENSE" as the offense/defensive category 620*e* stored in the team tactics setting data 620 is stored in the basic defensive tactic tendency parameter 662 (step S400).

On the other hand, if the tactics setting method 620*a* is set to "AUTOMATIC" ("AUTOMATIC" in step S398), the server processing unit 202 calculates, parameter by parameter, a total of the set values of the defensive tactic tendency parameters 534 of the individual tactic tendency parameters 530 of the currently playing players of the members of the defensive team, that is, players excluding backups, calculates the average value with the number of playing players, rounds the average value to an integer of "−5" to "+5" and handles it as a basic defensive tactic tendency parameter 662 of the defensive team (step S402).

In other words, the selection tendency of the basic defensive tactics of the team is determined on the basis of the individual tactic tendency parameters 530 of the players satisfying a predetermined member condition.

Next, the server processing unit 202 adds the defensive tactic tendency parameter 534 of the currently playing pitcher which is one of main characters according to this embodiment to the basic defensive tactic tendency parameter 662 parameter by parameter again to calculate a middle defensive tactic tendency parameter 666 (step S404). The server processing unit 202 further adds the defensive tactic tendency parameter 534 of a coach which is one of main characters according to this embodiment to the middle defensive tactic tendency parameter 666 parameter by parameter to determine the final defensive tactic tendency parameter 670 at this time at bat (step S406).

Next, the server processing unit 202 determines whether an intentional walk selection condition is satisfied or not with reference to an intentional walk selection condition table 570 (step S408). In the intentional walk selection condition table 570, a plurality of ranges are provided for the set value of "intentional walk" of the final defensive tactic tendency parameters 670, and an intentional walk selection condition having a batter's batting ability as a factor for determining the selection of intentional walk is thus defined for each of the ranges.

If the intentional walk selection condition is satisfied (YES in step S408), the defensive tactic at this time at bat is determined as "intentional walk" (step S410), and the defensive tactic determination processing ends.

If the intentional walk selection condition is not satisfied (NO in step S408), the server processing unit 202 next refers to a surprise attack guard appropriateness condition table 572 and thus determines a surprise attack guard appropriateness condition based on the final defensive tactic tendency parameter 670 is satisfied or not (step S412).

In the surprise attack guard appropriateness condition table 572, a surprise attack guard appropriateness condition is described with factors of the on-base status and an offense-related ability parameter such as the batter's "contact" and "running ability" and defines a condition for selection of surprise attack guard.

If the surprise attack guard appropriateness condition is satisfied (YES in step S412), the server processing unit 202 further refers to a surprise attack guard selection probability table 574 and thus determines the selection of "surprise attack guard" with the selection probability based on the set value of "surprise attack guard" of the final defensive tactic tendency parameter 670 and the current score difference (step S414). In other words, though it may be determined to select the surprise attack guard conditionally, the actual selection of surprise attack guard is determined here.

If "surprise attack guard" is selected (YES in step S416), the server processing unit 202 determines the "surprise attack guard" as the defensive tactic for the current batter (step S418) and exits the defensive tactic determination processing.

On the other hand, the surprise attack guard appropriateness condition is not satisfied in the beginning (NO in step S412) and if the selection determination processing does not select surprise attack guard (NO in step S416), the server processing unit 202 refers to a normal defensive tactics selection possibility table 576. (Refer to FIG. 22). Thus, the server processing unit 202 selects and determines one tactic of "early match/long hit guard", "late match/long hit guard", "early match/single hit guard" and "late match/single hit guard" on the basis of the value of "batting guard" of the final defensive tactic tendency parameter 670 and the value of the "match count" (step S420) and exits the defensive tactic determination processing.

Referring back to the flowchart in FIG. 31, the server processing unit 202 next refers to the batting pattern data 555 and controls batters in accordance with the setting of the batting pattern corresponding to the selected offensive tactic (step S440; refer to FIG. 18). More specifically, the server processing unit 202 determines the types of batting in accordance with the probabilities of the square hit, standard hit, bloop, and look corresponding to the current pitching order 555a and causes an operation to implement the determined types of batting.

Next, the server processing unit 202 performs base running control in accordance with the selected offensive tactics (step S441). More specifically, for example, if "hit-and-run" is selected as an offensive tactic, a runner is caused to run simultaneously with pitching.

Next, the server processing unit 202 refers to the defense shift data 556 and controls the defensive formation of fielders in accordance with the defense shift pattern corresponding to the selected defensive tactics (step S442).

Next, with reference to the pitching pattern data 554, the pitching by a pitcher is controlled in accordance with the pitching pattern corresponding to the selected defensive tactics setting (step S444; refer to FIG. 17). More specifically, on the basis of the probabilities of the selection of a pay-pitch, selection of a pitching zone, selection of the ball speed and selection of the velocity of pitching corresponding to the pitching order 554b at that time, to where and what kind of ball is to be pitched, that is, pitching details are determined, and pitching operation control is performed in accordance therewith.

Up to this point, both of the offensive and defensive behaviors have been determined. Thus, moving to the flowchart in FIG. 32, the server processing unit 202 next calculates the offensive and defensive results (step S446). In accordance with the results, the server processing unit 202 updates game development information such as the counts, runner advance status and scores (step S448).

In other words, similarly to a publicly known baseball game with automatic control over a game, counts of strikes and balls, the type of fly and whether the fly has been successfully caught or not, intentional walk, out/safe results of a pick-off throw, the success/failure of a steal and so on are determined. The type of fly may be determined with reference to a table data having correspondence between the type of fly and position stored in a matrix of a result (one of square hit, standard hit, and bloop) of a batting determined on the basis of the batting pattern data 555 and the pitching type determined on the basis of the pitching pattern data 554, which is prestored in the server storage unit 502, for example. Alternatively, other methods may be used.

Next, the server processing unit 202 determines whether a change has occurred or not on the basis of the offensive and defensive results. If no change has occurred (NO in step S450) and if no batter has advanced to a base (NO in step S452), the processing returns to step S264 and a simulation with the current batter is repeated. If no change has occurred but a batter has advanced to a base (YES in step S452), the processing returns to step S226, and the simulation is repeated from the selection of a new batter.

If a change has occurred (YES in step S450), the server processing unit 202 determines whether a game finishing condition is satisfied or not.

If the game finishing condition is not satisfied (NO in step S454), the number of innings and the offense/defense identification are updated (step S456). Then, the offensive and defensive teams are inverted (step S458). The server processing unit 202 then determines whether the defensive team as a result of the offense and defense inversion has a pitcher or not. If no pitcher is available (NO in step S470), a new pitcher is selected from the backup pitcher list 616 and is exchanged with the ninth player in the batting order (step S472). The processing moves to step S226.

On the other hand, if a match finishing condition is satisfied (YES in step S454), the server processing unit 202 finishes generation and transmission of display information for displaying a game screen and game development information in the mobile game apparatus 1400 (step S520), updates the records of the both of the teams having matched in this game (step S522). Then, the match simulation processing ends.

In FIG. 28, if the match simulation processing ends, the processing moves to step S2. A user can continuously enjoy the team running by reinforcing his or her team by modifying the team organization or changing the settings of the team tactics on the basis of the game result.

According to this embodiment, a game can be provided in which automatic control is implemented over a group of a plurality of combinations of characters having predetermined individual behavior tendencies and/or ability values. The game allows selection of automatic determination of a behavior tendency of a group (whole inclination or team tactic of the embodiment) on the basis of individual behavior tendencies (inclinations) of the member characters of the group or the designation of a behavior tendency of the group by the user himself or herself. Thus, the group can be behaved as the user requests.

When a user himself or herself designates a behavior tendency of a group, the ability values of the characters can be changed in accordance with the similarity (goodness-of-fit) between the behavior tendency designated by the user and individual behavior tendencies of the member characters of the group. The higher the similarity of the behavior tendency of a team and behavior tendencies of individual characters, the higher the ability values are changed. The larger the difference between the behavior tendencies, the lower the ability is changed.

In accordance with the matching between the user's way of thinking and the ways of thinking of the member characters of a group, the group may exert its ability or may not fully exert its ability. In other words, events such as ups and downs with differences in ways of thinking between a commander and subordinates which can be seen in real world may occur in a game, and a strong interest further grows with the game.

VARIATION EXAMPLES

Having described the first embodiment applying the present invention, the embodiments to which the present invention is applicable are not limited thereto. Without departing from the spirit of the present invention, game details and system or function components may be added, omitted or changed.

For example, according to the aforementioned embodiment, a baseball game is described, for example. However, the present invention is applicable to games in other genres if automatic control is implemented over a group of a plurality of combinations of characters having predetermined individual behavior tendencies and/or ability values in the games.

More specifically, the present invention is also applicable to other sport games in which defense-related and offense-related positions are provided and player changes are allowed during a game such as soccer, hockey, rugby, American football, and ballet games. The present invention is also applicable to an RPG in which fighting groups of an advanced guard and rear guard are formed in a what-is-called fighting scene.

According to the aforementioned embodiment, the game system includes the server system 1100 and a user terminal, and the game management processing is performed by the server system 1100. The game system may be implemented by one desktop home game apparatus or commercial game apparatus implementing the server system 1100 and a user terminal When a game system of the present invention is used in a amusement arcade, the user terminal may be a commercial game apparatus.

Having described according to the aforementioned embodiment that automatic control is performed over behaviors of two matching teams, for example, one of a defensive team and an offensive team may be computer-controlled, and the other team may be controlled by a player.

Having described according to the aforementioned embodiment that the set value of a tactic tendency parameter of a team is directly slid with the lever 47b along the horizontal axis 47a (refer to FIG. 7), the present invention is not limited thereto.

For example, as illustrated in FIG. 35, the horizontal axis 80 of the parameter value setting section 47 may have a settable range 84 (84a, 84b) which is a left and right correctable width from the current automatically set value 620d to an upper limit value (+5 in the embodiment) and lower limit value (−5 in the embodiment) about the automatically set value 620d as its origin 82.

In the team tactics setting processing, if an operation on the lever 86 is detected (YES in step S68 in FIG. 30), the server processing unit 202 in step S70 may calculate the plus or minus amount of correction in accordance with the distance from the origin 80 to the position of the lever 86, add the calculated amount of correction to the automatically set value 620d and store it to the manually set value 620c.

In other words, the automatically set value 620d may a temporary value of the whole inclination value calculated on the basis of the inclination values of the character members of a group, and the amount of correction on the temporary value may be determined in accordance with the operation on the lever 86. Then, the temporary value and the amount of correction may be used to set the whole inclination value. Thus, on the team tactic setting screen W8 in the beginning, the position of the lever 86 is at the position of the automatically set value 620d (whole inclination value as an automatically calculated temporary value). Therefore, a user can clearly see the whole inclination (more specifically, its value, whole inclination value) of the entire team organized by the user which is automatically acquired from the inclinations (more specifically inclination values) of the member characters. Operating the lever 86 can increase or decrease the automatically calculated whole inclination.

What is claimed is:

1. A program stored in a non-transitory computer readable medium, which causes a computer to control the development of a game by controlling operations of characters included in a group, the program causing the computer to function as:

group organizing means for forming a group, which is made up of characters, wherein two or more inclination values for inclination items are set for each of the characters;

whole inclination value setting means for setting a whole inclination value, which is an inclination value of the group, for each of the inclination items in accordance with an operation input by a user; and ability value changing means for changing an ability value of each of the characters in accordance with a sum of the differences between the whole inclination values and the respective inclination values of the character.

2. The program according to claim 1 causing the computer to function such that the ability value changing means can raise the ability value of a character if the sum of the differences satisfies a predetermined small difference condition and lower the ability value of the character if the difference satisfies a predetermined large difference condition.

3. The program according to claim 1 causing the computer to function as: goodness-of-fit determining means for determining the goodness-of-fit between each of the characters and the group formed by the characters on the basis of the sum of the differences between the inclination values of the inclination items of each of the characters and the respective whole inclination values; and goodness-of-fit indicator control means for controlling display of the goodness-of-fits of the characters forming the group.

4. The program according to claim 1 causing the computer to function such that the whole inclination value setting means can calculate and/or set the whole inclination value on the basis of the inclination values of the characters forming the group.

5. The program according to claim 1 causing the computer to function such that the whole inclination value setting means can have: temporary value calculating means for calculating a temporary value of the whole inclination value on the basis of the inclination values of the characters forming the group; and amount of correction setting means for setting the amount of correction for correcting the temporary value calculated by the temporary value calculating means in accordance with an operation input by a user, and use the temporary value and the amount of correction to set the whole inclination value.

6. The program according to claim 1 causing the computer to function as motto control means for controlling display of the motto corresponding to an inclination value condition which satisfies the whole inclination value set by the whole inclination value setting means among inclination value conditions for the whole inclination value indicating the inclinations corresponding to a plurality of mottoes indicating inclinations of the group.

7. The program according to claim 6 causing the computer to function such that an unpermitted character combination condition can be associated with the motto, and the motto control means can control the display of the motto corresponding to an inclination value condition satisfied by the whole inclination value set by the whole inclination value setting means and the motto with which a combination of characters organized by the group organizing means does not satisfy the combination condition.

8. The program according to claim 1 causing the computer to function such that: the game is a fighting game in which the groups fight against each other; and the inclination items at least include an offensive inclination item and a defensive inclination item.

9. A computer system which controls the development of a game by controlling operations of characters included in a group, the system comprising:
- a processor including:
    - group organizing means for forming a group, which is made up of characters, wherein two or more inclination values for inclination items are set for each of the characters;
    - whole inclination value setting means for setting a whole inclination value, which is an inclination value of the group, for each of the inclination items in accordance with an operation input by a user; and
    - ability value changing means for changing an ability value of each of the characters in accordance with a sum of the differences between the whole inclination values and the respective inclination values of the character.

* * * * *